US007731585B2

(12) United States Patent
Okada

(10) Patent No.: US 7,731,585 B2
(45) Date of Patent: Jun. 8, 2010

(54) GAME SYSTEM INCLUDING SLOT MACHINES AND GAME CONTROL METHOD THEREOF

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 795 days.

(21) Appl. No.: 11/637,129

(22) Filed: Dec. 12, 2006

(65) Prior Publication Data

US 2008/0039177 A1 Feb. 14, 2008

Related U.S. Application Data

(60) Provisional application No. 60/836,387, filed on Aug. 9, 2006.

(51) Int. Cl.
*G06F 17/00* (2006.01)

(52) U.S. Cl. ........................................................ 463/20

(58) Field of Classification Search .............. 463/16–25
See application file for complete search history.

(56) References Cited

U.S. PATENT DOCUMENTS 6,634,941 B2 10/2003 Olive
2004/0110558 A1 6/2004 Suda et al.
2006/0166731 A1 * 7/2006 Yoshimi et al. ............... 463/20
2006/0247006 A1 * 11/2006 Inamura ....................... 463/20
2006/0247007 A1 * 11/2006 Inamura ....................... 463/20
2008/0004102 A1 * 1/2008 Kojima ......................... 463/20
2008/0280670 A1 * 11/2008 Sakuma ....................... 463/20
2008/0280674 A1 * 11/2008 Sakuma ....................... 463/25
2009/0227345 A1 * 9/2009 Yoshizawa .................. 463/20

* cited by examiner

*Primary Examiner*—Ronald Laneau
(74) *Attorney, Agent, or Firm*—NDQ&M Watchstone LLP

(57) ABSTRACT

A game system for playing a basic game, includes: slot machines which, when a combination of "BONUS" symbols stop in a winning line, transmit a signal for switching to a roulette game; a second game device, separate from the slot machines, which executes a second game; and a display for displaying an image corresponding to game status of the second game device. In cases in which the switching signal has been transmitted from any one of the slot machines, other slot machines enter a mode that allows the players at the other slot machines to participate in the second game. Furthermore, the game system includes a central controller which can communicate with the slot machines, the second game device, and the display, and which, upon reception of the switching signal from the slot machine, transmits a roulette game start signal to start the roulette game in the second game device.

20 Claims, 29 Drawing Sheets

FIG. 14

BASIC GAME RANDOM TABLE
(RANGE OF RANDOM NUMBER: 0~65535)

| COMBINATION | RANGE OF RANDOM NUMBER | DETERMINATION PROBABILITY |
|---|---|---|
| BONUS | 0~999 | 1000/65536 |
| A | 1000~1999 | 1000/65536 |
| K | 2000~3499 | 1500/65536 |
| Q | 3500~4999 | 1500/65536 |
| J | 5000~6999 | 2000/65536 |
| 10 | 7000~9999 | 3000/65536 |
| OTHER | 10000~65535 | 55536/65536 |

FIG. 15

BASIC GAME PAYOUT TABLE

| COMBINATION | PAYOUT AMOUNT | | |
|---|---|---|---|
| | CREDIT AMOUNT 1 | CREDIT AMOUNT 2 | CREDIT AMOUNT 3 |
| BONUS | ONE HUNDRED COINS | TWO HUNDRED COINS | THREE HUNDRED COINS |
| A | 20COINS | 40COINS | 60COINS |
| K | 10COINS | 20COINS | 30COINS |
| Q | 5COINS | 10COINS | 15COINS |
| J | 2COINS | 4COINS | 6COINS |
| 10 | 1COIN | 2COINS | 3COINS |

FIG. 16

SECOND GAME PAYOUT TABLE

| BETTING METHOD | FACTOR | SLOT MACHINE | | | SLOT MACHINE (PARTICIPATING)/ SECOND GAME TERMINAL |
|---|---|---|---|---|---|
| | | CREDIT AMOUNT 1 | CREDIT AMOUNT 2 | CREDIT AMOUNT 3 | |
| STRAIGHT BET | ×36 | ○ | | | |
| SPLIT BET | ×18 | ○ | | | |
| STREET BET | ×12 | ○ | | | |
| CORNER BET | ×9 | | ○ | | |
| FIVE BET<br>LINE BET | ×6 | | ○ | ○ | |
| DOZEN BET<br>COLUMN BET | ×3 | | ○ | ○ | ○ |
| RED/BLACK<br>EVEN/ODD<br>LOW/HIGH | ×2 | | | ○ | ○ |
| MULTIPLE BETS | | OK | | | NG |

GAME SYSTEM INCLUDING SLOT MACHINES AND GAME CONTROL METHOD THEREOF

BACKGROUND OF THE INVENTION

1. Field of the Invention

The present invention relates to a game system including slot machines and a game control method.

2. Related Art

Examples of known conventional slot machines include a slot machine having a function of providing a free game or a bonus game that provides the player with an advantage in comparison with a basic game, as disclosed in the specification of U.S. Pat. No. 6,634,941 and the specification of U.S. Patent Application Publication No. 2004/110558. The term "free game" or "bonus game" as used here represents a second game. Examples of such second games executed by such slot machines thus disclosed include: a game which, when a particular symbol is displayed, raises the probability of winning a particular combination that gives the player an award; and a game that raises the amount of payout to be received by a player who has won a particular winning combination.

Examples of other disclosed slot machines include a slot machine that displays the value of the payout which the player has a chance to get in the second game, so as to notify the player before the second game.

With such conventional slot machines, the same slot machine also provides the second game. The present invention provides a slot machine that offers further novel entertainment.

SUMMARY OF THE INVENTION

A first aspect of the present invention relates to a game system having a configuration as follows. The game system comprises: a slot machine; a second game device for executing a second game; other slot machines; and a display for displaying an image corresponding to the status of the game executed by the second game device, each of which has a function of communicating with a central controller. The slot machine executes a basic game. Furthermore, in a case that a predetermined condition has been satisfied, the slot machine transmits a signal for switching a game to a second game. On the other hand, the other slot machines execute the basic game, and allows the players to participate in the second game executed by the second game device. On the other hand, the display is provided so as to allow multiple players who are playing the second game at the slot machine and the other slot machines to visually confirm an image displayed on the display. In a case of reception of the switching signal from the slot machine, the central controller transmits a start signal for starting the second game so as to instruct the second game device to start the second game.

With the game system according to the first aspect of the present invention, in a case that a predetermined condition has been satisfied in the basic game, the slot machine transmits a signal to the central controller for switching a game to the second game. Upon reception of this signal, the central controller transmits a start signal for starting the second game to the second game device such as a roulette game device or the like, for example. On the other hand, the other slot machines execute the basic game, and allow the players to participate in the second game. The central controller transmits a second game start signal to the other slot machines.

A second aspect of the present invention relates to a game system having a following configuration. With the game system, each of the other slot machines includes a controller having a function of executing the second game according to the signal received from the central controller while executing the basic game. While the slot machine transmits data with respect to the second game, the other slot machines transmit data with respect to the prediction of whether or not the player at the slot machine will win the second game. The central controller receives the data transmitted by the slot machine and the other slot machines. Furthermore, the central controller transmits payout data to the slot machine corresponding to the result of the second game. Also, the central controller transmits payout data corresponding to the result of whether or not the player at the slot machine has won the second game to the other slot machines that have transmitted data with respect to the prediction whether or not the player at the slot machine will win the second game.

A third aspect of the present invention relates to a game system having a following configuration. With the game system, the central controller provides payouts, which differ from one another, to each of the slot machine, and the other slot machines, based upon a payout table for the second game.

The game system according to the third aspect of the present invention provides a difference in the payout paid out based upon the payout table between the player at the slot machine, i.e., the player who has won the second game, and the players at the other slot machines, i.e., the players at the other slot machines participating in this second game. Such a difference is provided by restricting the places where the players can place a bet, for example.

A fourth aspect of the present invention relates to a game system having a following configuration. The game system includes second game terminals which has a function of communicating with a central controller. With such an arrangement, upon reception of a second game start signal transmitted from the central controller, each of the second game terminals serves as a dedicated terminal for the second game. On the other hand, in a case that a predetermined condition for switching the game to the second game has been satisfied at the slot machine, credit data is provided in the basic game. The central controller executes the second game using the credit data thus provided in the basic game.

The game system according to the fourth aspect includes second game terminals each of which serves as a dedicated terminal for the second game. As the credit data necessary for executing the second game, the credit data provided in the basic game is used. Here, in a case that a predetermined condition for switching the game to the second game has been satisfied in the basic game, the aforementioned credit data is provided.

BRIEF DESCRIPTION OF THE DRAWINGS

FIG. 14 is a diagram which shows a structure of a random number table for a basic game;

FIG. 15 is a diagram which shows a structure of a payout table for the basic game;

FIG. 16 is a diagram which shows a structure of a payout table for the second game;

DETAILED DESCRIPTION OF THE INVENTION

Figure 2:
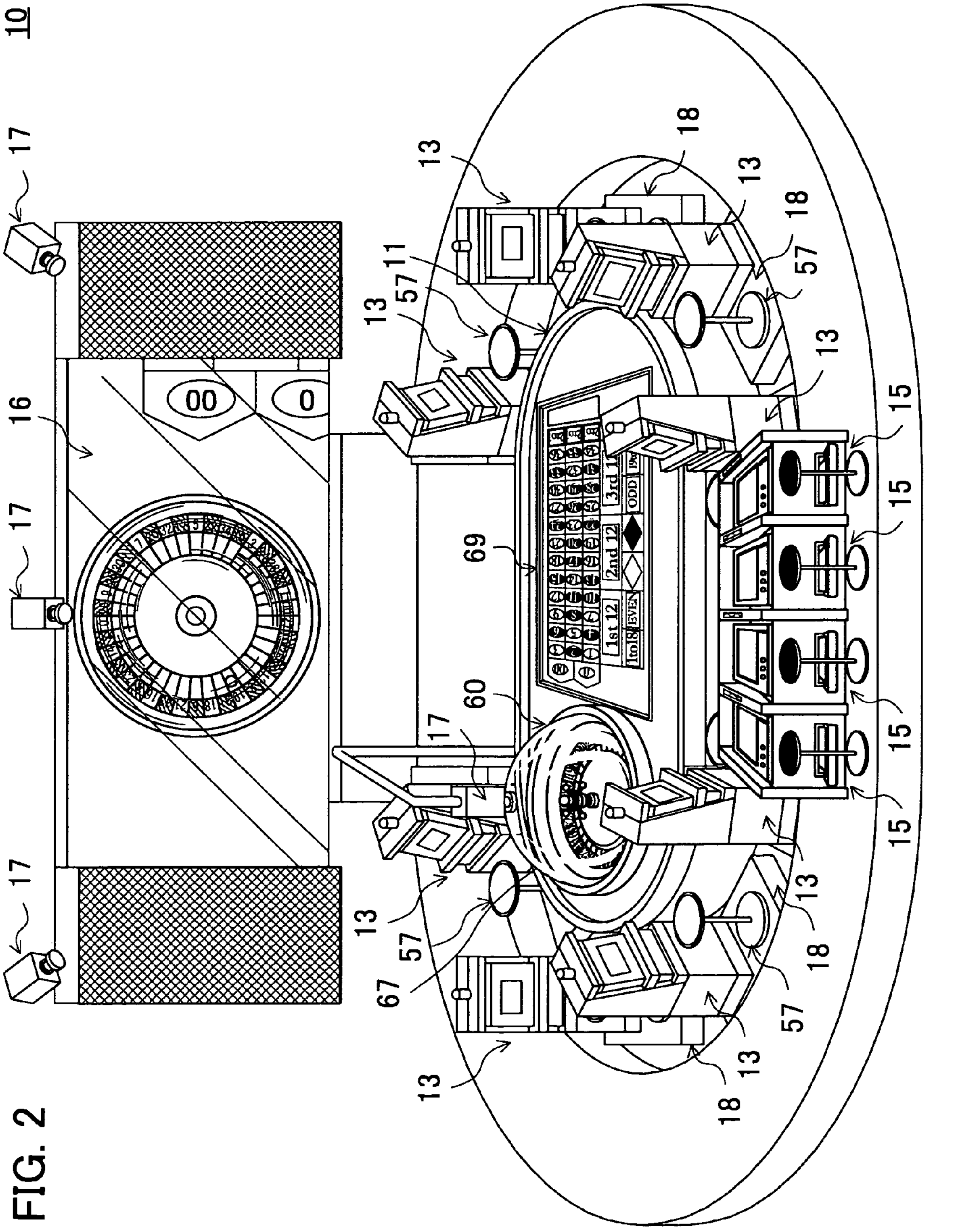
FIG. 2 is a schematic diagram which shows an external view of the game system according to the embodiment of the present invention.

Description will be made regarding a schematic configuration of a game system 10 according to the present embodiment with reference to FIG. 2. FIG. 2 is a perspective view which shows an external configuration of the game system 10 according to the present embodiment. As shown in FIG. 2, the game system 10 principally comprises slot machines 13, a second game device 11, and second game terminals 15. The term "second game device 11" as used here represents a game device for a roulette game, for example. Each slot machine 13 has a function of allowing the player to bet on a roulette game in the second game under a predetermined condition described later with reference to FIGS. 18A through 18D, in addition to the basic game described later with reference to FIG. 17.

Furthermore, the game system 10 includes a large-size monitor 16. The large-size monitor 16 displays the progress of the second game (which will also be referred to as "roulette game" hereafter). Examples of the images for indicating the progress of the game include: an image of a betting board 71 (see FIG. 10 described later) for indicating the betting state for each player; an image of the BET time for indicating the time remaining during which the player can bet on a roulette game; the contents displayed on a display 69 for displaying winning numbers etc.; etc. Also, examples of other images displayed on the monitor 16 include: an image of a rotating roulette wheel captured by a movable viewpoint camera 17 described later; an image of the players; etc. Such images are displayed as necessary.

The multiple slot machines 13 (eight slot machines in the present embodiment) are provided such that they surrounds the perimeter of the second game device 11 in a layout that allows the players at the slot machines 13 to see the large-size monitor 16. With such an arrangement, each slot machine 13, including a seat 57 for the player, is installed on a movable floor 18. Furthermore, such an arrangement has a mechanism for raising the slot machine 13 that has entered the second game mode together with its seat 57 in the form of a single unit by raising the movable floor 18 in the event that the second game has started.

Furthermore, the game system 10 includes multiple second game terminals 15 (four second game terminals in the present embodiment) in a layout that allows the players to see the large-size monitor 16 in front of them. Each of the second game terminals 15 is a dedicated roulette game terminal, and is a terminal which allows other players to participate in the second game in a case that the second game has started at any one of the slot machines 13.

Furthermore, the game system 10 includes multiple movable viewpoint cameras 17 (four in the present embodiment). One of the movable viewpoint cameras 17 is provided for capturing an image of a roulette device 60 described later with reference to FIG. 10. Specifically, this movable viewpoint camera 17 captures an image of the rotating roulette wheel, and an image of a ball 65 at a certain position after the roulette wheel stops. The movable viewpoint camera 17 for capturing an image of the roulette device 60 is provided at a position that allows it to capture an image of the roulette device 60 from the viewpoint along the vertical direction from the upper side to the lower side of the roulette device 60. The movable viewpoint camera 17 for capturing an image of the roulette device 60 may capture other images before the rotation of the roulette wheel, e.g., an image of the players, an image of the display 69 for displaying a BET screen 70 including the betting board 71 described later. The other movable viewpoint cameras 17 are installed on the upper end of the monitor 16, which allows images of the player's expressions to be captured. The images captured by the movable viewpoint cameras 17 are displayed on a liquid crystal display 30 of each slot machine 13 (see FIG. 3), and a display 93 (see FIG. 12) of each second game terminal 15, in addition to the large-size monitor 16. The game system 10 is installed in an amusement facility such as a casino.

In a case that a predetermined condition has been satisfied, i.e., in a case that a particular symbol combination has come to a stop along an active pay line, the slot machine 13 is switched from a terminal for the basic game to a terminal for the second game, thereby allowing the player to play the game. Such an arrangement also allows other slot machines 13, which are executing the basic game with the condition being unsatisfied, to participate in the second game. Specifically, such an arrangement allows the players at the other slot machines to place bets on the betting board 71 displayed on the BET screen 70 described later, or to place a bet on whether or not the player who has won the roulette game will win the bet.

Also, an arrangement may be made in which there is a difference in the payout table for the second game prepared beforehand for each terminal as described later with reference to FIG. 16. Such an arrangement provides a difference in the payout between the slot machine 13 with the predetermined condition being satisfied and the slot machine 13 with the predetermined condition being unsatisfied.

Figure 1:
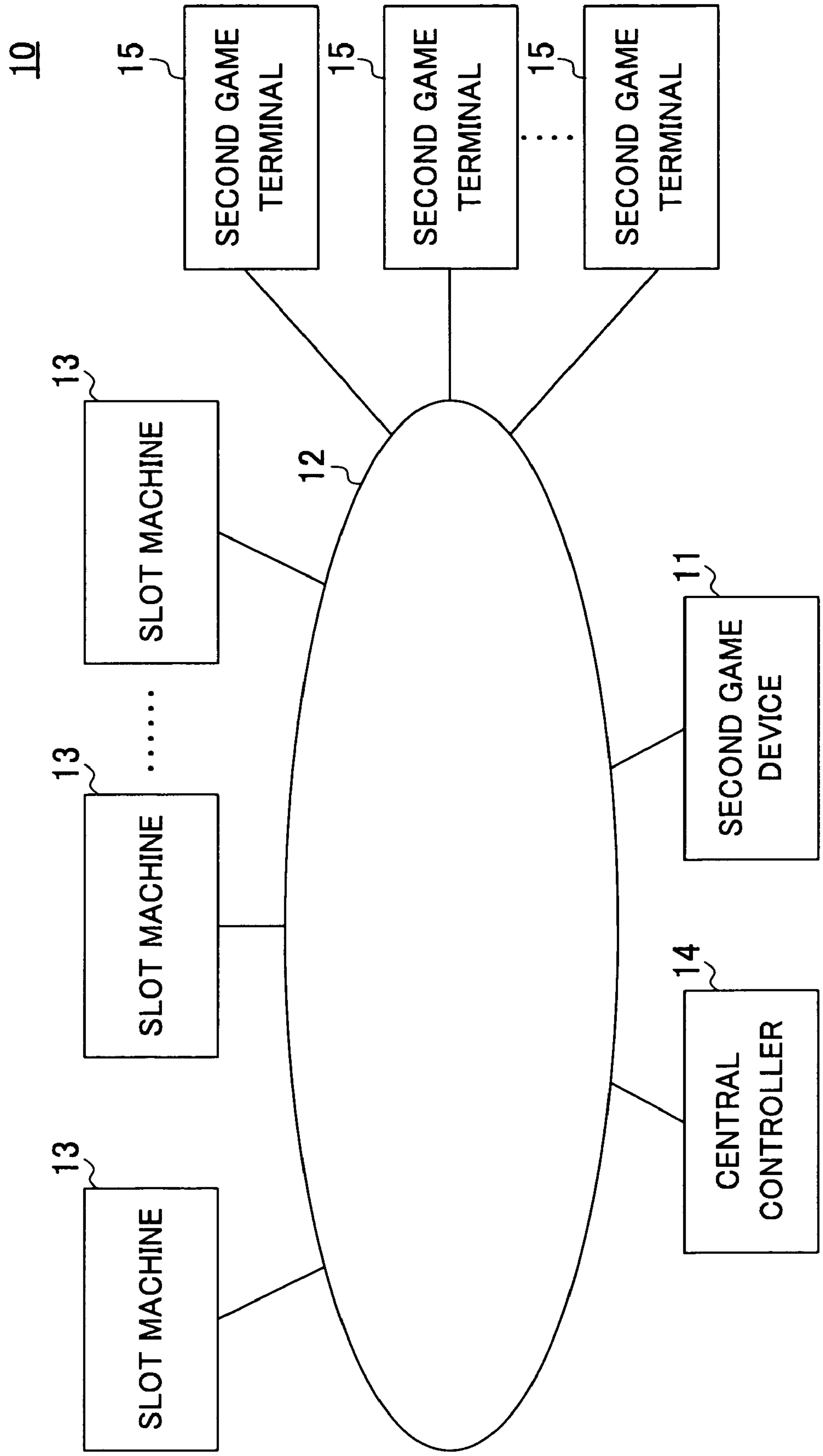
FIG. 1 is a system configuration diagram which shows a game system according to an embodiment of the present invention.

Description will be made below regarding the configuration of the game system 10 according to the present invention with reference to FIG. 1. With the game system 10 shown in FIG. 1, the components connected to a network 12 include: the slot machines 13; the second game device 11; a central controller 14; and the second game terminals 15. The central controller 14 can control each slot machine 13, the second game device 11, and each second game terminal 15 via the aforementioned network 12.

Each slot machine 13 provides a function of allowing the player to play a basic game. Furthermore, in a case that a predetermined condition has been satisfied, each slot machine 13 transmits a signal for switching the game from the basic game to the second game. Here, the second game is executed by the second game device 11 under the control of the central controller 14. In this case, the slot machine 13 played by the player serves as a terminal for the second game, which allows the player to bet on a roulette game. Such an arrangement allows the player to play the second game using the second game device 11 which is a separate unit from the slot machine 13.

On the other hand, let us consider the slot machine 13 with the predetermined condition being unsatisfied. Even in such a case, in a case that the predetermined condition has been satisfied at any one of the slot machines 13, and accordingly, in a case that the second game has been started by the second game device 11, the central controller 14 controls the other slot machines so as to allow the players at the other slot machines 13 to make a selection to participate in the second game. Such an arrangement allows the players at the slot machines 13 with the predetermined condition being unsatisfied to play the second game using the second game device 11.

Furthermore, the second game terminal 15 is connected to the central controller 14 via the network 12. The game system 10 has a mechanism which allows other players to play the second game via the aforementioned second game terminals 15, in addition to the slot machine 13 in a case that the roulette game has started at the second game device 11. That is to say, with such an arrangement, in a case that the roulette game has started, other players in the amusement facility can also participate in the roulette game using the second game terminals 15. As described above, such an arrangement has a function of giving other players, who have not played the basic game, a chance to participate in the roulette game. This increases the player's level of interest in the roulette game.

Figure 3:
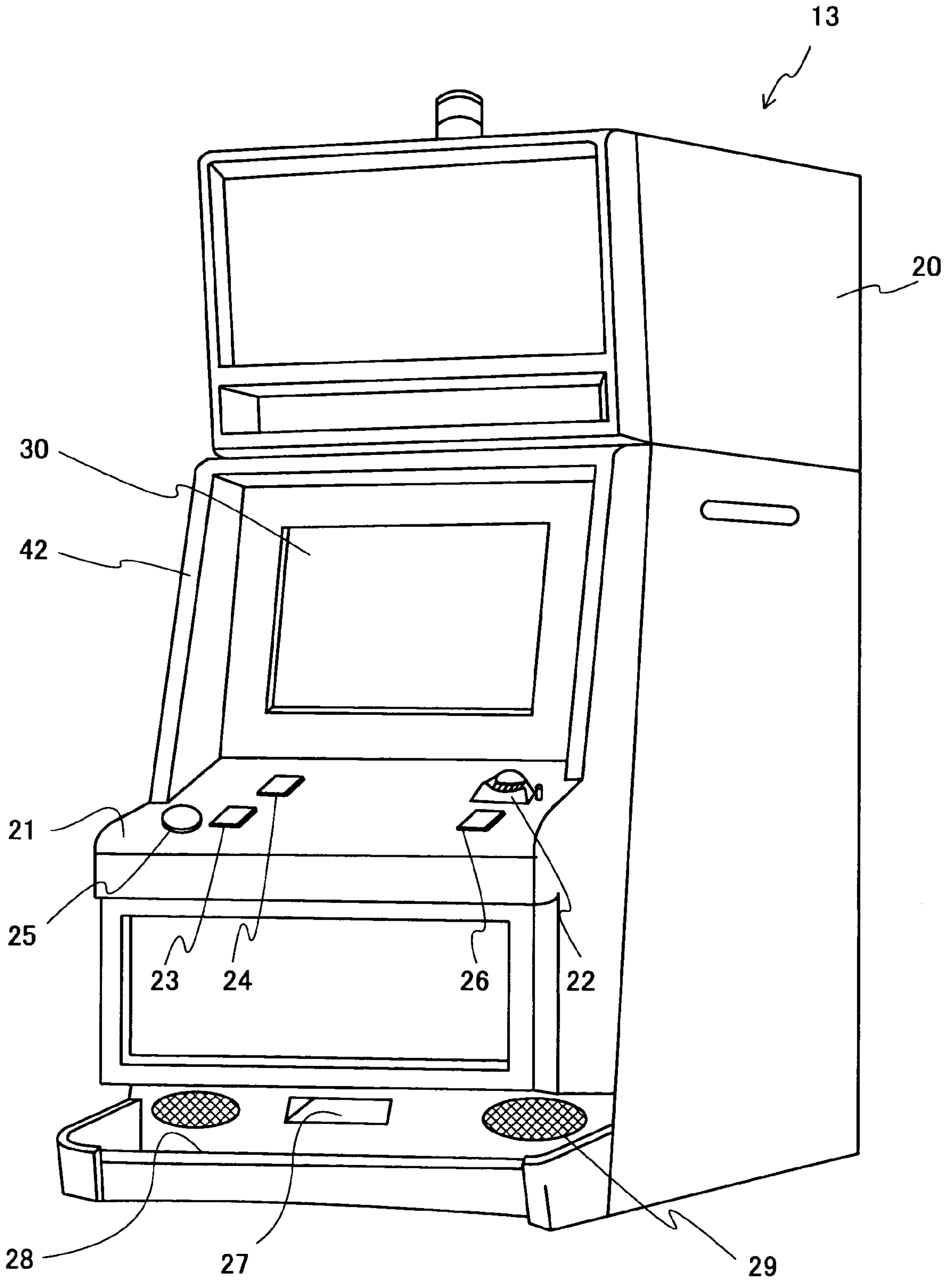
FIG. 3 is a perspective view which shows a slot machine according to the embodiment of the present invention.

FIG. 3 is a perspective view which shows the slot machine 13 according to an embodiment of the present invention. The slot machine 13 includes a cabinet 20 and a main door 42. The cabinet 20 has a structure in which the face facing the player is open. The cabinet 20 includes various kinds of components. Such components include: a controller 100 (see FIG. 5 and FIG. 8) for electrically controlling the slot machine 13; a hopper 44 for controlling the insertion of coins (game medium) and for retaining and paying out the coins (see FIG. 5 and FIG. 8); etc. The game medium is not restricted to coins. Also, examples of such game media include medals, tokens, electronic money or electronic value information (credit) having the same value.

The main door 42 is a member that serves as a cover of the cabinet 20, which protects the internal components stored in the cabinet 20 from being exposed to the outside. The main door 42 includes the liquid crystal display 30 at approximately the center thereof.

The liquid crystal display 30 is provided for displaying various kinds of images with respect to the game such as images for providing visual effects. Such an arrangement allows the player to advance the game while visually confirming various kinds of images displayed on the aforementioned liquid crystal display 30. In particular, in the roulette game, the liquid crystal display 30 displays the BET screen 70 described later with reference to FIG. 23. The liquid crystal display 30 includes a transparent liquid crystal panel 34 (see FIGS. 6 and 7). The transparent liquid crystal panel 34 has a function of switching a part of or the entire area of the liquid crystal panel 34 between a transparent mode and an opaque mode, and a function of displaying various kinds of images. Note that detailed description will be made regarding the configuration of the liquid crystal display 30.

Let us consider an arrangement in which the slot machine 13 comprises video reels. With such an arrangement, five virtual reels are displayed on the liquid crystal display 30. Note that the term "video reel" as used here represents a mechanism for displaying a reel on the liquid crystal display 30 in the form of an image. Multiple kinds of symbols necessary for the basic game include "BONUS", "WILD", "TREASURE BOX", "GOLDEN MASK", "HOLY CUP", "COMPASS & MAP", "SNAKE", "A", "K", "Q", "J", and "10". With such an arrangement, the liquid crystal display 30 displays these symbols with an image as if the reel has rotated.

On the other hand, let us consider an arrangement in which the slot machine 13 comprises mechanical reels. With such an arrangement, the slot machine 13 includes five mechanical reels 3A, 3B, 3C, 3D, and 3E (see FIGS. 4 and 6), each of which has multiple kinds of symbols depicted on the outer face thereof, arranged along a horizontal line on the rear face side of the liquid crystal display 30 in a manner that allows each mechanical reel to be rotated. The mechanical reels 3A through 3E and stepping motors 45A, 45B, 45C, 45D, and 45E (see FIG. 8) described later, etc., form a mechanism for displaying multiple symbols. As described above, each of the mechanical reels 3A through 3E has symbols, which are necessary for the basic game, depicted on the outer face thereof. In a case that the transparent liquid crystal panel 34 is in the transparent mode, the player can visually confirm these various kinds of symbols on the mechanical reels 3A through 3E.

The slot machine 13 includes an approximately horizontal operation unit 21 below the liquid crystal display 30. Furthermore, a coin insertion opening 22 is provided on the right side of the operation unit 21, which allows the player to insert coins. On the other hand, the components provided to the left side of the operation unit 21 include: a BET switch 23 which allows the player to determine which lines are to be set to active pay lines among nine lines L1, L2, L3, L4, L5, L6, L7, L8, and L9, for providing an award described later (which will simply be referred to as “active pay lines” hereafter), and which allows the player to select the number of coins as game media which are to be bet on the aforementioned active pay lines; a spin repeat bet switch 24 which allows the player to play the game again without changing the number of coins bet on the aforementioned active pay lines from that in the immediately prior game. Such an arrangement allows the player to set the number of coins bet on the aforementioned active pay lines by performing a pushing operation on either the BET switch 23 or the spin repeat bet switch 24.

With the aforementioned operation unit 21, a start switch 25 is provided on the left side of the BET switch 23, which allows the player to input a start operation instruction for the basic game in increments of games. Upon performing a pushing operation on either the start switch 25 or the spin repeat bet switch 24, which serves as a trigger to start the game, the aforementioned five mechanical reels 3A through 3E start to rotate.

On the other hand, a cash out switch 26 is provided near the coin insertion opening 22. Upon the player pushing the cash out switch 26, the inserted coins are paid out from a coin payout opening 27 provided at a lower portion of the front face of the main door 42. The coins thus paid out are retained in a coin tray 28. Furthermore, the coin payout opening 27 is provided on the upper side of the coin tray 28, with sound transmission openings 29 provided to the left and right of the coin payout opening 27. Here, the sound transmission openings 29 are provided for transmitting sound effects generated by a speaker 41 (see FIGS. 5 and 8) stored within the cabinet 20.

Figure 4:
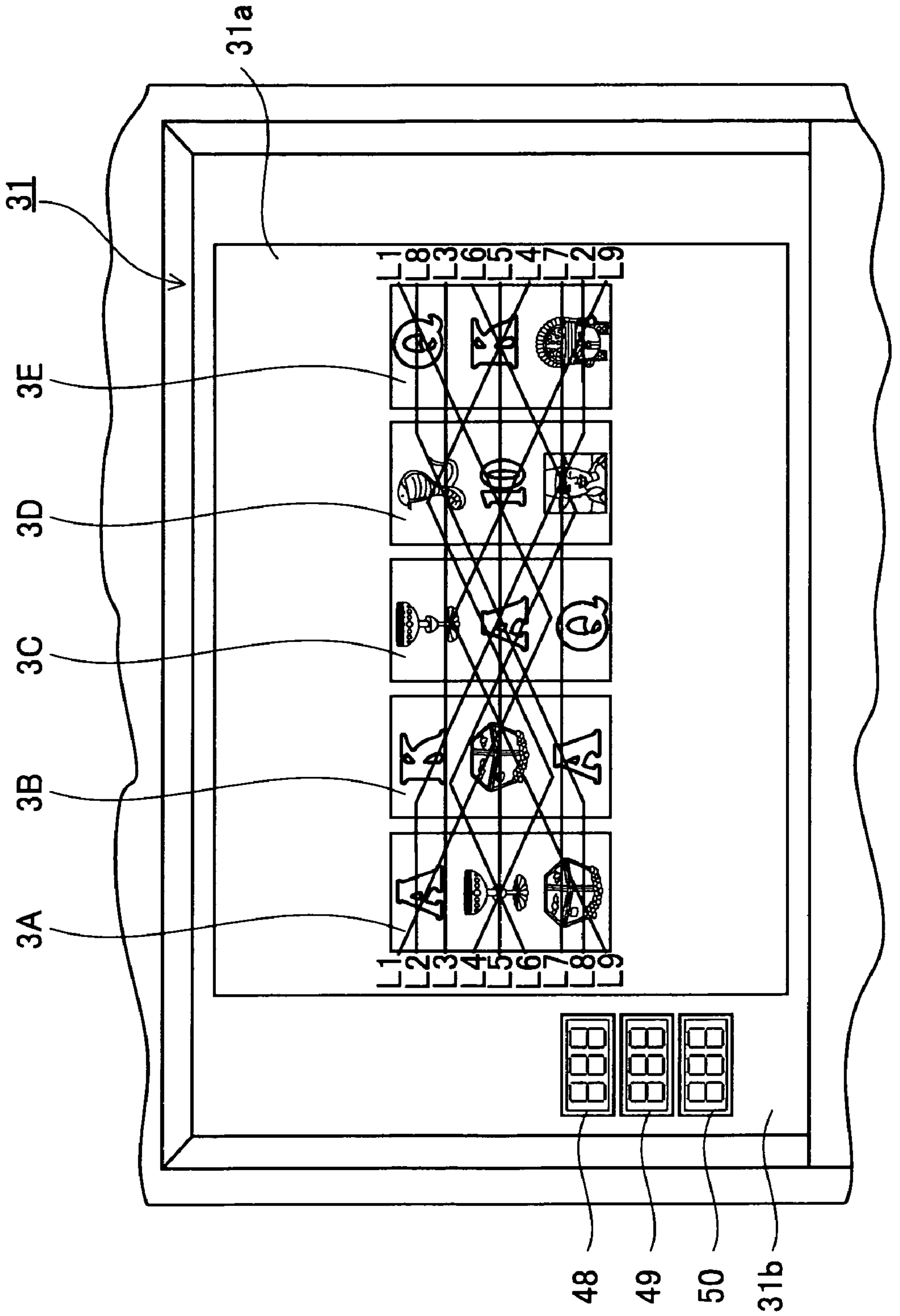
FIG. 4 is an enlarged front view which shows an enlarged view of the display region of the slot machine according to the embodiment of the present invention.

FIG. 4 is an enlarged view which shows the display region of the slot machine 13. The liquid crystal display 30 of the slot machine 13 includes a front panel 31 and the transparent liquid crystal panel 34 (see FIGS. 6 and 7) provided to the rear face of the front panel 31. The front panel 31 comprises a transparent display screen 31*a* and a design formation area 31*b* where designs have been formed. Such an arrangement allows the player to visually confirm the image information displayed on the transparent liquid crystal panel 34 provided to the rear face of the front panel 31 through the display screen 31*a* of the front face 31. On the other hand, let us consider a case in which the region of the aforementioned transparent liquid crystal panel 34 is in the transparent mode. In this case, such an arrangement allows each of the symbols on the five mechanical reels 3A through 3E provided on the rear side of the transparent liquid crystal panel 34 to be visually confirmed through the display screen 31*a*. On the other hand, let us consider an arrangement in which the slot machine 13 comprises video reels. With such an arrangement, the transparent liquid crystal panel 34 in an opaque state may display the reels in the form of an image. Also, an ordinary liquid crystal panel may be employed instead of the transparent liquid crystal panel 34.

Furthermore, various kinds of display units, i.e., a payout display unit 48, a credit amount display unit 49, and a BET amount display unit 50, are provided on the left side of the rear face the liquid crystal display 30. Note that the design formation area 31*b* of the front panel 31 is formed having a transparent portion that covers the top faces of these display units 48 through 50, thereby allowing the player to visually confirm the contents displayed on the aforementioned display units 48 through 50.

The slot machine 13 has the nine lines L1 through L9 for providing awards as shown in FIG. 4. Each of the lines L1 through L9 for providing awards is formed such that it extends so as to pass through one of the symbols for each of the mechanical reels 3A through 3E when the rotation of all the five reels 3A through 3E has stopped, or when the five video reels have stopped.

Upon pushing the aforementioned BET switch 23 once, the line L3 for providing a third award, the line L5 for providing a fifth award, and the line L7 for providing a seventh award, are set to be active pay lines, and one coin is input as a credit medal, for example.

Furthermore, upon pushing the aforementioned BET switch 23 twice, the line L1 for providing a first award, the line L4 for providing a fourth award, and the line L8 for providing an eighth award, are set to be active pay lines, in addition to the aforementioned three lines, and two coins are input as credit medals, for example.

Furthermore, upon pushing the aforementioned BET switch 23 three times, the line L2 for providing a second award, the line L6 for providing a sixth award, and the line L9 for providing a ninth award, are set to be active pay lines, in addition to the aforementioned six lines, and three coins are input as credit medals, for example.

The game available in the present embodiment is a basic game in which a predetermined set of symbols are made along the active pay lines. In a case that a predetermined condition has been satisfied in the basic game, the game is switched to the second game with coins paid out in the basic game according to a predetermined condition.

The payout display unit 48 is a component for displaying the amount of the coins paid out when a particular combination of the symbols has been displayed along any one the active pay lines for providing an award. The credit amount display unit 49 is a component for displaying the amount of the coins retained in the slot machine 13 in the form of a credit. The BET amount display unit 50 is a component for displaying the BET amount which is the number of coins bet on the aforementioned active pay lines. Each of the display units 48 through 50 comprises a segment display device. Alternatively, each of the display units 48 through 50 may be displayed on the transparent liquid crystal panel 34 in the form of an image.

Figure 5:
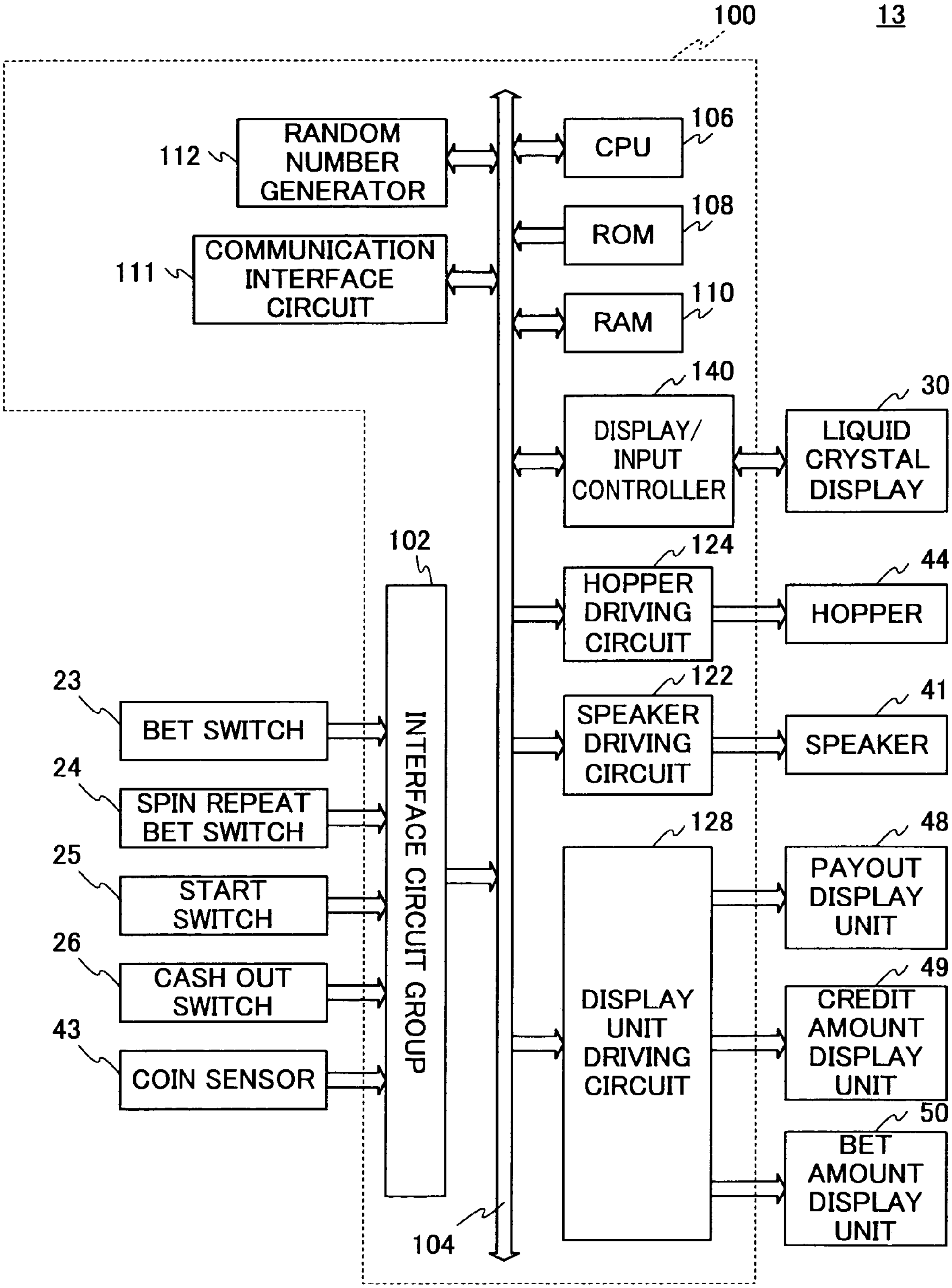
FIG. 5 is a block diagram which shows an electrical configuration of a controller of a video reel slot machine according to the embodiment of the present invention.

FIG. 5 is a block diagram which shows an electrical configuration of a controller 100 of the slot machine 13 including the video reels. Note that description will be made later regarding the slot machine 13 including the mechanical reels with reference to FIG. 8. As shown in FIG. 5, the controller 100 of the slot machine 13 is a micro computer, and includes an interface circuit group 102, an input/output bus 104, a CPU 106, ROM 108, RAM 110, a communication interface circuit 111, a random number generator 112, a speaker driving circuit 122, a hopper driving circuit 124, a display unit driving circuit 128, and a display/input controller 140.

The interface circuit group 102 is connected to the input/output bus 104. The input/output bus 104 performs input/output of data signals or address signals to/from the CPU 106.

Furthermore, the start switch 25 is connected to the interface circuit group 102. The start signal output from the start switch 25 is converted into a predetermined signal by the interface circuit group 102, and the input signal thus converted is supplied to the input/output bus 104.

Furthermore, the BET switch 23, the spin repeat bet switch 24, and the cash out switch 26 are connected to the interface circuit group 102. Each of the switching signals output from these switches 23, 24, and 26 is also supplied to the interface circuit group 102, and is converted into a predetermined signal by the interface circuit group 102. The switching signals thus converted are supplied to the input/output bus 104.

Furthermore, a coin sensor 43 is connected to the interface circuit group 102. The coin sensor 43 is a sensor for detecting the coin inserted into the coin insertion opening 22. The coin sensor 43 is provided in combination with the coin insertion opening 22. The sensing signal output from the coin sensor 43 is also supplied to the interface circuit group 102, and is converted into a predetermined signal by the interface circuit group 102. The sensing signal thus converted is supplied to the input/output bus 104.

The ROM 108 and the RAM 110 are connected to the input/output bus 104.

Upon reception of the basic game start operation instruction input through the start switch 25, which serves as a trigger, the CPU 106 reads out a basic game program, and executes the basic game. The basic game program has been programmed so as to instruct the CPU 106 to perform the following operation. That is to say, according to the basic game program, the CPU 106 displays an image of the five video reels commencing to scroll the symbols on the five video reels on the liquid crystal display 30 via the display/input controller 140. Then, the CPU 106 displays an image of the five video reels stopping such that the combination of the symbols on these five video reels is rearranged, whereupon a new combination of the symbols is made along the active pay lines. In a case that a particular combination of the symbols for providing an award has been made along any one of the active pay lines when they are stationary, the CPU 106 pays out a predetermined amount of coins corresponding to the particular combination for providing the award.

Furthermore, the CPU 106 controls the second game. With such an arrangement, in a case that a predetermined condition has been satisfied after the five video reels have been stopped, the CPU 106 transmits a signal for executing the second game.

The ROM 108 stores: a control program for central control of the slot machine 13; a program for executing a routine shown in FIG. 17, FIGS. 18A through 18D, and FIG. 19 (which will be referred to as the "routine execution program" hereafter); initial data for executing the control program; and various data tables used for determination processing. Note that the routine execution program includes the aforementioned basic game program etc. On the other hand, examples of the data tables include tables such as those shown in FIGS. 14 and 15. The RAM 110 temporarily stores flags, variables, etc., used for the aforementioned control program.

Furthermore, a communication interface circuit 111 is connected to the input/output bus 104. The communication interface circuit 111 is a circuit for communicating with the central controller 14 etc., via the network 12 including various kinds of networks such as a LAN. With the present embodiment, in a case that a predetermined condition has been satisfied in the basic game, the CPU 106 switches the game to the second game. In this case, the CPU 106 transmits the second game start signal to the central controller 14 etc., via the communication interface circuit 111. Furthermore, the CPU 106 receives data necessary for displaying the BET screen 70 from the central controller 14 via the communication interface circuit 111, and displays the image thus received on the liquid crystal display 30 as the image of the BET screen 70. Subsequently, with the liquid crystal display 30, the slot machine 13 serves as a terminal which allows the player to place a bet on the second game.

Furthermore, the random number generator 112 for generating a random number is connected to the input/output bus 104. The random number generator 112 generates a random number in a predetermined range, e.g., a range between 1 and 65535 ($2^{16}-1$). Alternatively, an arrangement may be made in which the CPU 106 generates a random number by computation.

Furthermore, the display unit driving circuit 128 for driving each of the aforementioned display units 48 through 50 is connected to the input/output bus 104. The CPU 106 controls the operation of each of the aforementioned display units 48 through 50 via the display unit driving circuit 128 according to occurrence of a predetermined event.

Furthermore, the speaker driving circuit 122 for driving the speaker 41 is connected to the input/output bus 104. The CPU 104 reads out the sound data stored in the ROM 108, and transmits the sound data thus read out to the speaker driving circuit 122 via the input/output bus 104, thereby providing sound effects generated by the speaker 41.

Furthermore, the hopper driving circuit 124 for driving the hopper 44 is connected to the input/output bus 104. Upon reception of a cash out signal input from the cash out switch 26, the CPU 106 transmits a driving signal to the hopper driving circuit 124 via the input/output bus 104. As a result, the hopper 44 pays out an amount of coins corresponding to the credit remaining at the current point in time, as stored in a predetermined memory area of the RAM 110.

Furthermore, the display/input controller 140 is connected to the input/output controller 140. The CPU 106 creates an image display command corresponding to the state and results of the game, and outputs the image display command thus created to the display/input controller 140 via the input/output bus 104. Upon reception of the image display command input from the CPU 106, the display/input controller 140 creates a driving signal for driving the liquid crystal display 30 according to the image display command thus input, and outputs the driving signal thus created to the liquid crystal display 30. As a result, a predetermined image is displayed on the transparent liquid crystal panel 34 of the liquid crystal display 30. The display/input controller 140 transmits the signal input through the touch panel 32 provided on the liquid crystal display 30 to the CPU 106 via the input/output bus 104 in the form of an input signal.

Figure 6:
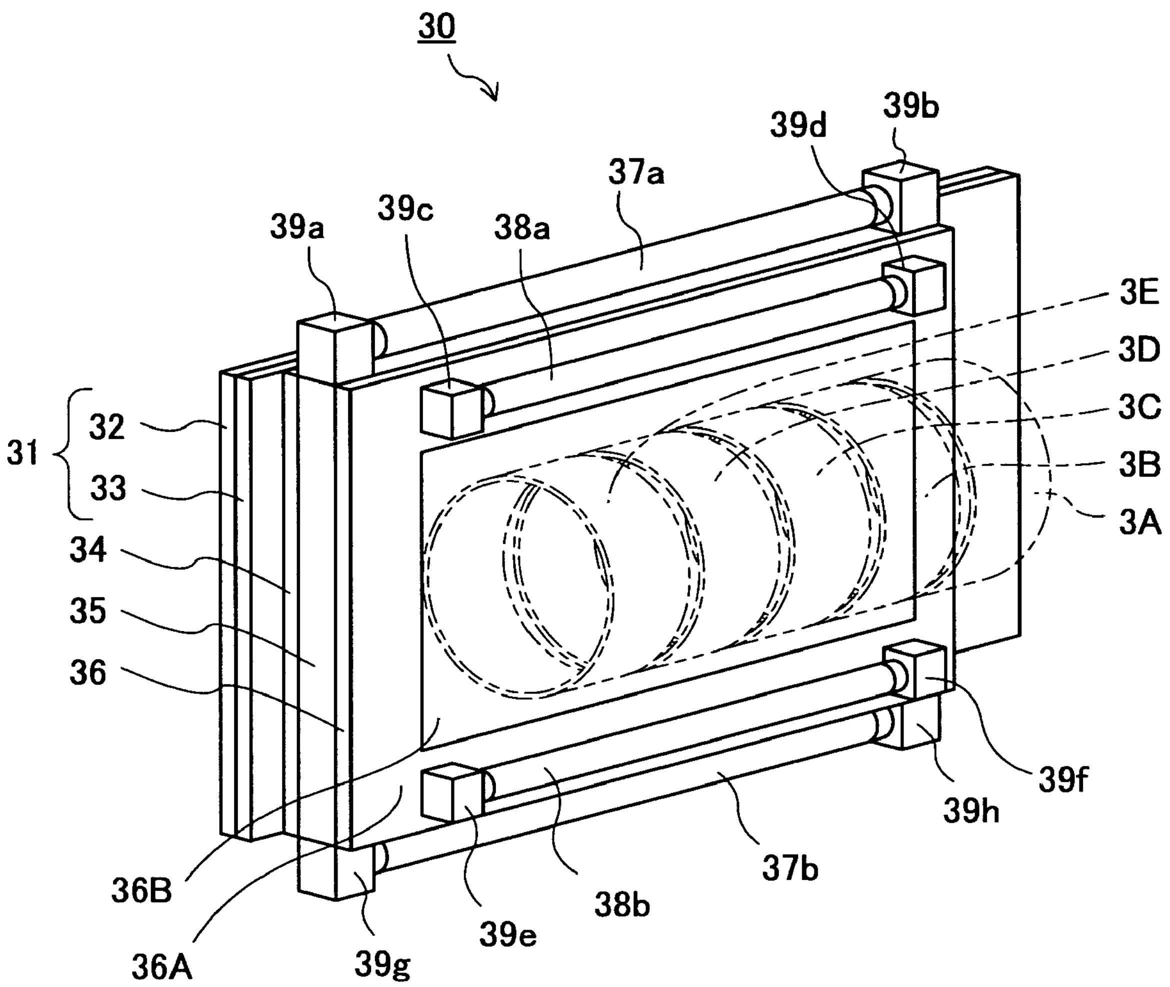
FIG. 6 is a perspective view which shows a schematic configuration of a liquid crystal display of the slot machine according to the embodiment of the present invention as viewed from the rear side.
Figure 7:
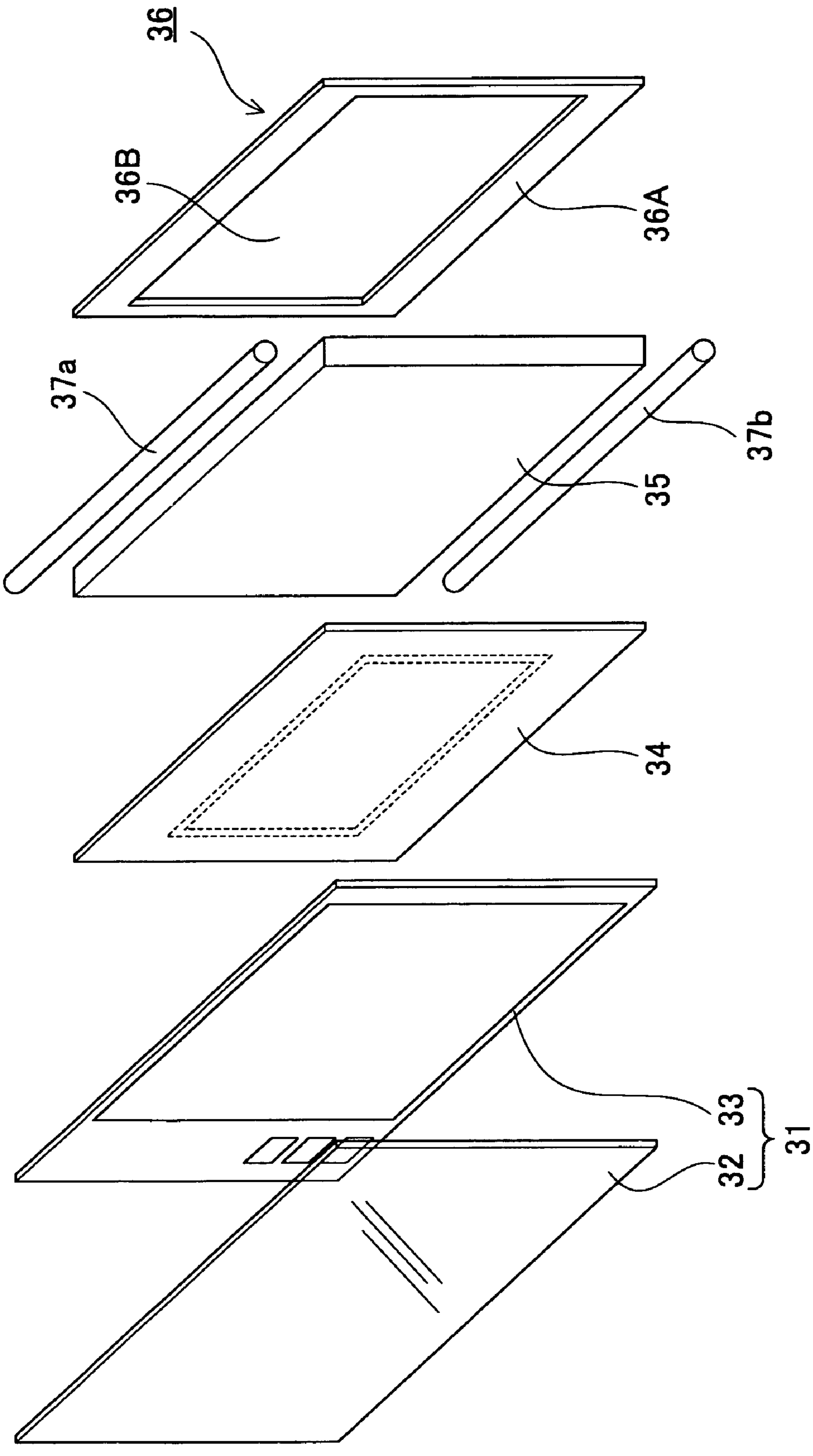
FIG. 7 is a disassembled perspective view which shows a part of the configuration of the liquid crystal display shown in FIG. 6.

FIGS. 6 and 7 are diagrams which show the configuration of the liquid crystal display 30 of the slot machine 13. The liquid crystal display 30 displays game images for the basic game and the second game. Accordingly, the liquid crystal display 30 comprises: the front panel 31 including the touch panel 32 and a display plate 33; the transparent liquid crystal panel 34; a light introducing plate 35; a reflecting film 36; fluorescent lamps 37a, 37b, 38a, and 38b, each of which is a so-called white light source; lamp holders 39a, 39b, 39c, 39d, 39*e*, 39*f*, 39*g*, and 39*h*; and a table carrier package (TCP) on which liquid crystal driving ICs have been mounted. While the structure of the TCP is not shown in either particular in FIG. 6 or FIG. 7, the TCP formed of a flexible substrate (not shown) is connected to the terminal of the transparent liquid crystal panel 34.

The liquid crystal display 30 is provided at a position forward of the display regions of mechanical reels 3A through 3E (forward of the display screen 31*a*) such that it covers the mechanical reels 3A through 3E. Here, the mechanical reels 3A through 3E and the liquid crystal display 30 are provided with predetermined intervals. On the other hand, let us consider an arrangement employing the video reels. With such an arrangement, an image of the reels is displayed on the liquid crystal display 30, instead of the mechanical reels 3A through 3E.

The touch panel 32 is formed of a transparent member. The display plate 33 has designs or the like formed at positions corresponding to the regions between the aforementioned display units 48 through 50. That is to say, the region of the display plate 33 where the designs or the like have been formed serves as the design formation area 31*b*. On the other hand, the region of the display plate 33 where no design or the like has been formed serves as the display screen 31*a* of the front panel 31 (see FIG. 4). Alternatively, an arrangement may be made in which the design formation area 31*b* is not formed on the front panel 31, and the entire area of the front panel 31 serves as the display screen 31*a*. With such an arrangement, there may be no design formed on the display plate 33. Alternatively, the display plate 33 may be eliminated.

Note that an electric circuit or the like is provided for operating the display units 48 through 50 disposed on the rear face side of the display plate 33, which is not shown in FIG. 6 and in FIG. 7.

The transparent liquid crystal panel 34 has a structure in which a transparent substrate such as a glass substrate, upon which a thin film transistor is formed, and another transparent substrate are mounted so as to face with each other with a certain gap between them, and the gap between the substrates is filled with a liquid crystal. The display mode of the liquid crystal panel 34 is set to be normally white. The term "normally white" as used here represents a mode in which the liquid crystal panel display a white image (i.e., allows the player to visually confirm the light passing through the liquid crystal panel toward the side of the display screen) in the state in which the liquid crystal is not driven. As described above, with the present embodiment, the transparent liquid crystal panel 34 is set to be normally white state. Such an arrangement allows the player to visually confirm the symbols on the mechanical reels 3A through 3E in a stage when they are in motion and a stage when they are stationary, even if a situation arise in which the liquid crystal cannot be driven, thereby allowing the player to continue the game even if such a situation has occurred. That is to say, even in a case that such an accident has occurred, the player can play the basic game in which predetermined sets of the symbols are made along the active pay lines.

The light introducing plate 35 introduce the light emitted from the fluorescent lamps 37*a* and 37*b* to the transparent liquid crystal panel 34 (In other words, the transparent liquid crystal panel 34 is illuminated). The light introducing plate 35 is provided on the rear face side of the transparent liquid crystal panel 34, and is formed of a transparent member (having a light introducing function) such as acrylic resin or the like, with a thickness of around 2 cm.

The reflecting film 36 has a structure in which an evaporated silver film is formed on a white polyester film or an aluminum thin film. The reflecting film 36 reflects the light introduced via the light introducing plate 35 toward the front side of the light introducing plate 35. The reflecting film 36 comprises a reflecting region 36A and a non-reflecting region (transmissible region) 36B. Here, the non-reflecting region 36B is formed of a transparent member, and is provided to the region of the front panel 31 that covers the front face of the mechanical reels 3A through 3E.

The fluorescent lamps 37*a* and 37*b* are respectively disposed along the upper end and the lower end of the light introducing plate 35, with the ends of the fluorescent lamp 37*a* held by the lamp holders 39*a* and 39*b*, and the ends of the fluorescent lamp 37*b* held by the lamp holders 39*g* and 39*h*. The light emitted from the fluorescent lamps 37*a* and 37*b* are reflected by the reflecting region 36A of the reflecting film 36, thereby illuminating the transparent liquid crystal panel 34. On the other hand, the fluorescent lamps 38*a* and 38*b* are provided at an upper position and a lower position on the rear side of the reflecting film 36 such that they face the mechanical reels 3A through 3E, with the ends of the fluorescent lamp 38*a* held by the lamp holder 39*c* and 39*d*, and the ends of the fluorescent lamp 38*b* held by the lamp holder 39*e* and 39*f*. The light emitted from these fluorescent lamps 38*a* and 38*b* is reflected by the surfaces of the mechanical reels 3A through 3E, and is input to the non-reflecting region 36*b*, thereby illuminating the transparent liquid crystal panel 34. As described above, with the liquid crystal display 30, the transparent liquid crystal panel 34 is illuminated by the light which is emitted from the fluorescent lamps 37*a* and 37*b* and which is reflected by the reflecting region 36A of the reflecting film 36, and by the light which is emitted from the fluorescent lamps 38*a* and 38*b*, which is reflected by the surfaces of the mechanical reels 3A through 3E, and which is input to the non-reflecting region 36B. Accordingly, the region of the liquid crystal display 30 that corresponds to the non-reflecting region 36B of the reflecting film 36 has a function of switching its state between a transparent state and an opaque state according to whether or not the liquid crystal is being driven. On the other hand, the region of the liquid crystal display 30 that corresponds to the reflecting region 36A of the reflecting film 36 remains in the opaque state regardless of whether or not the liquid crystal is being driven.

Description is being made regarding the slot machine 13 in which a part of the display screen of the liquid crystal display 30 has a function of switching its state between a transparent state and an opaque state. Also, an arrangement may be made in which the entire area of the display screen of the liquid crystal display 30 has a function of switching its state between a transparent state and an opaque state. With such an arrangement in which the entire area of the display screen of the liquid crystal display 30 has a function of switching its state between a transparent state and an opaque state, the reflecting film 36 is formed of the non-reflecting region 36B alone. Alternatively, the reflecting film 36 may be eliminated.

Figure 8:
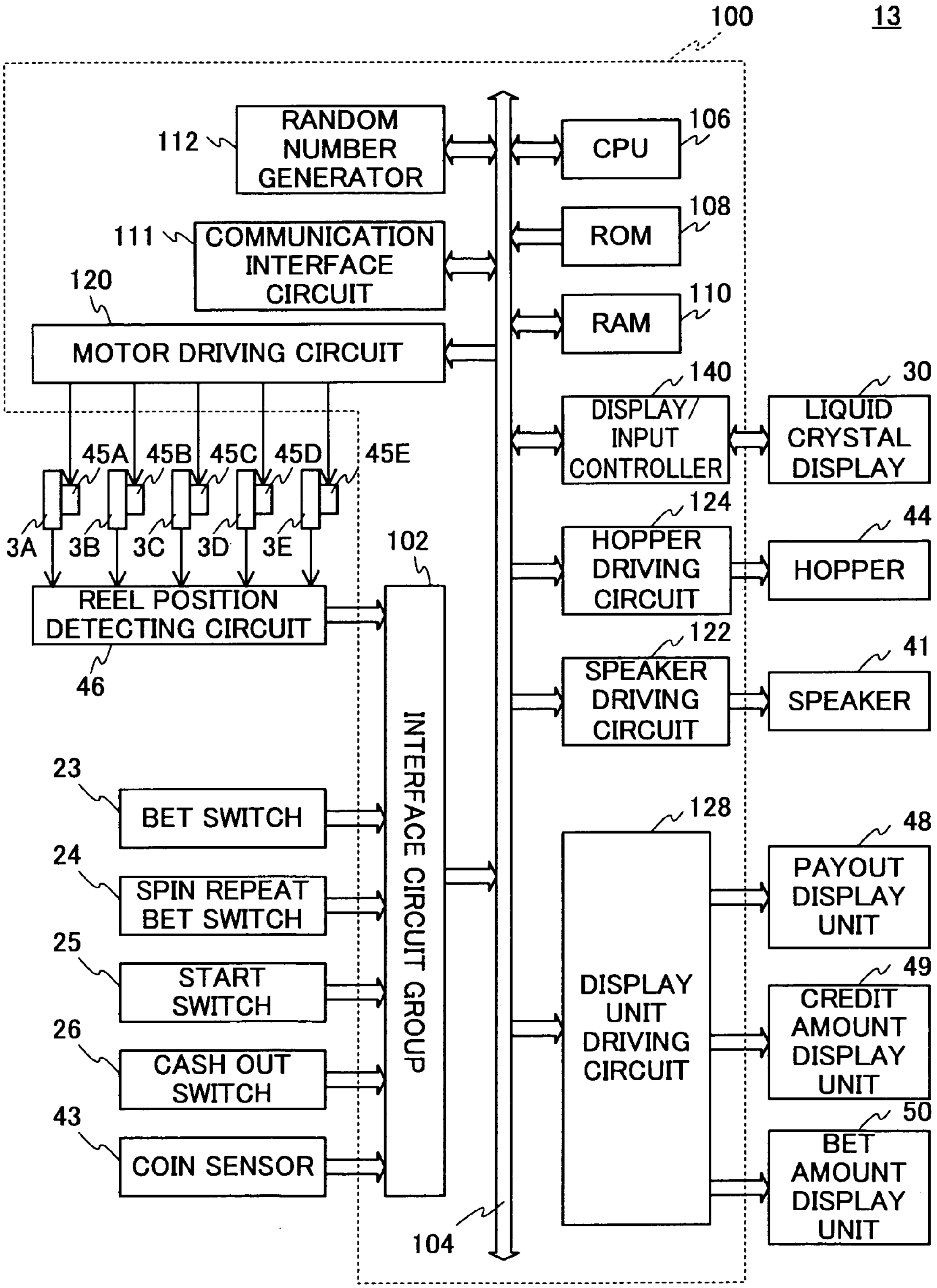
FIG. 8 is a block diagram which shows an electrical configuration of a controller of a mechanical reel slot machine according to the embodiment of the present invention.

FIG. 8 is a block diagram which shows an electrical configuration of the controller 100 of the slot machine 13 for controlling the mechanical reels. As shown in FIG. 8, the controller of the slot machine 13 is a micro computer, and includes the interface circuit group 102, the input/output bus 104, the CPU 106, the ROM 108, the RAM 110, the communication interface circuit 111, the random number generator 112, the motor driving circuit 120, the speaker driving circuit 122, the hopper driving circuit 124, the display unit driving circuit 128, and the display/input controller 140. Note that the aforementioned controller 100 has the same configuration as that for controlling the video reels described with reference to FIG. 5, except for a part of the configuration. Accordingly, description will be made regarding only that which differs from an arrangement for controlling the video reels described with reference to FIG. 5.

A reel position detecting circuit 46 is connected to the interface circuit group 102. The reel position detecting circuit 46 is a circuit for detecting the rotational position for each of the mechanical reels 3A through 3E based upon the pulse signals received from a reel rotational position sensor (not shown). The detection signal output from the reel position detecting circuit 46 is also supplied to the interface circuit group 102, and is converted into a predetermined signal by the interface circuit group 102. The detection signal thus converted is supplied to the input/output bus 104.

Upon reception of the basic game start operation instruction input through the start switch 25, which serves as a trigger, the CPU 106 reads out a basic game program, and executes the basic game. The basic game program has been programmed so as to instruct the CPU 106 to perform the following operation. That is to say, according to the basic game program, the CPU 106 instructs each of the stepping motors 45A through 45E so as to rotate all the mechanical reels 3A through 3E, thereby commencing the scrolling of the symbols on the reels 3A through 3E. After a period of time has elapsed, the CPU 106 stops the driving of the stepping motors 45A through 45E so as to stop the rotation of all the mechanical reels 3A through 3E, whereupon a new combination of the symbols is made along the active pay lines. In a case that a particular combination of the symbols for providing an award has been made along any one of the active pay lines when they are stationary, the CPU 106 pays out a predetermined amount of coins corresponding to the particular combination for providing the award.

Furthermore, the CPU 106 controls the second game. With such an arrangement, in a case that a predetermined condition has been satisfied after the symbols on all the mechanical reels 3A through 3E have been displayed in the stationary state, the CPU 106 transmits a signal for executing the second game.

Furthermore, a motor driving circuit 120 for driving the stepping motors 45A through 45E is connected to the input/output bus 104. Upon an occurrence of a predetermined event, the CPU 106 controls the operation of the stepping motors 45A through 45E via the motor driving circuit 120.

Figure 9:
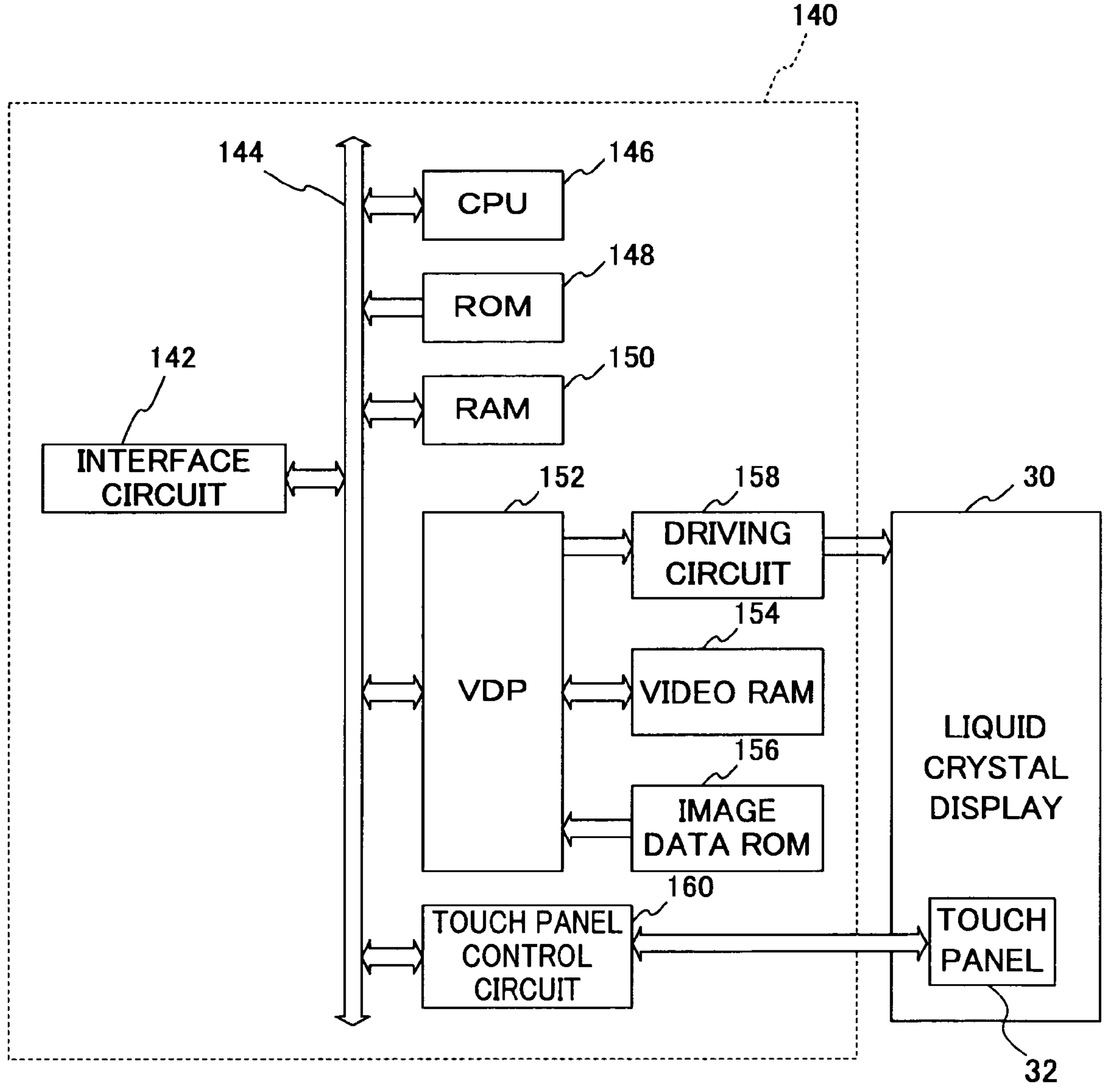
FIG. 9 is a block diagram which shows an electrical configuration of a display/input controller of the slot machine according to the embodiment of the present invention.

FIG. 9 is a block diagram which shows an electrical configuration of the display/input controller 140 of the slot machine 13. The display/input controller 140 of the slot machine 13 is a sub-microcomputer for performing image display processing and input control for the touch panel 32. The display/input controller 140 comprises an interface circuit 142, an input/output bus 144, a CPU 146, ROM 148, RAM 150, a VDP 152, video RAM 154, image data ROM 156, a driving circuit 158, and a touch panel control circuit 160.

The interface circuit 142 is connected to the input/output bus 144. The image display command output from the CPU 106 of the aforementioned controller 100 is supplied to the input/output bus 144 via the interface circuit 142. The input/output bus 144 performs input/output of data signals or address signals to/from the CPU 146.

Furthermore, the ROM 148 and the RAM 150 are connected to the input/output bus 144. The ROM 148 stores a display control program for generating a driving signal, which is to be supplied to the liquid crystal display 30, according to an image display command received from the CPU 106 of the aforementioned controller 100. On the other hand, the RAM 150 stores flags and variables used in the aforementioned display control program.

Furthermore, the VDP 152 is connected to the input/output bus 144. The VDP 152 includes a so-called sprite circuit, a screen circuit, a palette circuit, etc., and can perform various kinds of processing for displaying images on the liquid crystal display 30. With such an arrangement, the components connected to the DVP 152 include: the video RAM 154 for storing image data according to the image display command received from the CPU 106 of the aforementioned controller 100; and the image data ROM 156 for storing various kinds of image data including the aforementioned image data for visual effects etc. Furthermore, the driving circuit 158 for outputting a driving signal for driving the liquid crystal display 30 is connected to the VDP 152.

The aforementioned CPU 146 instructs the video RAM 154 to store the image data which is to be displayed on the liquid crystal display 30 according to the image display command received from the CPU 106 of the aforementioned controller 100 by reading out the display control program stored in the ROM 148 and by executing the program thus read out. Examples of the image display commands include various kinds of image display commands including the aforementioned image display commands for visual effects etc.

The image data ROM 156 stores various kinds of image data including the aforementioned image data for visual effects etc.

The touch panel control circuit 160 transmits the signals input via the touch panel 32 provided on the liquid crystal display 30 to the CPU 106 via the input/output bus 144 in the form of an input signal.

Figure 10:
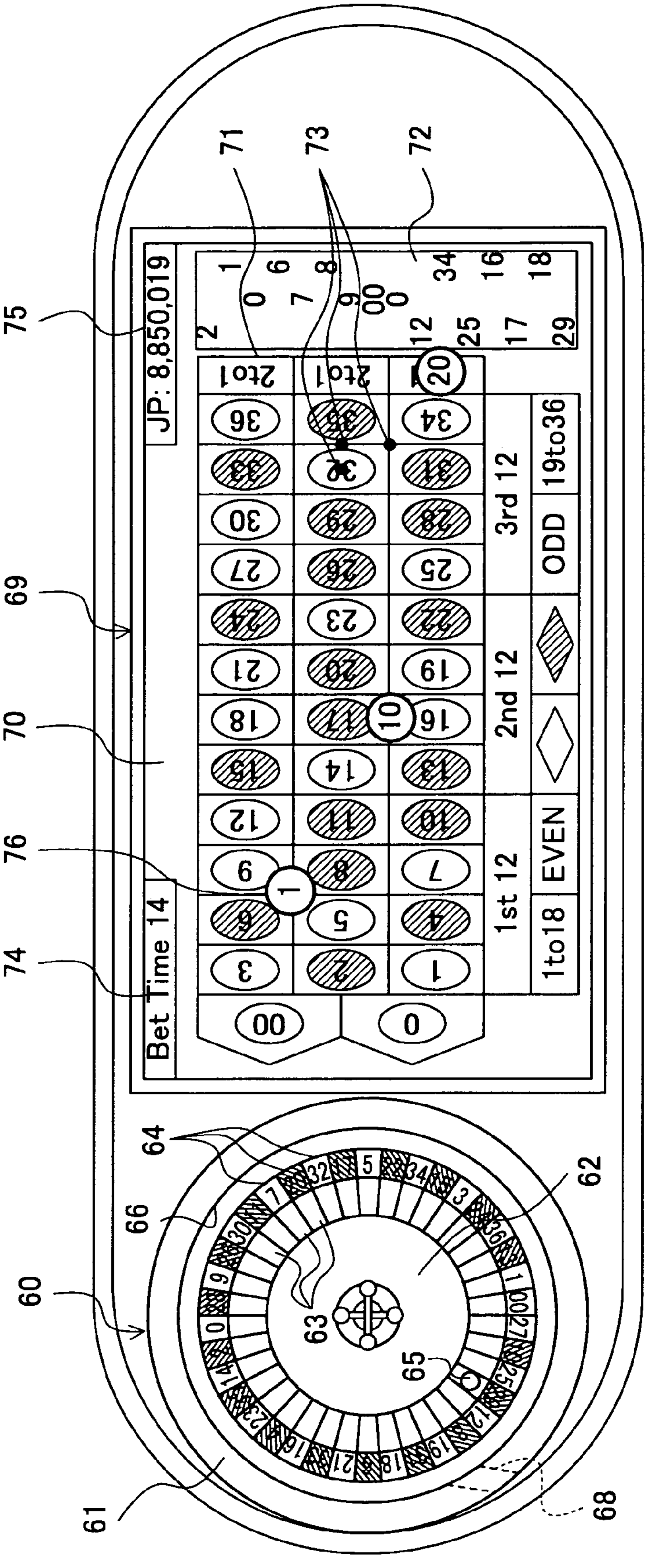
FIG. 10 is a plan view which shows a second game device according to the embodiment of the present invention.

FIG. 10 is a plan view which shows the second game device 11. As shown in FIG. 2, the second game device 11 principally comprises the roulette device 60 and the display 69 for displaying the BET screen 70, including the betting board 71 etc.

The roulette device 60 basically comprises a frame 61 fixed to the second game device 11 and a wheel 62 rotatably held and stored within the frame 61. Here, the wheel 62 has a number of number pockets 63 (a total of 38 number pockets in the present embodiment) formed in the shape of recesses on the upper face of the wheel 62. Furthermore, each of the number pockets 63 includes a number display plate 64, which display a number corresponding to the respective number pocket 63 in the form of a design, formed at the outer part of the respective number pocket 63 formed on the upper face of the wheel 62. Such numbers provided to the number pockets 63 include “0”, “00”, and “1” to “36”. In other words, a total of 38 number pockets 63 are formed on the wheel 62, each of which has a corresponding number provided from among the numbers “0”, “00”, and “1” to “36”.

Furthermore, a ball supply opening 68 is formed within the aforementioned frame 61. Here, a ball supply device (not shown) is connected to the ball supply opening 68, which allows a ball 65 to be supplied onto the wheel 62 from the ball supply opening 68 by driving the ball supply device. Furthermore, the entire area above the roulette board is covered with a transparent acrylic cover member 67 formed in a hemispherical shape (see FIG. 2).

Furthermore, a win determination device (not shown) is provided below the wheel 62. The win determination device is provided for determining which one of the number pockets 63 has received the ball 65. Furthermore, a ball collecting device (not shown) is provided below the wheel 62. The ball collecting device is provided for collecting the ball 65 remaining on the wheel 62 after the game. Note that the ball supply device, the win determination device, and the ball collecting device are known devices, and, accordingly, detailed description thereof will be omitted.

Here, the wheel 61 is formed such that it gently slopes downward toward the inner side, and has a guide wall 66 formed along an intermediate region. The guide wall 66 allows the ball 65 thus supplied to move around the roulette wheel while guiding the ball 65 against its centrifugal force. As the ball 65 loses its centrifugal force due to reduction in its rotational speed, the ball 65 rolls down along the slope of the frame 61, whereupon the ball 65 reaches the rotating wheel 62.

Then, the ball 65 rolling down to the rotating wheel 62 is received by any one among the number pockets 63 through the number display plate 64 provided to outer perimeter of the wheel 62. As a result, the ball 65 is retained in the number pocket 63, and the win determination device detects the number marked on the number display plate 64 that corresponds to the number pocket 63 that has retained the ball 65, thereby determining the winning number.

On the other hand, the display 69 for displaying the BET screen 70 including the betting board 71 is a liquid crystal display, for example. Upon the player betting a chip using a deposited credit by operating the slot machine 13 or the second game terminal 15 as described later, the chip thus bet is displayed. Note that the game media such as coins or the like for the slot machine 13 and the second game terminal 15 serves as a credit for the roulette game in the form of a chip. Note that description is being made regarding an arrangement in which the BET screen 70 is displayed on the display 69. Also, an arrangement may be made in which the BET screen 70 is displayed on a screen using a projector or the like installed on the ceiling such that it faces downward along the vertical direction, instead of the display 69. Such an arrangement permits the anticipation of visual effects that enable the BET screen 70 to be displayed with a greater realism, such as a visual effect in which the chip thus bet is displayed in a three-dimensional manner.

The betting board 71 displayed on the BET screen 70 on the display 69 has numbers that match the 38 kinds of numbers "0", "00", and "1" to "36" which are displayed in the form of a matrix. Furthermore, special BET areas 73, which allow the player to bet on "odd numbers", "even numbers", "the color of the number display plate 64 (red or black)", "a predetermined range of the numbers (e.g., "1" to "12")", are provided in the form of a matrix in the same way.

Furthermore, a result history display unit 72 is displayed on the right side of the betting board 71. The result history display unit 72 displays the results of the winning numbers of the past games up to and including the preceding game in the form of a list. The term "one game" as used here represents a series of stages from a stage in which the player places bets via the slot machine 13 or the second game terminal 15, up to a stage in which a credit is paid out according to the winning number after the ball 65 has dropped in the number pocket 63. With such an arrangement, upon completion of one game, a new winning number is added to the top field of the list, which has the capacity to allow the players to confirm the history of the winning numbers of a maximum of 16 games.

With such an arrangement, upon the player betting a chip using the slot machine 13 or the second game terminal 15, the chip thus bet is put in the BET area 73 (in any one of the squares, each of which has a respective number or mark, or on one of the lines defining the squares).

Furthermore, a BET time display unit 74 is provided at an upper portion of the betting board 71. The BET time display unit 74 displays time remaining during which the player can place bets. For example, the BET time display unit 74 displays the time remaining "30" at the time of starting to receive the betting. Then, the time remaining displayed by the BET time display unit 74 is reduced in decrements of 1 for each second. Upon the time remaining becoming zero, the period for receiving bets expires. Furthermore, when the time remaining for receiving bets from the players at the slot machines 13 and the second game terminals 15 becomes 5 seconds, the ball 65 is supplied onto the roulette board by driving the ball supply device.

Furthermore, a JP display unit 75 for displaying the amount of the credit accumulated up to the current point in time is provided on the right side of the BET time display unit 74. Here, the JP display unit 75 displays the amount of the credit obtained as 0.5% of the accumulated credit bet via the total 12 slot machines and second game device controllers 15. In a case that a predetermined condition has been satisfied in a jackpot bonus game that occurs at a certain timing, the player wins in the jackpot bonus game, and the credit amount for the jackpot is paid out, whereupon the JP display unit 75 displays an initial value (e.g., 50,000 credits) after the payout.

Furthermore, chip marks 76 are displayed on the betting board 71, each of which indicates the amount of the chip and the BET area 73 on which the chip has been bet up to the current point in time. Here, the number displayed on the chip mark 76 represents the amount of the chip thus bet. For example, the "1" chip mark 76 located at the intersection of the lines that define the squares "5", "6", "8", and "9" indicates that one chip has been bet so as to cover the four numbers "5", "6", "8", and "9". Note that a method for placing a bet so as to cover four numbers as described above is referred to as "corner bet".

On the other hand, the "20" chip mark 76 located in the square "2 to 1" indicates that twenty chips have been bet so as to cover the twelve numbers "1", "4", "7", . . . , that form a column. Note that a method for placing a bet so as to cover twelve numbers by locating the chip in the square having a mark of "2 to 1" is referred to as a "column bet".

Examples of the other betting methods include: "straight bet" for placing a bet on only one number; "split bet" for placing a bet so as to cover two numbers by locating the chip on the line between the squares of the two numbers; a "street bet" for placing a bet so as to cover three numbers (e.g., "13", "14", and "15") by locating the chip at the edge of the row of the numbers (each row along the vertical direction in FIG. 10); a "five bet" for placing a bet so as to cover five numbers "0", "00", "1", "2", and "3" by locating the chip on the line between the squares of the numbers "00" and "3"; a "line bet" for placing a bet so as to cover six numbers (e.g., "13", "14", "15", "16", "17", and "18") by locating the chip at the end of the line between the two rows of the numbers (two rows along the vertical direction in FIG. 10); a "dozen bet" for placing a bet so as to cover twelve numbers by locating the chip at any one of the squares having respective marks of "1st 12", "2nd 12", and "3rd 12". In addition, examples of other betting methods include: a "red/black bet" for placing a bet on the color of the number display plate 64; an "even/odd bet" for placing a bet on whether the number is an odd number or an even number; and a "low/high bet" for placing a bet on whether the number is 18 or less, or is 19 or more, so as to cover eighteen numbers, using one of six squares provided the lower end of the betting board 71. Here, there is a difference in the amount of payout (payout rate) for each chip for the aforementioned betting methods, which is employed for the payout after the player has won the bet.

Figure 11:
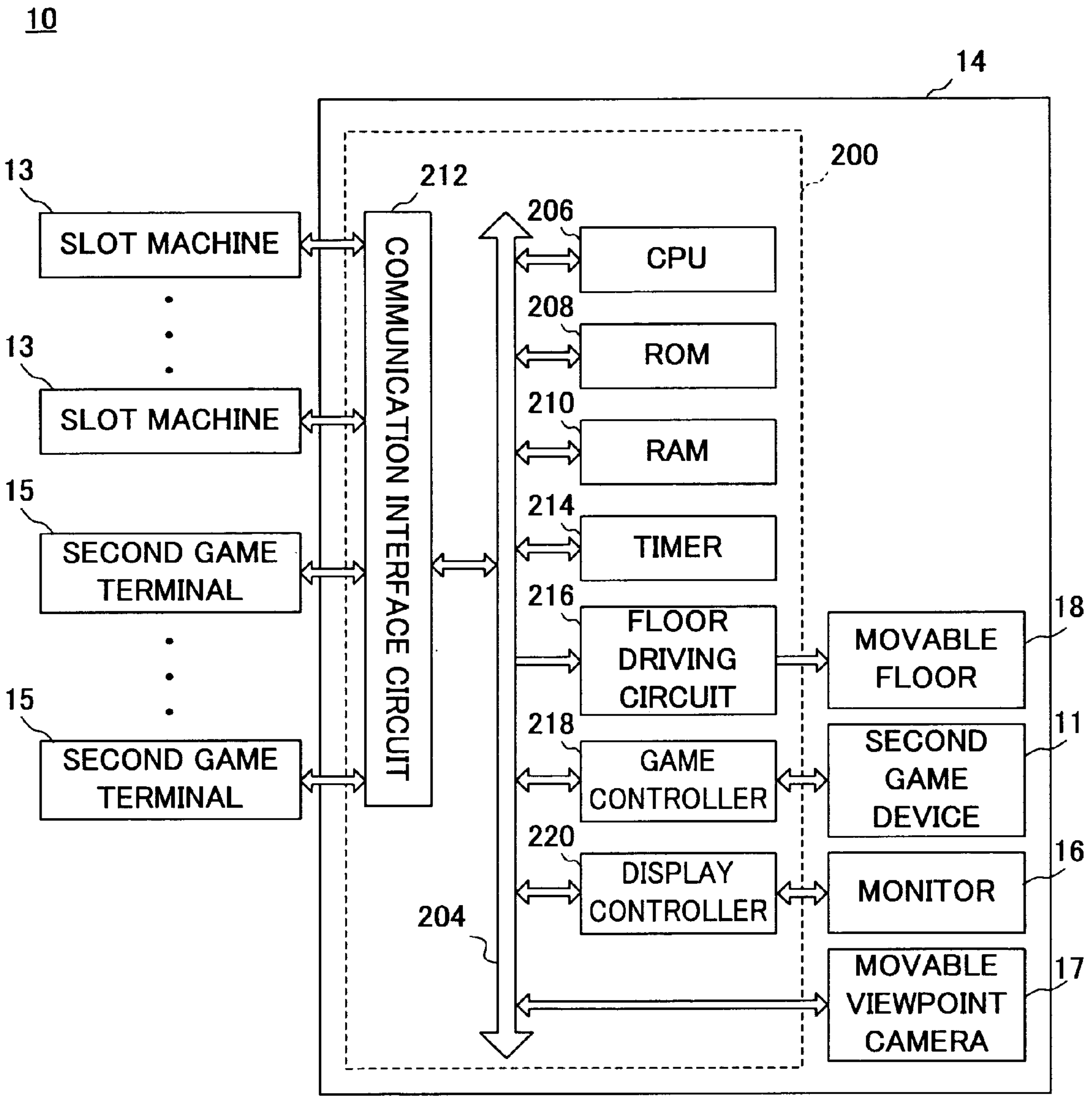
FIG. 11 is a block diagram which shows an electrical configuration of a central controller according to the embodiment of the present invention.

FIG. 11 is a block diagram which shows an electrical configuration of a controller 200 of the central controller 14.

As shown in FIG. 11, the central controller 14 comprises the controller 200 of the central controller 14 and several peripheral devices. Furthermore, the multiple slot machines (eight slot machines in the present embodiment) and the multiple second game terminals 15 (four second game terminals in the present embodiment) are connected to the central controller 14 via a communication interface circuit 212 of the central controller 14.

Furthermore, the controller 200 of the central controller 14 includes an input/output bus 204, a CPU 206, ROM 208, RAM 210, a communication interface circuit 212, a timer 214, a floor driving circuit 216, a game controller 218, and a display controller 220.

The ROM 208 and the RAM 210 are connected to the input/output bus 204.

The CPU 206 performs various kinds of processing according to an input signal supplied from each of the slot machines 13 and the second game terminals 15, and data and programs stored the ROM 208 and the RAM 210. Furthermore, the CPU 206 transmits command signals to the slot machines 13 and the second game terminals 15 based upon the results of the processing thus performed. Thus, the CPU 206 centrally controls each of the slot machines 13 and the second game terminals 15, thereby advancing the game. Furthermore, the input/output bus 204 is connected to the second game device 11 via the game controller 218. The CPU 206 drives unshown driving motors provided to the roulette device 60 of the second game device 11, thereby allowing the ball 65 to be supplied, and allowing the wheel 62 to be rotated. Furthermore, the CPU 206 controls the win determination device for identifying the position at which the ball 65 has dropped. This allows the winning number to be determined based upon the position at which the ball 65 has dropped. The CPU 206 makes a win determination for each bet chip based upon the winning number thus obtained, and the bet information transmitted from each of the slot machines 13 and the second game terminals 15. Furthermore, the CPU 206 calculates the credit amount which is to be paid out at each of the slot machines 13 and the second game terminals 15.

The ROM 208 comprises semiconductor memory or the like, for example. The ROM 208 stores a program for providing basic functions of the second game device 11, a program for providing the functions of the movable viewpoint cameras 17, a program for centrally controlling each of the slot machines 13 and the second game terminals 15. Examples of such programs include a program shown in FIGS. 18A through 18D. Furthermore, the ROM 208 stores the payout rate for the roulette game (the credit amount for each chip to be paid out to a winning player).

Specifically, the ROM 208 includes a payout credit storage area (not shown) for storing each payout rate with respect to the roulette game using the BET screen 70, which stores a payout table for the second game described later with reference to FIG. 16. Note that each payout rate corresponding to a respective BET area 73 of the BET screen 70 is determined beforehand and stored in the payout credit storage area. Examples of such payout rates include from "×2" to "×36", which are associated with the kind of betting method ("straight bet", "corner bet", "split bet", etc.).

On the other hand, the RAM 210 temporarily stores bet information with respect to the chip supplied from the slot machines 13 and the second game terminals 15, the winning number of the roulette device 60 determined by the win determination device, the amount of jackpot accumulated up to the current point in time, and the results of the processing executed by the CPU 206, etc.

Specifically, the RAM 210 includes: a bet information storage area for storing bet information with respect to the players who are playing; a winning number storage area for storing the winning number of the roulette device 60 determined by the win determination device; and a jackpot accumulation storage area (not shown) for storing the credit amount obtained as 0.5% of the accumulated credit amount which has been bet on the BET screen 70 (see FIG. 10). Note that, more specifically, the term "bet information" as used here represents the information with respect to the BET area 73 specified on the BET screen 70, the amount of chips thus bet (bet amount), and each bet placed using the slot machine 13 and the second game terminals 15.

The timer 214 for performing time measurement is connected to the input/output bus 204. The time information supplied from the timer 214 is transmitted to the CPU 206 via the input/output bus 204. The CPU 206 rotates the wheel 62 and supplies the ball 65 based upon the time information received from the timer 214.

Furthermore, the floor driving circuit 216 is connected to the input/output bus 204. Upon reception of a signal for starting the second game from the slot machine 13, the CPU 206 performs control so as to raise the movable floor 18 via the floor driving circuit 216. Also, upon reception of a signal for ending the second game from the slot machine 13, the CPU 206 performs control so as to lower the movable floor 18 via the floor driving circuit 216.

Furthermore, the display controller 220 is connected to the input/output bus 204. The CPU 206 performs various kinds of processing based upon the data and programs stored in the ROM 208 and the RAM 210. The CPU 206 controls the monitor 16 and captures images based upon the results of the processing thus performed.

Furthermore, the movable viewpoint cameras 17 are connected to the input/output bus 204. The CPU 206 performs various kinds of processing based upon the data and programs stored in the ROM 208 and the RAM 210. The CPU 206 controls the movable viewpoint cameras 17 and captures images based upon the results of the processing thus performed.

Figure 12:
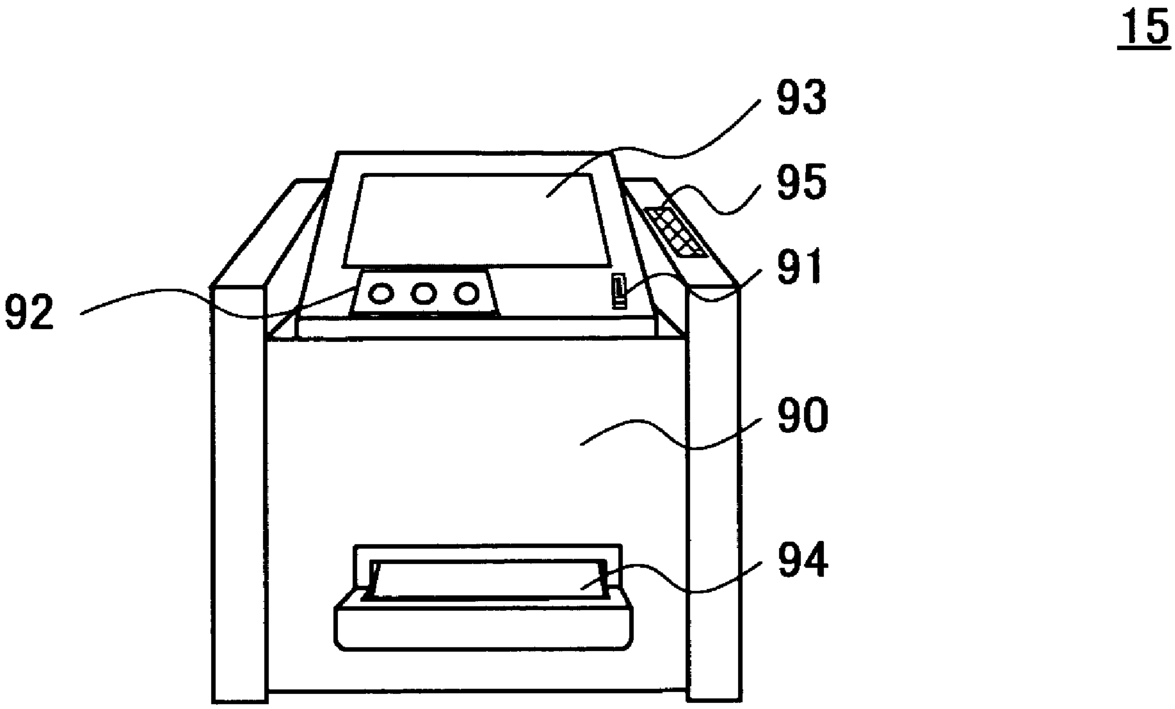
FIG. 12 is a perspective view which shows a second game terminal according to the embodiment of the present invention.

FIG. 12 is a perspective view which shows the second game terminal 15. As shown in FIG. 12, the second game terminal 15 includes at least: a coin insertion opening 91 which allows the player to insert a game medium such as a coin or the like; a control unit 92 comprising multiple control buttons etc., which allows the player to input instructions in a predetermined form; and a display 93 for displaying an image with respect to the game. The display 93 serves as a terminal which allows the player to place bets. Furthermore, such an arrangement allows the player to advance the game in progress by operating a touch panel 99, the control unit 92, etc., while viewing the image displayed on the display 93. Note that the game medium used at the second game terminal 15 is not restricted to coins.

Furthermore, a coin tray 94 is provided on the side wall of the cabinet 90 included in each second game terminal 15. Furthermore, a speaker 95 for providing music, sound effects, etc., is provided on the upper-right side of the display 93 of each second game terminal 15.

Furthermore, a coin sensor 314 (see FIG. 13) is provided within the coin insertion opening 91, which allows the game medium such as a coin thus inserted into the coin insertion opening 91 to be identified, and allows the coin to be counted. Furthermore, a hopper 319 (see FIG. 13) is provided within the coin tray 94, which allows a predetermined number of coins to be paid out from the coin tray.

As described above, the second game terminal 15 employing the touch panel 99 improves the ease of operability for the user. Thus, such an arrangement allows other players to comfortably participate in the roulette game using the second game terminals 15.

Figure 13:
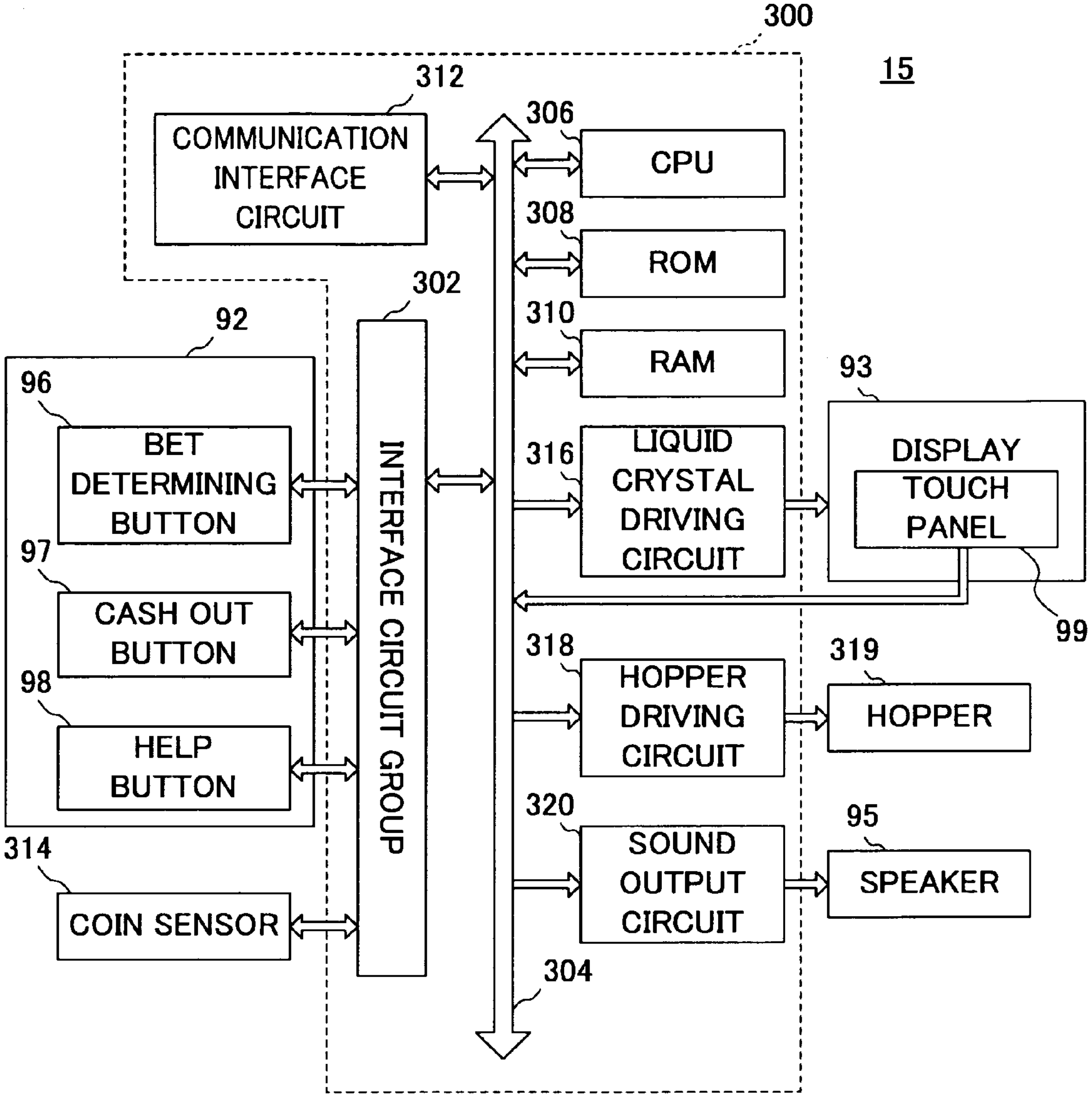
FIG. 13 is a block diagram which shows an electrical configuration of a controller of the second game terminal according to the embodiment of the present invention.

FIG. 13 is a block diagram which shows an electrical configuration of a controller 300 of the second game terminal 15. As shown in FIG. 13, the second game controller 15 comprises the controller 300 of the second game controller 15 and several peripheral devices.

The controller 300 includes an interface circuit group 302, an input/output bus 304, a CPU 306, ROM 308, RAM 310, a liquid crystal driving circuit 316, a hopper driving circuit 318, and a sound output circuit 320.

The interface circuit group 302 is connected to the input/output bus 304. The input/output bus 304 performs input/output of data signals or address signals to/from the CPU 306.

A BET determining button 96, a cash out button 97, and a help button 98, each of which is provided to the control unit 92 (see FIG. 12), are connected to the interface circuit group 302. The operation signal output from each of these buttons is converted into a predetermined signal by the interface circuit group 302, and the signal thus converted is supplied to the input/output bus 304. The CPU 306 performs control so as to execute various kinds of corresponding operations based upon the operation signals which are each output by pushing a corresponding button, and which are supplied via the input/output bus 304.

Furthermore, the coin sensor 314 is connected to the interface circuit group 302 connected to the controller 300 via the input/output bus 304. The coin sensor 314 detects the coins inserted into the coin insertion opening 91 (see FIG. 12), counts the coins thus inserted, and transmits the results to the CPU 306. Then, the CPU 306 increments the credit amount which has been deposited by the player, and which is stored in the RAM 310, according to the signal thus transmitted.

Furthermore, the ROM 308 and the RAM 310 are connected to the input/output bus 304.

The CPU 306 receives the command signals from the CPU 206 included within the controller 200 of the central controller 14 via the communication interface circuit 312 connected to the input/output bus 304. The CPU 306 controls the peripheral devices, which are components of the second game terminal 15, according to the command signals, thereby advancing the roulette game via the second game terminal 15. The CPU 306 performs various kinds of processing based upon the input signals supplied from the control unit 92 according to the operation instructions input by the player, and the data and the programs stored in the ROM 308 and the RAM 310, depending upon the type of processing. Then, the CPU 306 transmits a signal based upon the results to the CPU 206 included within the controller 200 of the aforementioned central controller 14 via the communication interface circuit 312, and controls the peripheral devices which are components of the second game terminal 15, thereby advancing the roulette game.

The ROM 308 comprises semiconductor memory or the like, for example. The ROM 308 stores a program for providing basic functions of the second game terminal 15, various kinds of programs, data tables, etc., necessary for controlling the second game terminal 15. Examples of such programs include a program shown in FIGS. 18A through 18D. On the other hand, the RAM 310 is memory for temporarily storing various kinds of data computed by the CPU 306, the credit amount deposited by the player at the current point in time (credit amount deposited in the second game terminal 15), the state of the chips bet by the player, etc.

Furthermore, the hopper driving circuit 318 is connected to the input/output bus 304. The hopper 319 connected to the controller 300 via the hopper driving circuit 318 pays out a predetermined number of coins from the coin tray 94 (see FIG. 12) according to a command signal received from the CPU 306.

Furthermore, the display 93 is connected to the input/output bus 304 via the liquid crystal driving circuit 316. Here, the liquid crystal driving circuit 316 comprises program ROM, image ROM, an image control CPU, a working RAM, a VDP (video display processor), video RAM, etc., which are not shown. Here, the program ROM stores an image control program with respect to the display functions of the display 93, and various kinds of selection tables. On the other hand, the image ROM stores dot data for creating an image to be displayed on the display 93, for example. On the other hand, the image control CPU determines an image to be displayed on the display 93 from among the dot data sets stored beforehand in the image ROM according to the image control program stored beforehand in the program ROM based upon the parameters set by the CPU 306. On the other hand, the working RAM is configured so as to serve as temporary storage means, which are used by the image control CPU for executing the aforementioned image control program. On the other hand, the VDP is a component for creating an image that accords with the display contents determined by the image control CPU, and for outputting the image thus created to the display 93. Note that the video RAM is configured as temporary storage means used by the VDP for creating an image.

Furthermore, the touch panel 99 is mounted to the front face of the display 93 as described above. The operation information input via the touch panel 99 is transmitted to the CPU 306 via the input/output bus 304. The touch panel 99 allows the player to place chip bets while viewing the BET screen 70 displayed on the display 93 as described later with reference to FIG. 23. Specifically, selection of the BET area 73, operation of the BET unit button 77, etc., described later, are performed by operating the touch panel 99, and the information is transmitted to the CPU 306. Then, the RAM 310 stores the current player bet information (the BET area 73 specified on the BET screen 70, and the amount of chips bet at the current point in time) as necessary. Furthermore, the bet information is transmitted to the CPU 206 of the central controller 14, and is stored in the bet information storage area of the RAM 210.

Furthermore, the sound output circuit 320 and the speaker 95 are connected to the input/output bus 304. Here, the speaker 95 is a component for providing various kinds of sound effects according to the output signal received from the sound output circuit 320.

FIG. 14 shows a basic game random number table used in the basic game performed by the slot machine 13 described later with reference to FIG. 17. In the basic game random number table, a range of random numbers and the probability of winning are registered in association with each of the particular winning combinations. Accordingly, in the combination determination processing (Step S5 shown in FIG. 17), in a case that a random number extracted from a range of numbers between "0" to "65535" is any one of the numbers in a range between "0" to "999", for example, the internal component of the slot machine 13 determines to generate a particular combination for providing a "BONUS" winning which is the final result of the basic game. In other words, the probability is "1000/65536" that the combination of the symbols when they are stationary matches a particular combination for providing the "BONUS" winning. Also, in a case that a random number extracted from a range of numbers between "0" to "65535" is any one of the numbers in a range between "2000" to "3499", for example, the internal component of the slot machine 13 determines to generate a particular combination for providing a "K" winning as the final result of the basic game. In other words, the probability is "1500/65536" that the combination of the symbols when they are stationary matches a particular combination for providing the "K" winning. On the other hand, in a case that a random number extracted from a range of numbers between "0" to "65535" is any one of the numbers in a range between "10000" to "65535", the internal component of the slot machine 13 determines to generate other combinations, i.e., losing combinations, as the final results of the basic game. In other words, the probability is "55536/65536" that the combination of the symbols when they are stationary matches any one of the losing combinations.

FIG. 15 shows a basic game payout table used in the basic game described later with reference to FIG. 17. In the basic game payout table, the coin amount to be paid out is registered in association with each particular combination for providing an award for each credit amount bet on one game. Let us consider a stage in which determination is made whether or not the combination thus generated matches any one of the particular combinations for providing an award. In this stage, let us consider a case in which the combination thus generated matches the combination "K". In this case, in a case that the credit amount bet is "1", 10 coins are paid out. In a case that the credit amount bet is "2", 20 coins are paid out. In a case that the credit amount bet is "3", 30 coins are paid out. On the other hand, let us consider a case in which the combination thus generated matches the combination "BONUS". In this case, in a case that the credit amount bet is "1", 100 coins credit data is transmitted to the central controller 14. In the same way, in case that the credit amount bet is "2", 200 coins credit data is transmitted to the central controller 14. Also, in a case that the credit amount bet is "3", 300 coins credit data is transmitted to the central controller 14. The credit data thus transmitted is available as a credit in the second game described later.

FIG. 16 illustrates an example of a second game payout table used in a roulette game described later with reference to FIGS. 18A through 18D. Registered in the second game payout table are permissible betting method ranges and permissibility of multiple bets, for each terminal. The term "each terminal" as used here represents: a slot machine 13 which has switched the game to the roulette game as a result of a particular symbol combination for providing a "BONUS" winning come to a stop along an active pay line (hereafter also referred to as "main slot machine 13"); slot machines 13 which have not switched the game to the roulette game since a combination which provides a "BONUS" winning has not stopped on an active pay line, but are participating in the roulette game started by the main slot machine 13 (hereafter also referred to as "participating slot machines 13"); and second game terminals 15. Also, the second game payout table is configured such that, with regard to the main slot machine 13, the permissible betting method range differs in accordance with the credit amount bet in the basic game during which the combination which provides the "BONUS" winning has been generated.

For example, in the event that the credit amount bet in the basic game during which the combination which provides the "BONUS" winning has been generated is 1, the betting method which can be used for betting in the roulette game is at least one of "straight bet", "split bet", and "street bet". The main slot machine 13 is permitted to place multiple bets, and accordingly can place multiple "straight bets", or both of "straight bet" and "split bet". Also, the method which the participating slot machines 13 can use to place bets with the roulette is one of "dozen bet", "column bet", "red/black", "even/odd", and "low/high". The participating slot machines 13 are not permitted to place multiple bets, so with the present embodiment, can only place a bet on one place in the BET areas 73 on the BET screen 70.

It should be understood that FIG. 16 merely illustrates one example of the present embodiment, and that the payout rate for the BET areas 73 on the BET screen 70 stored in the payout credit storage area may be arranged to differ between the slot machines 13 and the second game terminals 15. Moreover, of the slot machines 13, the payout rate may be arranged to differ between the main slot machine 13 and the participating slot machines 13.

Also, while the example illustrated in FIG. 16 is a configuration wherein the betting method is restricted according to the credit amount bet in the basic game at the main slot machine 13, another arrangement may be employed in which the payout rate is changed according to the credit amount bet in the basic game at the main slot machine 13. Moreover, an arrangement may be made in which coins from the slot machine 13 can be used for additional credits when performing the roulette game, with the payout rate being changed according to the additional credits, or the payout rate being changed according to the total amount bet.

As can be seen from the second game payout table shown in FIG. 16, the payout rate is set relatively high for the roulette game, so a high payout can be expected depending on the betting method which the player uses.

Figure 17:
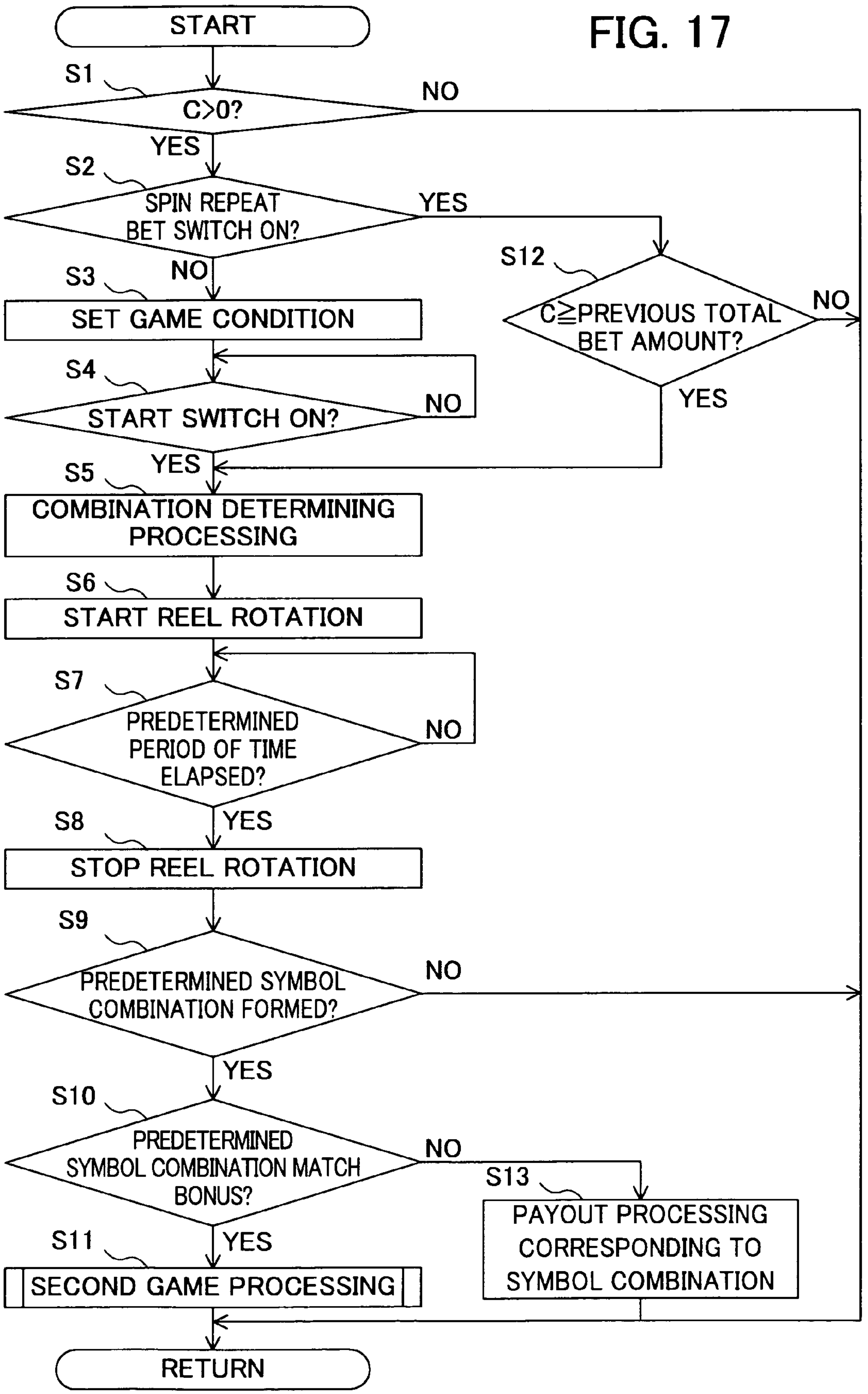
FIG. 17 is a flowchart which shows a processing flow in the basic game executed by the slot machine according to the embodiment of the present invention.

FIG. 17 is a flowchart which shows the flow of the processing and the operation of the slot machine 13 in the basic game, which is executed by the controller 100 of the slot machine 13. The processing and operation are executed by calling a sub-program from a main program for the slot machine 13 at a predetermined timing.

Description will be made below regarding a case in which the slot machine 13 has been activated beforehand. Furthermore, let us say that the variables used by the CPU 106 included in the aforementioned controller 100 have been initialized to predetermined values, thereby operating the slot machine 13 in a normal state.

First, the CPU 106 included in the aforementioned controller 100 determines whether or not any coins inserted by the player (Step S1) are remaining. Specifically, the CPU 106 reads out the credit amount C stored in the RAM 110, and performs processing based upon the credit amount C thus read out. In a case that the credit amount C is "0" (in a case of "NO" in the determination processing in Step S1), the CPU 106 cannot start the game, and accordingly, the CPU 106 ends this routine without performing any processing. On the other hand, in a case that the credit amount C is "1" or more (in a case of "YES" in the determination processing in Step S1), the CPU 106 determines that there is at least one coin remaining, and the flow proceeds to Step S2.

In the following Step S2, the CPU 106 determines whether or not the spin repeat bet switch 24 has been pushed. In a case that the spin repeat bet switch 24 has been pushed, and accordingly, in a case that the operation signal has been input from the spin repeat bet switch 24 (in a case of "YES" in the determination processing in Step S2), the flow proceeds to Step S12 according to the instruction from the CPU 106. On the other hand, in a case that the operation signal has not been input from the spin repeat bet switch 24 within a predetermined period of time (in a case of "NO" in the determination processing in Step S2), the CPU 106 determines that the spin repeat bet switch 24 has not been pushed, and the flow proceeds to Step S3.

In the following Step S3, the CPU 106 sets the game conditions. Specifically, the CPU 106 determines the amount of coins bet on the active pay lines in this game. The CPU 106 receives the operation signals generated by the player operating the BET switch 23. Then, the CPU 106 determines the BET amount to be bet on the active pay lines based upon the number of times the signals that indicate operation of the BET switch 23 have been received, and stores the BET amount thus determined in a predetermined memory area of the RAM 110. The CPU 106 reads out the credit amount C stored in a predetermined memory area of the RAM 110, and subtracts the total BET amount, which is the sum of the aforementioned BET amounts, from the credit amount C thus read out. Then, the CPU 106 stores the subtracted value in a predetermined memory area of the RAM 110. Subsequently, the flow proceeds to Step S4 according to the instruction from the CPU 106.

In the following Step S4, the CPU 106 determines whether or not the start switch 25 is ON, i.e., waits for the start switch 35 to be operated. Upon the start switch 25 being operated, and accordingly, upon the operation signal being input from the start switch 25 (in a case of "YES" in the determination processing in Step S4), the CPU 106 determines that the start switch 25 has been operated, and the flow proceeds to Step S5.

On the other hand, in a case that the flow has proceeded to Step S12, the CPU 106 determines whether or not the credit amount C is equal to or greater than the total bet amount bet on the previous game. In other words, the CPU 106 determines whether or not the player can start the game by pushing the spin repeat bet switch 24. Specifically, in a case that the spin repeat bet switch 24 has been pushed, and accordingly, in a case that the operation signal has been input from the aforementioned switch 24, the CPU 106 reads out the credit amount C and the BET amount bet on each of the active pay lines L1 to L9 in the previous game stored in the predetermined memory areas of the aforementioned RAM 110. Then, the CPU 106 determines whether or not the aforementioned credit amount C is equal to or greater than the total bet amount bet in the previous game based upon the relation between the credit amount C and the BET amount thus read out. In a case that determination has been made that the aforementioned credit amount C is less than the total bet amount bet on the previous game (in a case of "NO" in the determination processing in Step S12), the CPU 106 cannot start the game, and accordingly, the CPU 106 ends this routine without performing any processing. On the other hand, in a case that determination has been made that the aforementioned credit amount C is equal to or greater than the total bet amount bet in the previous game (in a case of "YES" in the determination processing in Step S12), the CPU 106 subtracts the total bet amount bet in the previous game from the aforementioned credit amount C, and stores the subtracted value in a predetermined area of the RAM 110. Subsequently, the flow proceeds to Step S5 according to the instruction from the CPU 106.

In the following Step S5, the CPU 106 performs combination determination processing. Specific description will be made below regarding the combination determination processing.

In the aforementioned combination determination processing, first, the CPU 106 determines the combinations of the symbols along the aforementioned active pay lines when they are stationary. Specifically, the CPU 106 issues a command for the random number generator 112 to generate a random number, thereby extracting a random number in a predetermined range (in a range of "0" to "65535" in the present embodiment) generated by the random number generator 112. The CPU 106 stores the random number thus extracted in a predetermined memory area of the RAM 110. Note that description is being made in the present embodiment regarding an arrangement in which the random number is generated by the random number generator 112, which is a separate component from the aforementioned CPU 106. Also, an arrangement may be made in which the random number is generated by computation processing by the CPU 106 without involving the random number generator 112. The CPU 106 reads out a basic game random number table (see FIG. 14), and a particular combination table (not shown) for providing an award, each of which is stored in the ROM 108. Then, the CPU 106 stores the basic game random number table and the particular combination table thus read out in a predetermined memory area of the RAM 110. Note that the CPU 106 controls display of the symbols when they are stationary for each reel based upon the aforementioned basic game random table. Furthermore, the CPU 106 reads out the basic game random number table and the particular combination table for providing an award stored in the predetermined area of the aforementioned RAM 110. Then, the CPU 106 determines the combination of the symbols when they are stationary with respect to the aforementioned active pay lines with reference to the aforementioned basic game random number table, using the random number stored in the predetermined memory region of the aforementioned RAM 110 as a parameter. Upon determination of particular combinations for providing an award, the CPU 106 stores the particular combination data for providing an award thus determined in a predetermined memory area of the RAM 110. Then, the CPU 106 reads out the random number and the particular combination data for providing an award stored in the predetermined memory area of the RAM 110, and determines the combination of the symbols to be displayed when they are stationary based upon the random number and the particular combination data for providing an award thus read out. In this stage, a symbol disposition table (not shown) stored in the ROM 108 is read out by the CPU 106. The symbol disposition table thus read out is stored in a predetermined memory area of the RAM 110, and used as reference data. The CPU 106 stores the data for the stationary symbols thus determined in a predetermined memory area of the RAM 110. Alternatively, an arrangement may be made in which the symbols when they are stationary are determined for each reel using the aforementioned basic game random number table.

Upon determination of the combination of the symbols when they are stationary with respect to the aforementioned active pay lines, the CPU 106 determines whether or not the combination of the symbols when they are stationary with respect to the active pay lines matches any one of the particular combinations for providing an award. In a case that the combination of the symbols when they are stationary with respect to the active pay lines matches any one of the particular combinations for providing an award, the CPU 106 activates a flag, which indicates that the player has won the award that corresponds to the kind of particular combination for providing an award, in order to provide the award that accords with the particular combination of symbols with respect to the active pay lines for providing the award. The activated flag, which indicates the player has won an award, is stored in a predetermined area of the RAM 110 according to the instruction from the CPU 106. On the other hand, in a case that the combination of the symbols when they are stationary with respect to the active pay lines matches any one of the other combinations, i.e., the losing combinations, the CPU 106 does not activate the flag which indicates that the player has won an award. Subsequently, the flow proceeds to Step S6 according to the instruction from the CPU 106.

In the following Step S6, the CPU 106 instructs the mechanical reels 3A through 3E to start to rotate. Specifically, the CPU 106 instructs the mechanical reels 3A through 3E, in order or at the same time, based upon the symbol disposition table stored in the aforementioned RAM 110. Let us consider an arrangement in which each slot machine 13 employs video reels. With such an arrangement, the CPU 106 displays an image of the five video reels starting to rotate.

On the other hand, let us consider an arrangement in which each slot machine 13 employs mechanical reels. With such an arrangement, after the mechanical reels 3A through 3E have started to rotate according to the instruction from the CPU 106, the CPU 106 counts the number of driving pulses transmitted to each of the stepping motors 45A through 45E, and the counted numbers are stored in a predetermined memory area of the RAM 110. Furthermore, a reset pulse is acquired upon each rotation of each of the mechanical reels 3A through 3E. The reset pulses of the mechanical reels 3A through 3E are input to the CPU 106 via the reel position detecting circuit 46. Each driving pulse counted value stored in the aforementioned RAM 110 is cleared to "0" according to the corresponding reset pulse thus acquired. With such an arrangement, the counted value, which corresponds to the rotational position in a range of one cycle of the reel, is stored in a predetermined memory area of the RAM 110 for each of the mechanical reels 3A through 3E. In the symbol disposition table stored in the aforementioned RAM 110, the rotational positions of the mechanical reels 3A through 3E and the symbols on the mechanical reels 3A through 3E are stored in association with one another. Before the CPU 106 refers to the symbol disposition table, the CPU 106 makes a combination of the code number assigned to each of the mechanical reels 3A through 3E, in increments of predetermined rotational pitches of the reels, and the symbol code that indicates the symbol assigned to each code number, with the particular rotational position at which the aforementioned reset pulse has been generated as the reference position.

Upon the mechanical reels 3A through 3E starting to rotate, the CPU 106 waits for a predetermined period of time to elapse (Step S7). After the predetermined period of time has elapsed (in a case of "YES" in the determination processing in Step S7), the CPU 106 instructs the mechanical reels 3A through 3E to automatically stop rotating (Step S8). Specifically, the CPU 106 instructs the mechanical reels 3A through 3E to stop rotating in order or at the same time such that the symbols when they are stationary, which correspond to the particular combinations for providing an award determined in the aforementioned Step S5, are displayed within a display region that has a visually interactive relationship with the player. Subsequently, the flow proceeds to Step S9 according to the instruction from the CPU 106. On the other hand, let us consider an arrangement in which each slot machine 13 employs video reels. With such an arrangement, the CPU 106 waits for a predetermined period of time to elapse (Step S7). Then, after the predetermined period of time has elapsed (in a case of "YES" in the determination processing in Step S7), the CPU 106 displays an image of the five video reels stopping to rotate (Step S8).

In the following Step S9, the CPU 106 determines whether or not a predetermined symbol combination has been formed based upon the results of the combination determination processing performed in Step S5. Specifically, the CPU 106 makes this determination based upon the state of the flag that indicates whether or not the player has won an award with respect to the active pay lines stored in the predetermined memory area of the aforementioned RAM 110. In a case that the flag, which indicates that the player has won an award, has not been activated, i.e., in a case that the symbol combination matches any one of the "other" combinations, which are combinations other than the particular combinations for providing an award (in a case of "NO" in the determination processing in Step S9), the CPU 106 determines that the particular combination for providing an award has not been formed, and ends this routine. On the other hand, in a case that the flag, which indicates that the player has won an award, has been activated, i.e., in a case that the symbol combination matches any one of the combinations other than the "other" combinations (in a case of "YES" in the determination processing in Step S9), the flow proceeds to Step 10 according to the instruction from the CPU 106.

In the following Step S10, the CPU 106 determines whether or not the particular combination for providing an award is "BONUS". The term "BONUS" as used here represents a symbol combination in which "BONUS" designs are arranged along the active pay line. Specific description will be made later with reference to FIG. 20. In the present embodiment, in a case that the "BONUS" combination has been formed, the second game starts. The CPU 106 makes this determination based upon the particular combination data for providing an award stored in the predetermined memory area of the aforementioned RAM 110. In a case that the particular combination data for providing an award does not match the "BONUS" combination (in a case of "NO" in the determination processing in Step S10), the CPU 106 determines that the "BONUS" combination has not been formed with respect to the particular combination data for providing an award, and the flow proceeds to step S13 according to the instruction from the CPU 106. On the other hand, in a case that the particular combination data for providing an award matches the "BONUS" combination (in a case of "YES" in the determination processing in Step S10), the CPU 106 determines that the "BONUS" combination has been formed with respect to the particular combination data for providing an award, and the flow proceeds to step S11 according to the instruction from the CPU 106.

In the following Step S11, the CPU 106 performs second game processing described later with reference to FIGS. 18A through 18D. Specifically, the CPU 106 transmits a second game start signal to the central controller 14. After the second game processing, the CPU 106 ends this routine.

On the other hand, in a case that the flow has proceeded to Step S13, the CPU 106 pays out an amount of coins corresponding to the aforementioned particular combination for providing an award. Specifically, the CPU 106 calculates the amount of coins to be paid out for the aforementioned particular combination for providing an award, with reference to the basic game payout table. The CPU 106 reads out the credit amount stored in the aforementioned predetermined memory area of the RAM 110. Then, the CPU 106 calculates the sum total amount of coins to be paid out thus calculated and the credit amount thus read out, and stores the sum thus calculated in a predetermined memory area of the RAM 110. The CPU 106 displays the aforementioned value thus stored on the credit amount display unit 49. Subsequently, the CPU 106 ends this routine.

FIGS. 18A through 18D are flowcharts which show the processing and operation in the second game performed by the game system 10. Description will be made regarding a second game processing program for the slot machine 13 executed by the CPU 106 of the main slot machine 13, a second game processing program for the central controller 14 executed by the CPU 206 of the central controller 14, a second game processing program for the slot machine 13 executed by the CPU 106 of the participating slot machine 13, and a second game processing program for the second game terminal 15 executed by the CPU 306 of the second game terminal 15, in that order, with reference to FIGS. 18A through 18D. Note that each of the programs shown in the flowcharts in FIGS. 18A through 18D are stored in the ROM 108 and the RAM 110 included in the slot machine 13, the ROM 208 and the RAM 210 included in the central controller 14, and the ROM 308 and the RAM 310 included in the second game terminal 15. Also, these programs are executed by the CPU 106 included in the slot machine 13, the CPU 206 included in the central controller 14, and the CPU 306 included in the second game terminal 15.

First, description will be made regarding the second game processing program for the slot machine 13 with reference to FIGS. 18A through 18D. In Step S101 shown in FIG. 18A, the CPU 106 transmits a second game start signal to the central controller 14. Subsequently, the flow proceeds to Step S102 according to the instruction from the CPU 106. Here, the second game start signal includes at least: the data which allows the slot machine 13 to be identified; the credit amount bet on the "BONUS" combination being formed in the basic game; and the information with respect to the active pay lines.

In Step S102, the CPU 106 displays the BET screen 70 on the liquid crystal display 30 of the slot machine 13, as described later with reference to FIG. 23 (Step S102). Subsequently, the CPU 106 starts the period for receiving bets, during which the players can bet chips (Step S103). In this stage, using his/her chips, each player can place a bet on the BET area 73 that accords with a desired number according to his/her prediction by operating the touch panel 32 during the betting period, in which players are allowed to place bets. The places and the number of times the player can place a bet are changed according to the credit amount bet and the active pay lines set in the basic game executed by the slot machine 13 as shown in the second game payout table (see FIG. 16). As such a control method, an arrangement may be made in which, after the CPU 106 of the slot machine 13 has transmitted the bet information, and the CPU 206 of the central controller 14 performs such control. Also, an arrangement may be made in which, after the CPU 106 has transmitted a second game start signal in Step S101, the CPU 106 receives permissible bet conditions from the central controller 14 in the form of data, and the CPU 106 of the slot machine 13 performs such control with the aforementioned data being stored in the RAM 110 of the slot machine 13. Note that specific description will be made later regarding the betting method using the BET screen 70 with reference to FIG. 23.

Subsequently, upon reception of a betting period end signal, which indicates that the betting period has ended, from the CPU 206 of the central controller 14 (Step S104 in FIG. 18B), the CPU 106 displays an image, which provides notice that the betting period has ended, on the liquid crystal display 30 of the slot machine 13, and the placement of bets via the touch panel 32 ends (Step S105). Subsequently, the flow proceeds to Step S106 shown in FIG. 18C according to the instruction from the CPU 106.

Figure 18A:
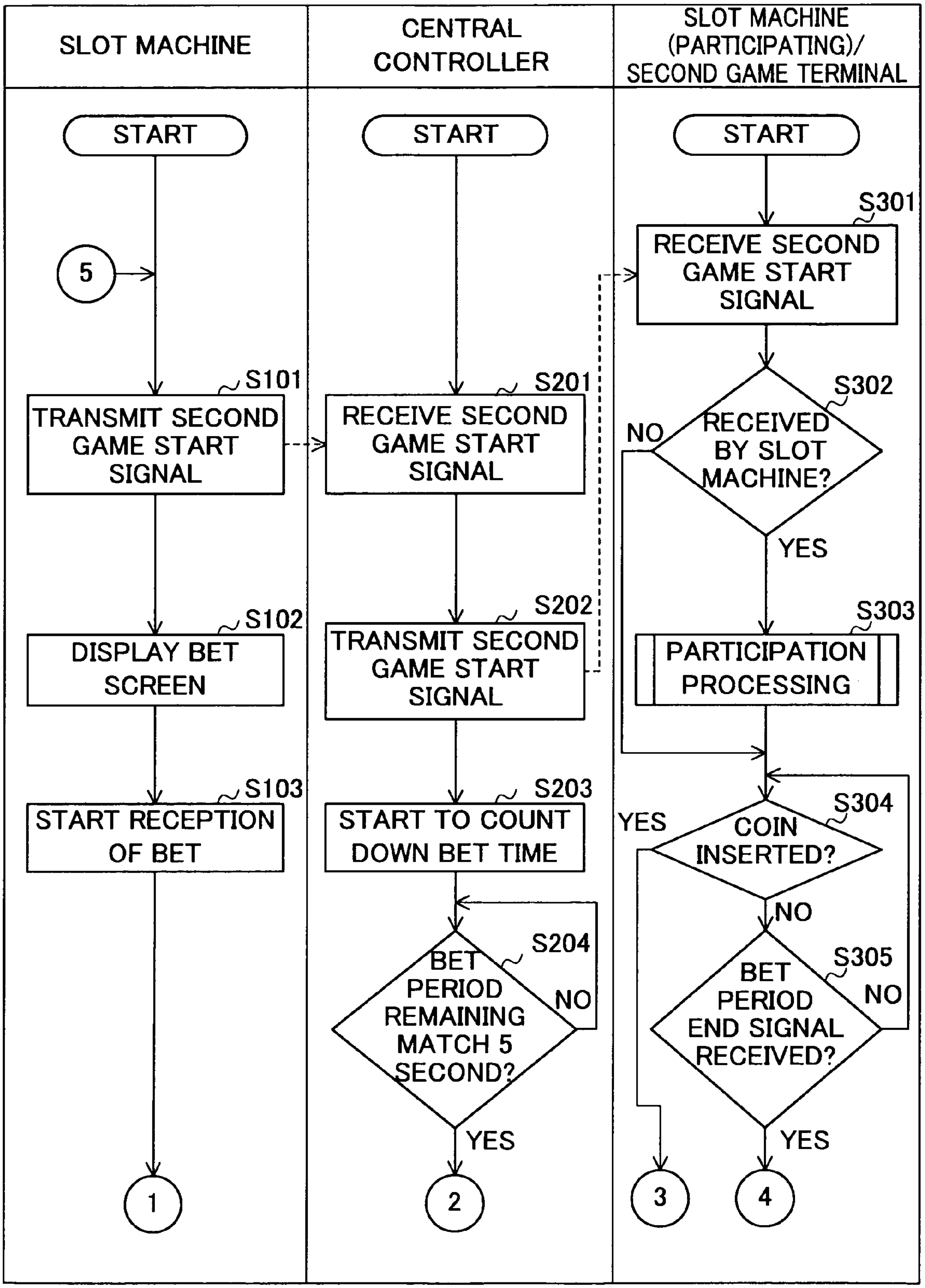
FIGS. 18A through 18D are flowcharts which show the processing and operation of the game system in the second game according to the embodiment of the present invention.
Figure 18B:
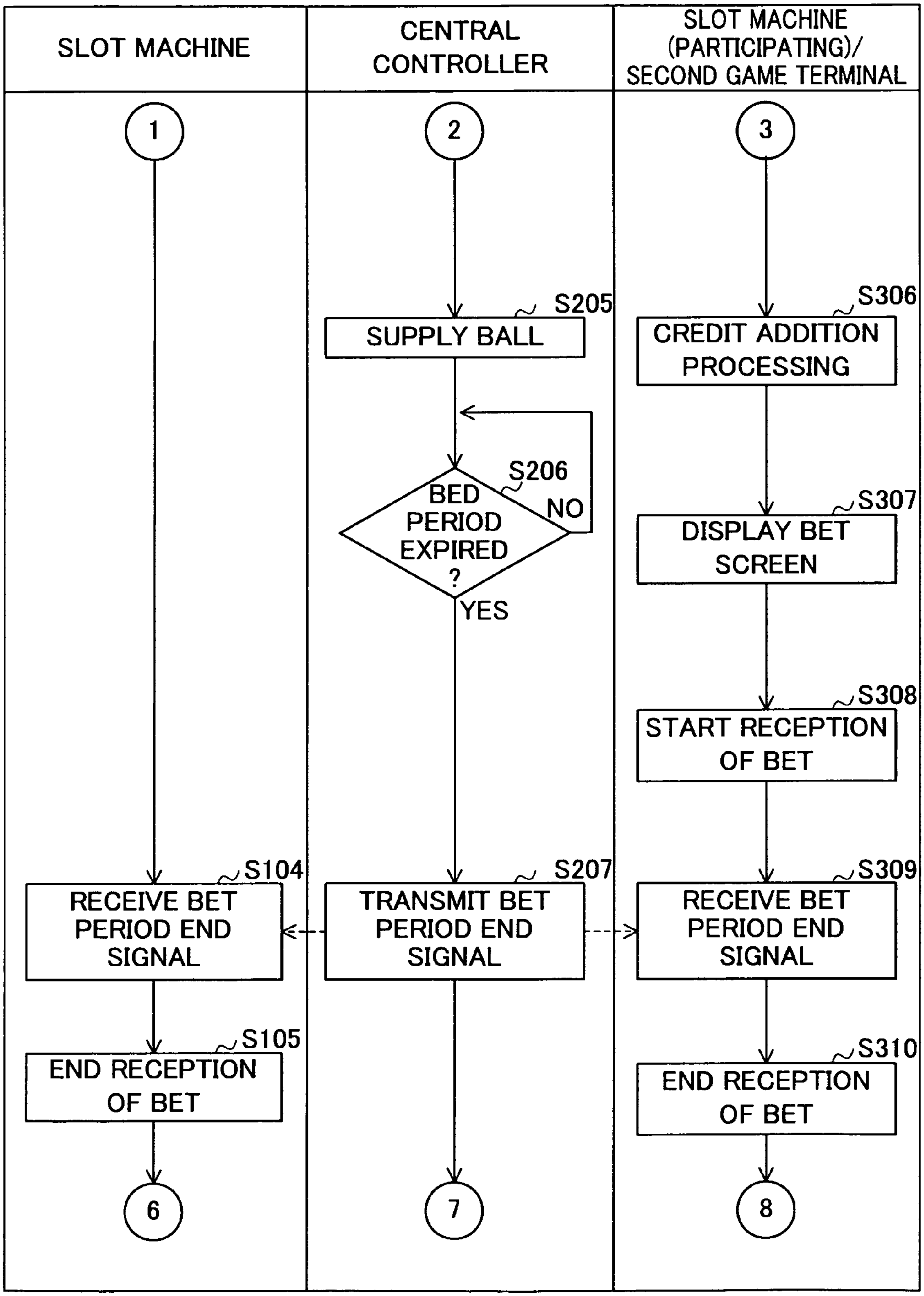
Figure 18C:
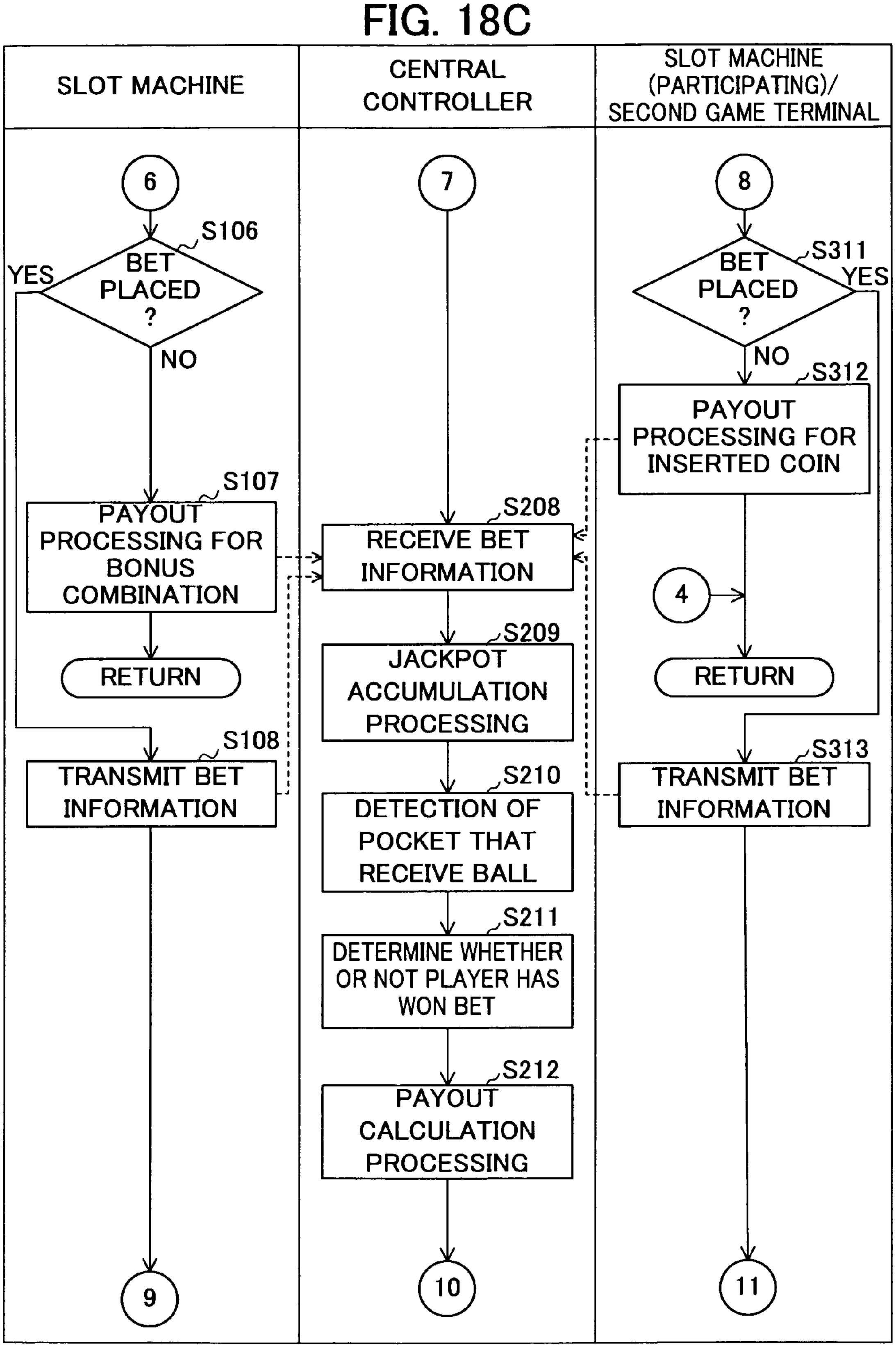

In Step S106 shown in FIG. 18C, the CPU 106 determines whether or not the player has placed bets during the betting period. In a case that bets have been placed (in a case of "YES" in the determination processing in Step S106), the flow proceeds to Step S108 according to the instruction from the CPU 106. On the other hand, in a case that bets have not been placed (in a case of "NO" in the determination processing in Step S106), the flow proceeds to Step S107 according to the instruction from the CPU 106.

In Step S107, the CPU 106 performs payout processing corresponding to the "BONUS" combination, and transmits a bet information signal, which provides notice that bets have not been placed, to the central controller 14. Specifically, the CPU 106 calculates the amount of coins to be paid out based upon the basic game payout table (see FIG. 15). The CPU 106 reads out the credit amount stored in the predetermined memory area of the RAM 110, calculates the sum total of the credit amount thus read out and the amount of payout thus calculated, and stores the sum thus calculated in the predetermined memory area of the RAM 110. Also, the CPU 106 displays the sum thus stored on the credit amount display unit 49. Subsequently, this routine ends according to the instruction from the CPU 106.

Note that an arrangement may be made in which, in a case that the conditions for playing the roulette game have been satisfied, but the player has abandoned the right to play the roulette game, the credit is not paid out.

On the other hand, in Step S108, the CPU 106 transmits bet information (the BET area 73 specified by the player and the amount of chips (bet amount) bet on the BET area 73 thus specified) specified by the player via the slot machine 13.

Subsequently, the CPU 106 receives the credit payout results transmitted from the CPU 206 of the central controller 14 (Step S109 in FIG. 18D). Note that the credit payout results match the payout results according to whether the player has won or lost the roulette game performed using the BET screen 70. Subsequently, the flow proceeds to Step S110 according to the instruction from the CPU 106.

In Step S110, the CPU 106 pays out the credit based upon the payout results received in Step S109. Specifically, the credit data for the amount of credit corresponding to the payout for the roulette game is stored in the RAM 110. Subsequently, the flow proceeds to Step S111 according to the instruction from the CPU 106.

Figure 24:
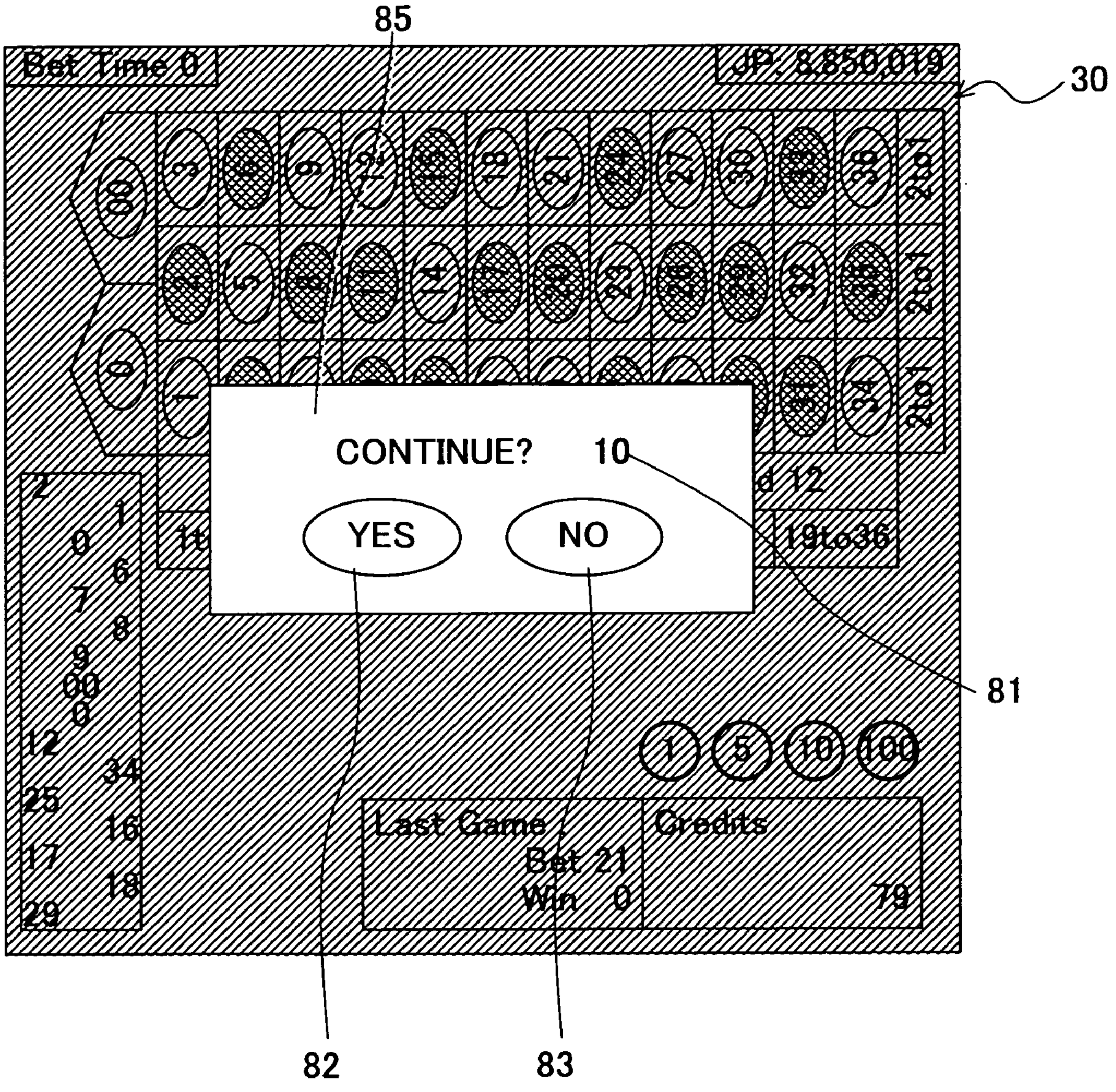
FIG. 24 shows an example of the display which asks the player whether or not the game is to be continued, and which is displayed on the slot machine and the second game terminal according to the embodiment of the present invention when the game ends.

In Step S111, the CPU 106 determines whether or not the second game is to be ended. Specifically, in a case that there is any credit remaining in the roulette game, a small window 85, which will be described later with reference to FIG. 24, is displayed on the liquid crystal display 30, which allows the player to make a choice by performing a selection operation. On the other hand, in a case that there is no credit remaining in the roulette game, the CPU 106 ends the second game without providing the player with a selection opportunity. Here, in a case that there is no credit remaining in the roulette game, or in a case that the player has selected the option to end the roulette game (in a case of "YES" in the determination processing in Step S111), the flow proceeds to Step S112 according to the instruction from the CPU 106. On the other hand, in a case that there is a credit amount remaining in the roulette game, and the player has selected the option to continue the roulette game (in a case of "NO" in the determination processing in Step S111), the flow proceeds to Step S101 shown in FIG. 18A according to the instruction from the CPU 106. Then, the CPU 106 transmits a second game start signal again to the central controller 14. This starts the betting period, and the next game starts.

In Step S112, the CPU 106 transmits a second game end signal to the central controller 14. In a case that there is any credit remaining in the roulette game, the CPU 106 reads out the credit amount which is used in the basic game, and which is stored in the predetermined memory area. Then, the CPU 106 calculates the sum total of the credit amount thus read out and the credit data corresponding to the payout for the roulette game stored in the RAM 110. Then, the CPU 106 stores the sum thus calculated in the predetermined memory area of the RAM 110. Also, the CPU 106 displays the sum thus calculated on the credit amount display unit 49 of the slot machine 13. Subsequently, the CPU 106 ends this routine.

As described above, in a case that the player has won the payout in the roulette game, the credit that has increased by the amount of the payout is added to the coins for the slot machine 13. Such an arrangement allows the player to use the payout from the roulette game in the form of coins. This provides a closer relation between the basic game and the second game, thereby improving the amusement value of the game provided by the overall game system 10.

Next, description will be made regarding the second game processing program for the central controller 14 with reference to FIGS. 18A through 18D.

In Step S201 shown in FIG. 18A, the CPU 206 receives a second game start signal transmitted in the aforementioned Step S101 from the CPU 106 of the slot machine 13. Upon reception of the second game start signal, the CPU 206 stores the second game start signal thus received in the RAM 210. Furthermore, the CPU 206 raises the movable floor 18 on which the slot machine 13 that has transmitted the second game start signal and the seat 57 have been installed. Furthermore, the CPU 206 displays an image on the large-size monitor 16 which provides notice of the start of the second game, as described later with reference to FIG. 22. With such an arrangement, the movable floor 18 on which the slot machine 13 has been installed is raised, and a second game start message is displayed on the large-size monitor 16. This notifies other persons in the amusement facility of the start of the second game, in addition to the players at the other slot machines 13. Subsequently, the flow proceeds to Step S202 according to the instruction from the CPU 206.

In Step S202, the CPU 206 transmits a second game start signal to each of the participating slot machines 13 and the second game terminals 15. With the present embodiment, the CPU 206 transmits a second game start signal to each of the participating slot machines 13 and the second game terminals 15, which allows the player to participate in the roulette game using any one of the participating slot machines 13 and the second game terminals 15. Subsequently, the flow proceeds to Step S203 according to the instruction from the CPU 206.

In Step S203, the CPU 206 starts to count down the betting period, during which the player can place bets, from the point in time at which the second game start signal has been transmitted by the slot machine 13. In the betting period, the players at the slot machines 13 that participate in the game can place bets with their own chips on the BET area 73 that corresponds to a desired number according to their prediction by operating the touch panel 32 of the liquid crystal display 30. Also, the player at each second game terminal 15 can place bets in the same way.

Also, an arrangement may be made in which, after the player has decided how to place his/her bets via each of the liquid crystal displays 30 of the slot machine 13 and the displays 93 of the second game terminals 15, which will be described later, the CPU 206 receives the data including the information with respect to the position on which the player has placed bets and the amount of chips bet, and displays the information on the monitor 16. With such an arrangement, the monitor 16 displays the information with respect to the bets placed by each player. Such an arrangement allows each player to place bets after the player has confirmed the bets placed by other players, i.e., giving consideration to the results thus displayed on the monitor 16. This allows the player to include the bets placed by other players in his/her game strategy, thereby improving the amusement value of the game. Subsequently, the flow proceeds to Step S204 according to the instruction from the CPU 206.

In Step S204, the CPU 206 determines whether or not the time remaining in the betting period has become 5 seconds. Note that the time remaining in the betting period is also displayed on the BET time display unit 74 provided to the BET screen 70 of the second game device 11 (see FIG. 10). In a case that determination has been made that the time remaining in the betting period has not reached 5 seconds (in a case of "NO" in the determination processing in step S204), the CPU 206 repeatedly performs the processing in step S204 in order to wait for the time remaining in the betting period to become 5 seconds. On the other hand, in a case that determination has been made that the time remaining in the betting period has become 5 seconds (in a case of "YES" in the determination processing in step S204), the flow proceeds to Step S205 shown in FIG. 18B according to the instruction from the CPU 206.

In Step S205 shown in FIG. 18B, the CPU 206 supplies the ball 65 to the inner portion of the roulette board. Specifically, first, the CPU 206 drives the ball supply device so as to supply the ball 65 to the inner portion of the roulette board, whereby the roulette device 60 performs the number determination processing according to the game execution program. More specifically, after the ball 65 is supplied, the CPU 206 further drives the driving motor such that the wheel 62 rotates at a predetermined rotational speed in the direction opposite to the ball supply direction. The ball 65 thus supplied rolls onto the roulette board along the guide wall 66. Subsequently, as the ball 65 loses its centrifugal force due to reduction in its rotational speed, the ball 65 rolls down along the slope of the frame 61, whereupon the ball 65 reaches the rotating wheel 62 (see FIG. 10).

Then, the ball 65 rolling down to the rotating wheel 62 is received by any one among the number pockets 63 through the number display plate 64 provided to outer perimeter of the wheel 62, which is still rotating. As a result, the number marked on the number display plate 64 that corresponds to the number pocket 63 retaining the ball 65 (any one of the numbers "0", "00", and "1" to "36") is determined to be a winning number.

Furthermore, upon the supply of the ball 65 to the inner portion of the roulette board, the CPU 206 instructs the movable viewpoint cameras 17 to capture images of the roulette device 60, and displays the images thus captured on the monitor 16. Such an arrangement allows the players to visually confirm the stage in which the winning number is determined in the roulette game by viewing the monitor without the need to monitor the second game device 11. Note that an arrangement may be made in which the screen displayed on the monitor 16 is divided into multiple parts as necessary, and both the roulette device 60 and the BET screen 70 are displayed on the monitor 16.

Subsequently, the CPU 206 determines whether or not the betting period has expired (in Step S206). In a case that determination has been made that the betting period has not expired (in a case of "NO" in the determination processing in step S206), the CPU 206 repeatedly performs the processing in Step S206 in order to wait for the betting period to expire. On the other hand, in a case that determination has been made that the betting period has expired (in a case of "YES" in the determination processing in step S206), the CPU 206 transmits a betting period end signal, which provides notice that the betting period has expired, to the CPU 106 of each main slot machine 13, the CPU 106 of each participating slot machine 13, and the CPU 306 of each second game terminal 15 (Step S207).

Subsequently, the CPU 206 receives the bet information (information with respect to whether or not the player has placed bets, the BET area 73 specified by the player in a case that the player has placed bets, the amount of chips bet on the BET area 73 thus specified (bet amount), and the betting method) specified by the player via each of the main slot machines 13, the participating slot machines 13, and the second game terminals 15. Then, after the CPU 206 checks whether or not each bet method meets the conditions specified by the second game payout table stored in the ROM 208, the CPU 206 stores the bet information thus received in the bet information storage area of the RAM 210 (Step S208 in FIG. 18C). The CPU 206 may display the bet information thus stored in the bet information storage area of the RAM 210 on the monitor 16. Note that, in a case of reception of the information that the player has not placed bets, the CPU 206 lowers the movable floor 18 on which the main slot machine 13 and the seat have been installed. Subsequently, the flow proceeds to Step S209 according to the instruction from the CPU 206.

In Step S209, the CPU 206 adds 0.5% of the total credit that has been bet via the slot machines 13 and the second game terminals 15, and which has been received in step S208, to the amount of jackpot stored in the jackpot accumulation storage area of the RAM 210, thereby updating the amount of accumulated jackpot. Then, the display of the JP display unit 75 is updated to reflect the accumulated jackpot. Note that in a case that the bet information received in Step S208 indicates that the player has not placed bets, this processing is not performed. Subsequently, the flow proceeds to Step S210 according to the instruction from the CPU 206.

In Step S210, the CPU 206 determines whether or not the ball 65 has been received by any one of the number pockets 63. Subsequently, the CPU 206 drives the win determination device in order to detect the number that accords with the number pocket 63 that has received the ball 65. Subsequently, the flow proceeds to Step S211 according to the instruction from the CPU 206.

In Step S211, the CPU 206 determines whether or not the player has won the game for the chips bet via each of the slot machines 13 and the second game terminals 15, based upon the pocket number retaining the ball 65 which has been determined in the aforementioned Step S210, and the bet information with respect to the slot machines 13 and the second game terminals 15 received in the aforementioned Step S208. Subsequently, the flow proceeds to Step S212 according to the instruction from the CPU 206.

In Step S212, the CPU 206 executes payout calculation processing. In the payout calculation processing, the CPU 206 identifies the chips bet on the winning number for each of the slot machines 13 and the second game terminals 15. Then, the CPU 206 calculates the total credit payout to be paid out from each of the slot machines 13 and the second game terminals 15 using the payout rate (the amount of credit to be paid out for each chip (for each bet)) for each BET area 73 specified by the second game payout table stored in the payout credit storage area of the ROM 208. Subsequently, the flow proceeds to Step S213 shown in FIG. 18D according to the instruction from the CPU 206. In this case, the monitor 16 displays the information with respect to the winning number, the number of winning players, etc.

Figure 18D:
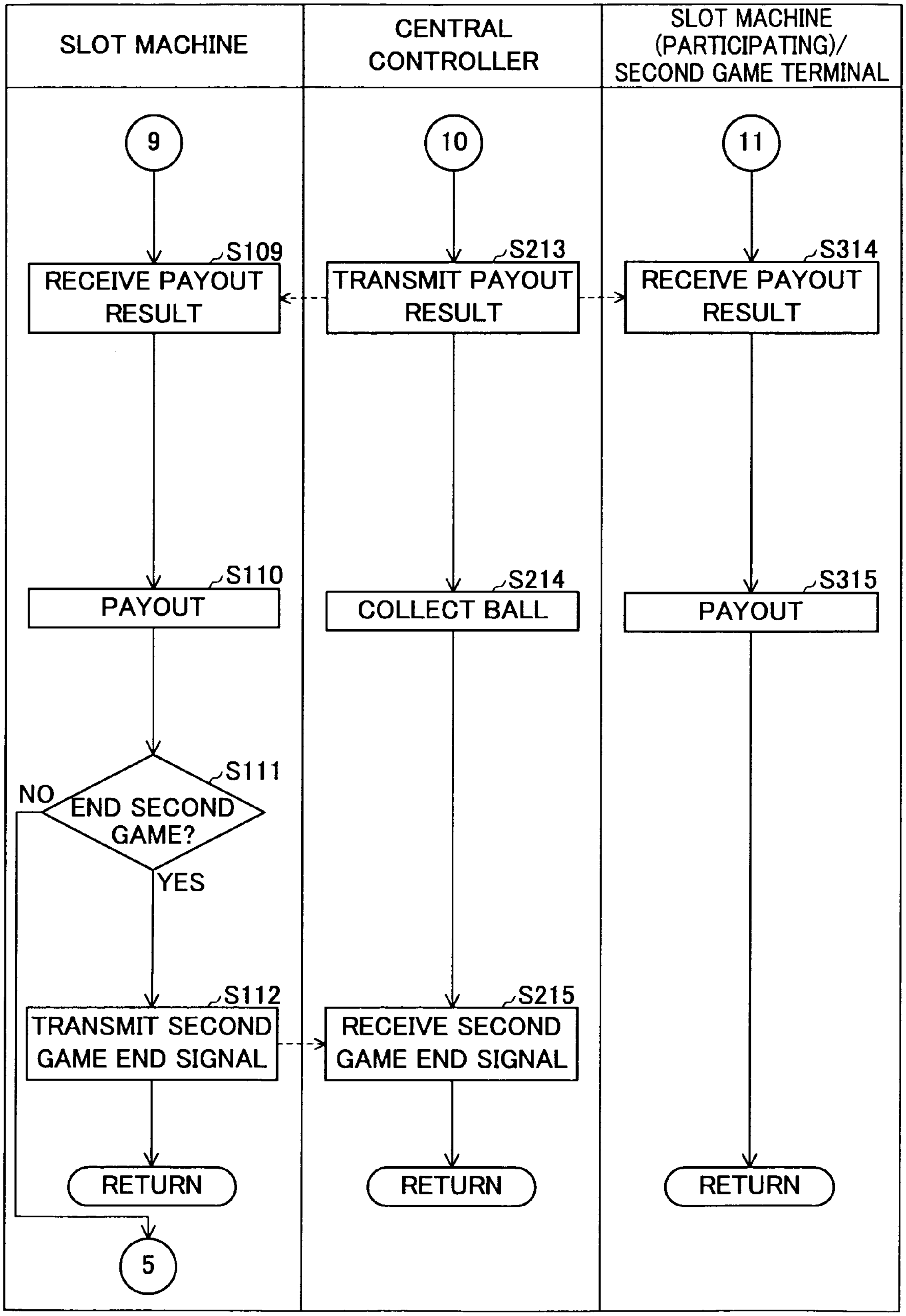

In step S213 shown in FIG. 18D, the CPU 206 executes transmission processing for the credit payout results of the roulette game according to the payout calculation processing in the aforementioned Step S213. Specifically, the CPU 206 outputs credit data corresponding to the payout amount to each of the winning slot machines 13 and the winning second game terminals 15. Subsequently, the flow proceeds to Step S214 according to the instruction from the CPU 206.

In Step S214, the CPU 206 drives the ball collecting device provided below the wheel 62, thereby collecting the ball 65 remaining on the wheel 62. The ball 65 thus collected is supplied again to the wheel 62 of the roulette device 20 in the following games.

Subsequently, the CPU 206 receives a second game end signal transmitted from the main slot machine 13 (Step S215). Upon reception of the second game end signal, the CPU 206 lowers the movable floor 18, on which the slot machine 13 and the seat 57 have been installed, whereupon this routine ends.

Note that an arrangement may be made in which, in a case that all the slot machines 13 are performing only the basic game, i.e., in a case that none of the slot machines 13 is performing the second game, the monitor 16 displays a demonstration image of the second game stored in the ROM 208.

Finally, description will be made regarding the second game processing program executed at the participating slot machines 13 and the second game terminals 15, with reference to FIGS. 18A through 18D. Description will first be made regarding processing at the participating slot machines 13, and subsequently processing at the second game terminals 15.

The following is a description of the bet processing for the roulette game executed at the participating slot machines 13.

In step S301 in FIG. 18A, the CPU 106 of the slot machine 13 receives a second game start signal transmitted from the central controller 14. Upon reception of this signal, the slot machine 13 allows the player to operate it as a roulette game terminal. Subsequently, the flow proceeds to Step S302 according to the instruction from the CPU 106.

In step S302, determination is made regarding whether or not the second game start signal has been received by the slot machine 13. Specifically, the CPU 106 of the slot machine 13 advances the flow to step S303.

In step S303, the CPU 106 of the slot machine 13 performs the participation processing shown in FIG. 19 which will be described later, and the flow proceeds to step S304.

In step S304, the CPU 106 determines whether or not the player has inserted a coin, based on a detection signal from the coin sensor 43. In the event that no coin has been inserted (in the event of "NO" in the determination processing in Step S304), the CPU 106 advances the flow to step S305. On the other hand, in the event that a coin has been inserted (in the event of "YES" in the determination processing in Step S304), the CPU 106 advances the flow to step S306 in FIG. 18B.

Note that coins used for the basic game at the slot machine 13 can also be used for the roulette game as well.

In step S305, the CPU 106 determines whether or not a bet period end signal has been received. This bet period end signal is transmitted from the central controller 14 upon the betting period elapsing. In the event that this signal has not been received (in a case of "NO" in the determination processing in Step S305), the CPU 106 returns the flow to step S304. On the other hand, in the event that the bet period end signal has been received (in a case of "YES" in the determination processing in Step S305), a bet information signal to the effect that a bet has not been placed is transmitted to the central controller 14, and the routine ends.

In step S306 in FIG. 18B, the CPU 106 records credit data of an amount corresponding to the number of coins inserted, in the RAM 110. Subsequently, the CPU 106 advances the flow to step S307.

In step S307, the CPU 106 displays the BET screen 70 shown in FIG. 23, described later, on the liquid crystal display 30 of the slot machine 13 (step S307), and starts the bet period in which the players can bet their chips (Step S308). Players participating in the game can bet their chips in the BET area 73 corresponding to their own predicted numbers, by operating a touch panel 32 during the bet period wherein bet reception becomes available. Note that the specific betting method using the BET screen 70 will be described later.

Subsequently, upon reception of a bet period end signal to the effect that the bet period has ended from the CPU 206 of the central controller 14 (Step S309), the CPU 106 displays an image, which notifies that the bet period has ended, on the liquid crystal display 30 of the slot machine 13, and reception of the betting operation at the touch panel 32 ends (Step S310). Subsequently, the CPU advances the flow to Step S311 shown in FIG. 18C.

In Step S311 shown in FIG. 18C, the CPU 106 determines whether or not bets have been placed by the player in the betting operation period. In a case that bets have been placed (in a case of "YES" in the determination processing in Step S311), the CPU 106 advances the flow to Step S313. On the other hand, in a case that bets have not been placed (in a case of "NO" in the determination processing in Step S311), the CPU 106 advances the flow to Step S312.

In step S312, the CPU 106 performs payout processing corresponding to the coins which the player has inserted, and transmits a bet information signal to the central controller 14 to the effect that no bet was placed. The CPU 106 then ends the routine.

In step S313, the CPU 106 transmits bet information regarding the bet which the player has placed at the slot machine 13 (the BET area 73 specified, and the amount of chips (amount of bets) placed at the specified BET area 73).

The CPU 106 then receives credit payout information transmitted from the CPU 206 of the central controller 14 (step S314 in FIG. 18D). Note that the credit payout results are the payout results of the roulette game performed using the BET screen 70. The CPU 106 then advances the flow to step S315.

In step S315, the CPU 106 performs credit payout based on the payout results received in step S314. Specifically, credit data of the amount corresponding to the payout of the roulette game is recorded in the RAM 110, and upon the cash out switch 26 being pushed, the CPU 106 pays out coins of a number corresponding to the amount of credits stored in the RAM 110, to the coin tray 28. Subsequently, the routine ends. Note that in the event of executing the game again consecutively at the main slot machine 13, a second game start signal is transmitted from the central controller 14 again, and the game goes to the next game.

Note that the suspension of the basic game processing of the slot machine 13 is released before ending this routing.

Next, description will be made regarding simplified betting processing at the participating slot machines 13. The term "simplified betting" as used here means that other players bet on whether or not the player of the main slot machine 13 will win.

Figure 28:
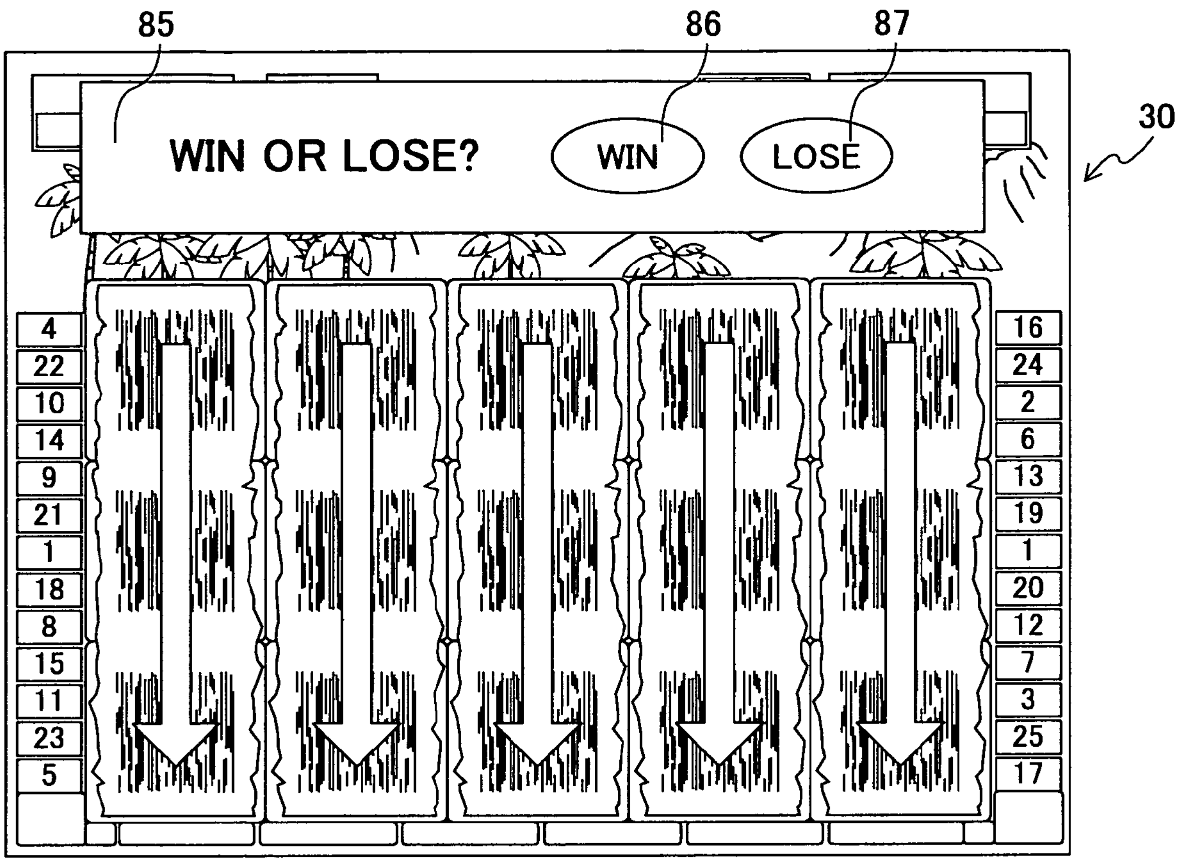
FIG. 28 shows an example what is displayed on the slot machine executing the basic game according to the embodiment of the present invention, which allows the player to bet on "WIN" or "NOT" after the participation in the bet on "WIN" or "NOT" in the second game.

Let us consider a case in which a simplified BET screen display flag described later is ON at the slot machine 13 in the participation processing which will be described later with reference to FIG. 19, and which is called from Step S303 shown in FIG. 18A. In this case, the CPU 106 of this slot machine 13 displays the small window 85 as shown in FIG. 28 above the scrolling reels in the basic game. Such an arrangement allows the player to make a selection via the simplified BET screen displayed on the small window 85 while continuing the basic game. The player selects between win and lose via the screen, within the time period up to the bet period end signal being received in step S309 in FIG. 18B from the central controller 14.

In response to the selection made by the player, the CPU 106 of the slot machine 13 transmits predetermined credits, and information on which way the player has bet, winning or losing, to the central controller 14 (step S313 in FIG. 18C).

Subsequently, in response to receiving payout results from the central controller 14 (step S314 in FIG. 18D), the predetermined credits are paid out, and the simplified BET screen flag is turned set to off (step S315). Note that the predetermined credits may be a predetermined set amount stored in the ROM 208 or RAM 210 of the central controller 14, or may be determined according to the total amount bet on the roulette game.

Now, description will be made regarding processing at the second game terminal 15. In step S301 shown in FIG. 18A, the CPU 306 of the second game terminal 15 receives a second game start signal transmitted from the central controller 14. Upon reception of this signal, the player can operate the second game terminal 15 as a roulette game terminal. Subsequently, the flow proceeds to Step S302 according to the instruction from the CPU 306.

In Step S302, determination is made whether or not the second game start signal has been received by the slot machine 13. Specifically, the flow proceeds to Step S305 according to the instruction from the CPU 306 of the second game terminal 15.

In Step S304, the CPU 306 determines whether or not the player has inserted coins based upon the detection signal received from the coin sensor 314. In a case that the player has not inserted any coin (in a case of "NO" in the determination processing in Step S304), the flow proceeds to Step S305 according to the instruction from the CPU 306. On the other hand, in a case that the player has inserted any coin (in a case of "YES" in the determination processing in Step S304), the flow proceeds to Step S306 shown in FIG. 18B according to the instruction from the CPU 306.

In Step S305, the CPU 306 determines whether or not the CPU 306 has received the betting period end signal. Upon the expiration of the betting period, the central controller 14 transmits the betting period end signal. In a case that the CPU 306 has not received this signal (in a case of "NO" in the determination processing in step S305), the flow proceeds to Step S304 according to the instruction from the CPU 306. On the other hand, in a case that the CPU 306 has received the betting period end signal (in a case of "YES" in the determination processing in step S305), the CPU 306 transmits a bet information signal, which provides notice that bets have not been placed, to the central controller 14, whereupon this routine ends.

In Step S306 shown in FIG. 18B, the CPU 306 stores credit data in the RAM 310 that corresponds to the amount of inserted coins. Subsequently, the flow proceeds to Step S307 according to the instruction from the CPU 306.

In Step S307, the CPU 306 displays the BET screen 70, which will described with reference to FIG. 23, on the display 93 of the second game terminal 15 (Step S307), and starts the betting period, during which the player can bet chips (S308). During the betting period, in which each player is permitted to place a bet, the player who participates in the game can place a bet using his/her own chips on the BET area 73 that accords with a desired number according to his/her prediction by operating the touch panel 99. Note that specific description will be made later regarding the betting method using the BET screen 70.

Also, each player can time their participation in the game as desired using the second game terminal 15 after the betting period has started. The game system 10 according to the present embodiment permits a maximum of four players to play the second game using the second game terminals 15.

Subsequently, upon reception of a betting period end signal, which indicates that the betting period has ended, from the CPU 206 of the central controller 14 (Step S309), the CPU 306 instructs the display 93 of the second game terminal 15 to display an image that indicates that the betting period has ended, whereupon the period in which each player is permitted to place a bet via the touch panel 99 expires (Step S310). Subsequently, the flow proceeds to Step S311 shown in FIG. 18C according to the instruction from the CPU 306.

In Step S311 shown in FIG. 18C, the CPU 306 determines whether or not the player has placed a bet during the betting period. In a case that the player has placed a bet (in a case of "YES" in the determination processing in Step S311), the flow proceeds to Step S313 according to the instruction from the CPU 306. On the other hand, in a case that the player has not placed a bet (in a case of "NO" in the determination processing in Step S311), the flow proceeds to Step S312 according to the instruction from the CPU 306.

In Step S312, the CPU 306 performs payout processing corresponding to the coins inserted by the player, and transmits a bet information signal, which indicates that the player has not placed a bet, to the central controller 14. Subsequently, the CPU 306 ends this routine.

In Step S313, the CPU 306 transmits bet information (the BET area 73 specified by the player, the amount of chips bet on the BET area 73 thus specified (bet amount)) specified by the player via each second game terminal 15.

Subsequently, the CPU 306 receives the credit payout results transmitted from the CPU 206 of the central controller 14 (Step S314 shown in FIG. 18D). Note that the credit payout results match the payout results of the roulette game performed using the BET screen 70. Subsequently, the flow proceeds to Step S315 according to the instruction from the CPU 306.

In Step S315, the CPU 306 pays out the credit based upon the payout results received in Step S314. Specifically, upon storing the credit data that corresponds to the payout for the roulette game, and upon the cash out button 97 being pushed, the CPU 306 pays out coins from the coin tray 94 corresponding to the credit amount stored in the RAM 310. Subsequently, the CPU 306 ends this routine. Note that, in a case of executing the game again consecutively via the main slot machine 13, the central controller 14 transmits a second game start signal again, thereby starting the next game.

Figure 19:
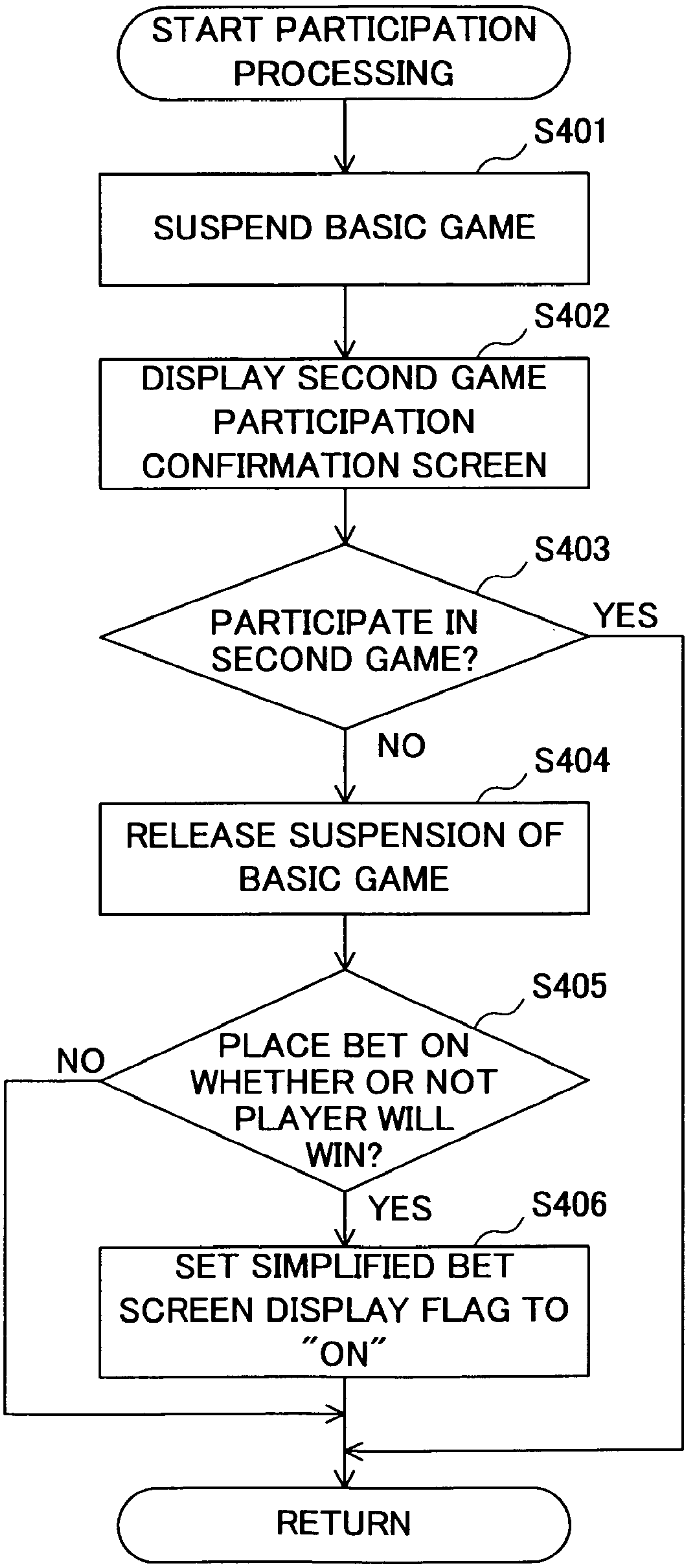
FIG. 19 is a flowchart which shows the flow of the participation processing and operation of the game system in the second game according to the embodiment of the present invention.

FIG. 19 is a flowchart illustrating participation processing for the second game executed by the controller 100 of a participating slot machine 13 according to an embodiment of the present invention.

In step S401, the CPU 106 of the slot machine 13 suspends the basic game, following which the flow proceeds to step S402.

In step S402, the CPU 106 displays a second game participation confirmation screen such as shown toward the bottom in FIG. 26, described later, on the liquid crystal display 30. The flow then proceeds to step S403.

In step S403, the CPU 106 determines whether or not the slot machine 13 will participate in the second game. In the event of participating in the second game (in the event of determination of "YES" in the processing in step S403), the CPU 106 ends the routine. That is to say, the basic game which the player had been playing will remain suspended during the second game. On the other hand, in the event of not participating in the second game (in the event of determination of "NO" in the processing in step S403), the flow proceeds to step S404 according to the instruction from the CPU 106.

In step S404, the CPU 106 releases the suspension of the basic game, following which the flow returns to step S405.

Figure 27:
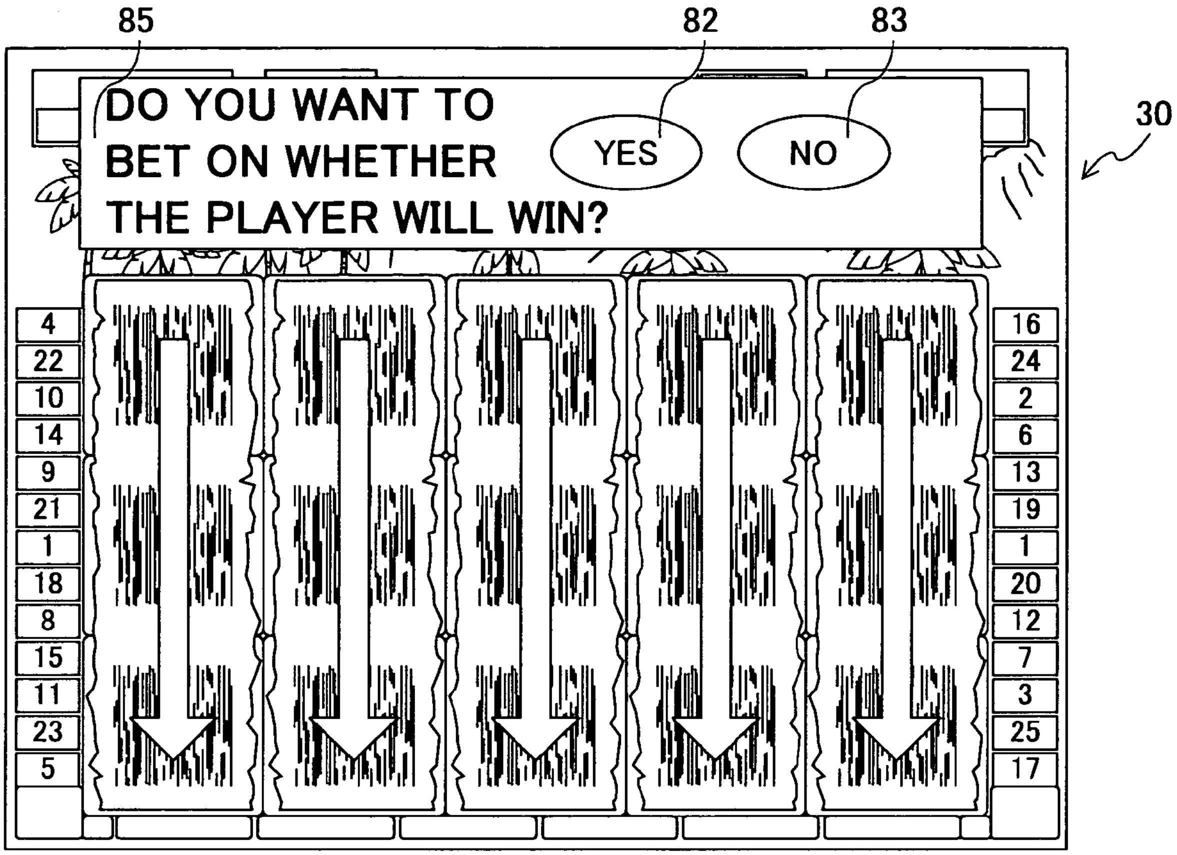
FIG. 27 shows an example what is displayed on the slot machine executing the basic game according to the embodiment of the present invention, which prompts bet on "WIN" or "NOT" in the second game.

In step S405, the CPU 106 displays the small window 85 such as shown in FIG. 27 described later, to determine whether on not the player will bet on whether or not the player of the main slot machine 13 will win. In the event of betting (in the event of determination of "YES" in the processing in step S405), the CPU 106 advances the flow to step S406. On the other hand, in the event of not betting (in the event of determination of "NO" in the processing in step S405), the CPU 106 ends the routine. In this case, the CPU 106 of the slot machine 13 performs control to continue the basic game.

In step S406, the CPU 106 displays the small window 85 for a simplified BET screen such as shown in FIG. 28 on the liquid crystal display 30, sets a simplified BET screen display flag to "on" in response to the player having selected one or the other of winning or loosing. Subsequently, the routine ends. Note that the simplified BET screen display flag is for determining whether or not a simplified bet has been placed on whether or not the player of the main slot machine 13 will win or loose. The simplified BET screen display flag is set to "on" in the event that a simplified bet has been placed, and is set to "off" at the time of the unit game ending.

Figure 20:
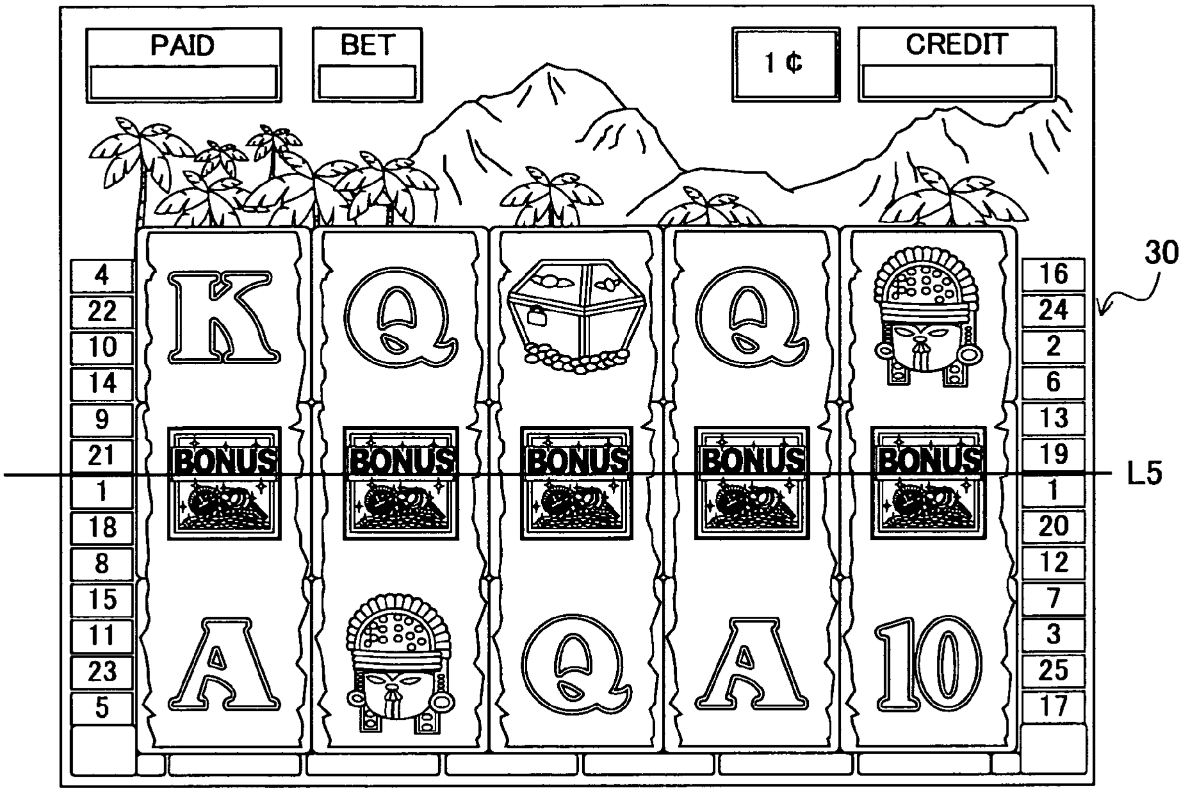
FIG. 20 shows an example of what is displayed when a combination of "BONUS" symbols has come to a stop along an active pay line L5 on a display region in the basic game executed by the slot machine according to the embodiment of the present invention.
Figure 21:
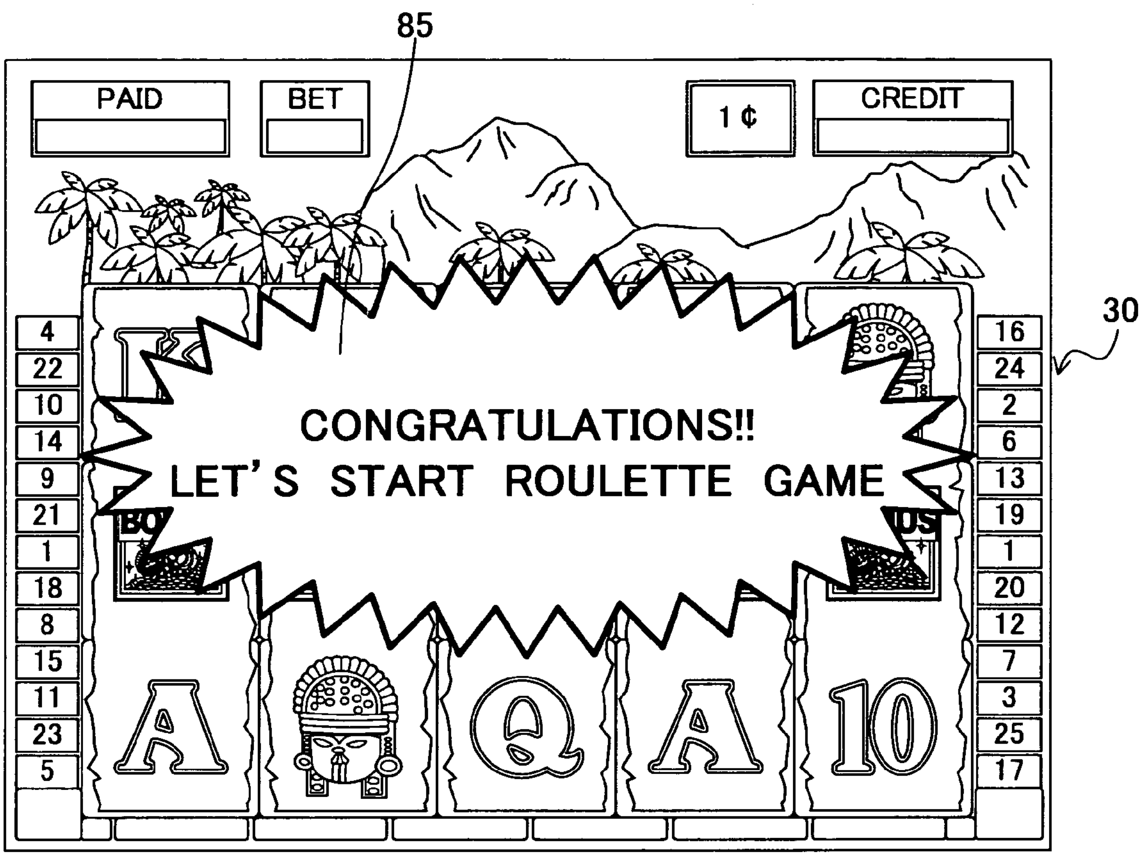
FIG. 21 shows an example of what is displayed after the symbol combination shown in FIG. 20 has been displayed in the basic game executed by the slot machine according to the embodiment of the present invention.

FIGS. 20 and 21 show examples of what is displayed on the slot machine 13 for the basic game according to the present embodiment of the present invention. Here, the symbols when they are stationary are displayed on the liquid crystal display 30 of the slot machine 13. In this example, the "BONUS" symbols are arranged along the middle portion of the horizontal line, i.e., the "BONUS" winning combination is formed along the active pay line L5. As described above, in a case that the "BONUS" winning combination has been formed, the game is switched to the second game. Accordingly, as shown in FIG. 21, the liquid crystal display 30 displays the small window 85 that displays a text reading "CONGRATULATIONS!! LET'S START ROULETTE GAME". Such visual effects notify the player that the "BONUS" symbols have been arranged along a particular active pay line, and that the roulette game will start soon.

Figure 22:
FIG. 22 shows an example of what is displayed on a monitor at the time of starting the second game according to the embodiment of the present invention.

FIG. 22 illustrates a display example made to prompt participation on the second game, which is displayed on the large-size monitor 16 at the time of the second game starting. A display of "Come join the roulette game!" is made on the large-size monitor 16, and other players in the amusement facility can also participate in the roulette game using the second game terminals 15. Also, this can be announced even more effectively to the other players by audio from the speakers provided to the left and right sides of the large-size monitor 16 as shown in FIG. 2.

Figure 23:
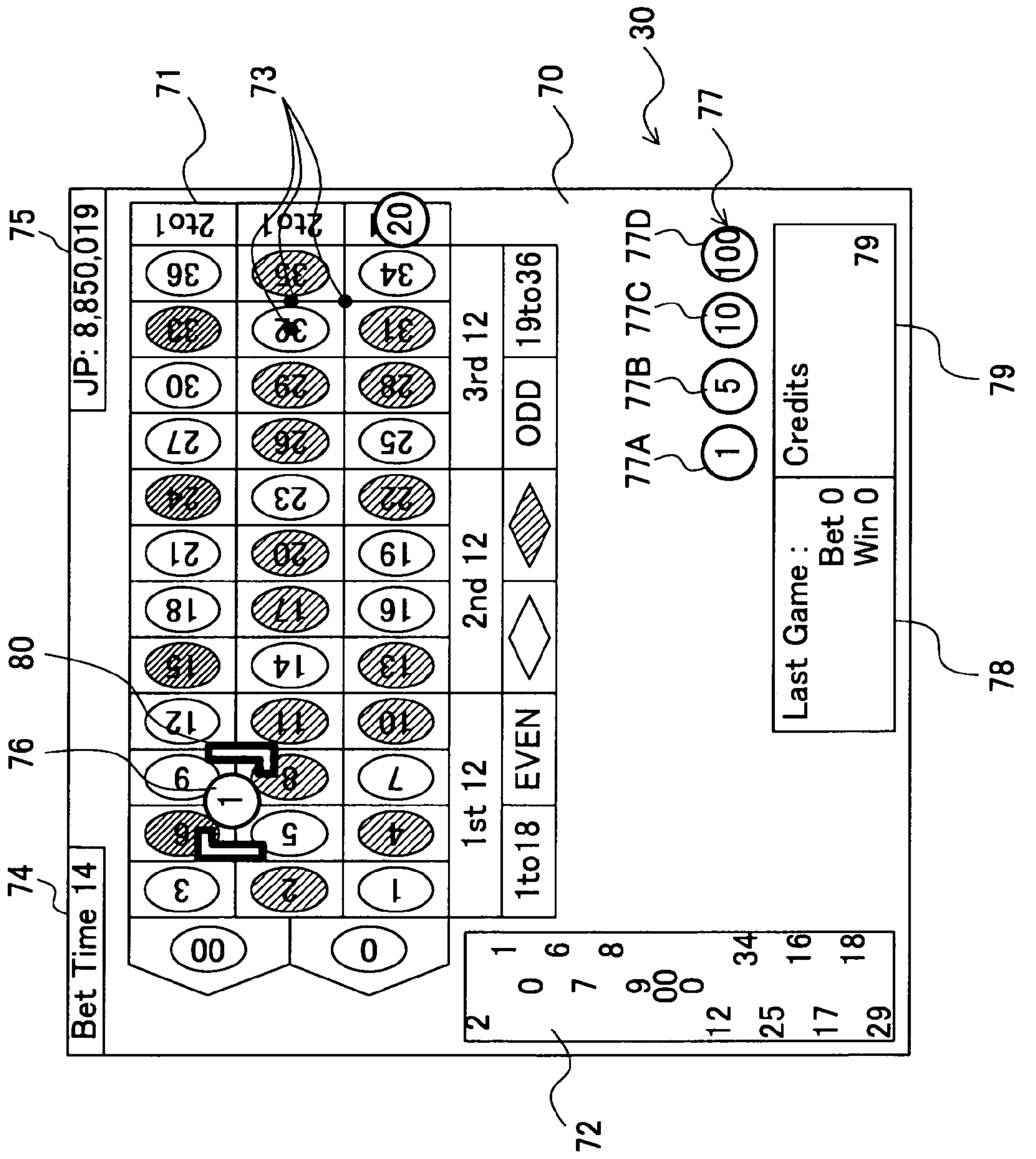
FIG. 23 shows an example of what is displayed on the slot machine and the second game terminal according to the embodiment of the present invention when the player places a bet in the second game.

FIG. 23 shows an example of what is displayed on the slot machine 13 during the second game. Specifically, FIG. 23 shows an example of what is displayed on the liquid crystal display 30, which allows the player to place a bet on the roulette game. Note that the display 93 of each second game terminal 15 displays the same image. Description will be made below regarding the example of what is displayed for the second game with reference to FIG. 23, except for the same components described above with reference to FIG. 10.

First, the BET screen 70 is displayed on the liquid crystal display 30 of the slot machine 13 and the display 93 of the second game terminal 15. Description will be made below regarding an arrangement in which the BET screen 70 is displayed on the liquid crystal display 30 of the slot machine 13. The components of the BET screen 70 include: the result history display unit 72; the BET unit buttons 77; a payout display unit 78; and a credit amount display unit 79, which are displayed, in that order, starting from the upper left of the portion below the betting board 71, which is also displayed on the BET screen 70.

The BET unit buttons 77 are provided for allowing the player to place bets using chips on the BET area 73 (squares having a number or mark, or lines which define the squares) specified by the player. The BET unit buttons 77 comprise four kinds of buttons, i.e., a 1 BET button 77A, a 5 BET button 77B, a 10 BET button 77C, and a 100 BET button 77D.

With such an arrangement, first, the player specifies the desired BET area 73 on which bets are to be placed, with a cursor 80, which will be described later, by using his/her finger to directly push on the screen. In this stage, upon the player pushing the 1 BET button 77A, the chips are bet in increments of one chip (the amount of chips bet is incremented in the order of "1", "2", "3", . . . , for each time the player pushes the 1 BET button 77A with his/her finger or the like). On the other hand, upon the player pushing the 5 BET button 77B, the chips are bet in increments of five chips (the amount of chips bet is incremented in the order of "5", "10", "15", . . . , for each time the player pushes the 5 BET button 77B with his/her finger or the like). On the other hand, upon the player pushing the 10 BET button 77C, the chips are bet in increments of ten chips (the amount of chips bet is incremented in the order of "10", "20", "30", . . . , for each time the player pushes the 10 BET button 77C with his/her finger or the like). On the other hand, upon the player pushing the 100 BET button 77D, the chips are bet in increments of one hundred chips (the amount of chips bet is incremented in the order of "100", "200", "300", . . . , for each time the player pushes the 100 BET button 77D with his/her finger or the like).

Such an arrangement simplifies the operation required for betting a great amount of chips. Note that one coin used in the basic game at the slot machine 13 corresponds to one chip used in the second game.

Note that the present invention is not restricted to an arrangement in which the chips are bet on only a single position. Also, an arrangement may be made which allows the player to place bets on multiple positions by specifying the BET area 73 again after the player has pushed the BET unit button.

Furthermore, the payout display unit 78 displays the amount of chips bet in the previous game and the payout credit amount. Here, the amount obtained by subtracting the amount of chips thus bet from the payout credit amount matches the credit amount newly obtained by the player in the previous game. This example of what is displayed shows the first instance of the second game after the game has been switched to the second game at the slot machine 13. Accordingly, both the bet amount and the payout credit amount are set to "0". Furthermore, the credit display unit 79 displays the credit amount deposited by the player at the current point in time. Upon the player betting chips, the credit amount is decremented corresponding to the amount of chips bet (1 bet corresponds to 1 credit). On the other hand, in a case that the player has won the chips bet, and accordingly, in a case that credit is paid out, the credit amount is incremented by the payout credit amount. Note that in a case that the credit amount possessed by the player has become zero, the game is over. This example of what is displayed shows a case in which the game has been switched to the second game with the credit amount "1" at the slot machine 13.

Furthermore, in this example of what is displayed, the player has bet "20" chips at "2 to 1" on the column "1", "4", "7", "10", . . . , and "1" chip on the four numbers "5", "6", "8", and "9". Accordingly, the credit amount display unit 79 displays the credit amount "79", which is obtained by subtracting "21(=20+1)" from "100" which was the amount of chips immediately after the game had been switched to the second game.

Furthermore, the cursor 80, which indicates the BET area 73 currently selected by the player, is displayed on the betting board 71.

When the player places a bet via the BET screen 70 thus configured as described above, first, the player specifies the desired BET area 73 (squares having a number or mark, and lines defining the squares), on which chips are to be bet, by directly pushing the BET area 73 on the screen. As a result, the cursor 80 is moved to the BET area 73 thus specified.

Subsequently, upon pushing any one of the BET unit buttons 77 (1 BET button 77A, 5 BET button 77B, 10 BET button 77C, and 100 BET button 77D), the amount of chips that correspond to the BET unit buttons are bet on the BET area 73 thus specified. For example, upon pushing the 10 BET button 77C four times, pushing the 5 BET button 77B once, and pushing the 1 BET button 77A three times, a total of 48 chips are bet. The player can place a bet using such a function by operating the terminal at hand.

Figure 25:
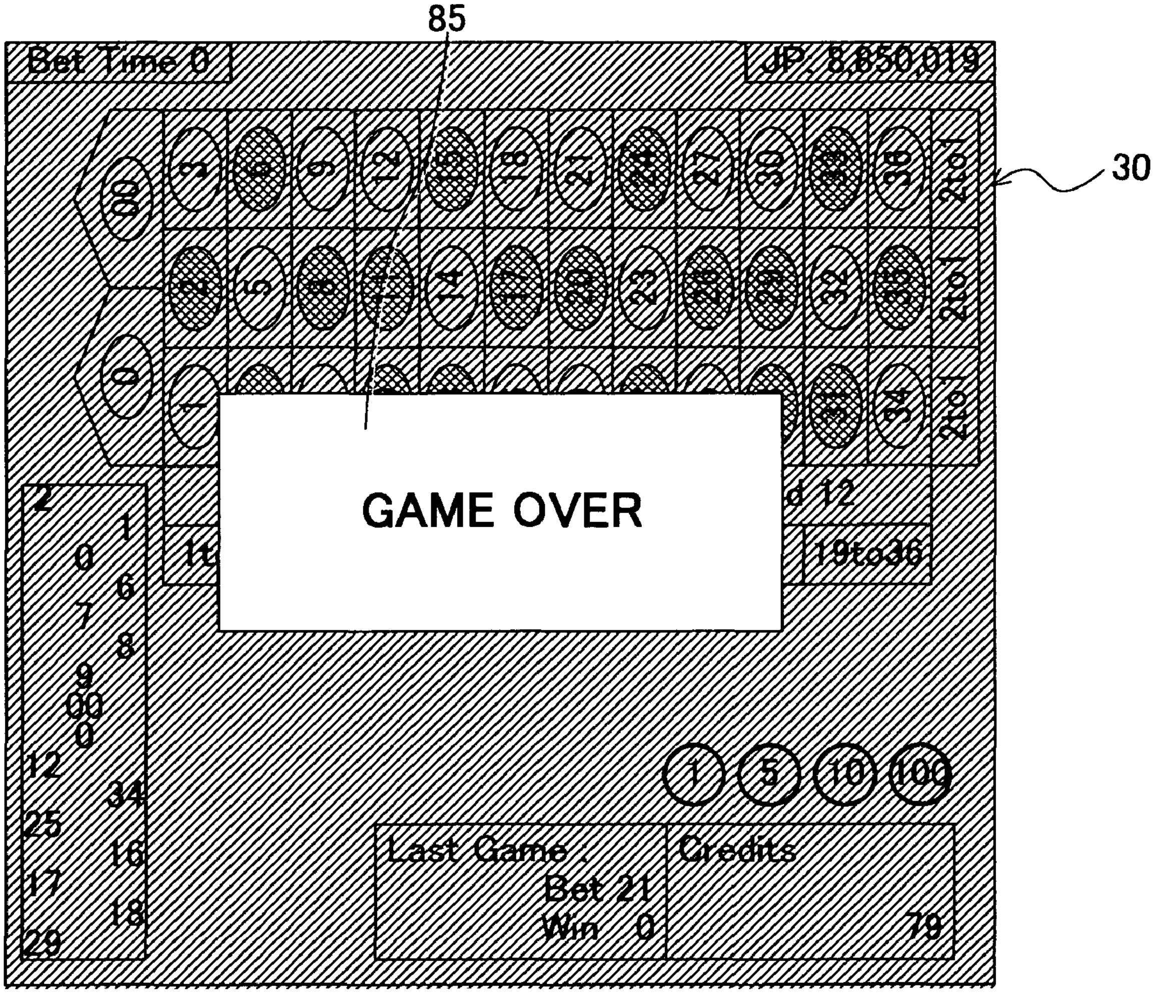
FIG. 25 shows an example of what is displayed on the slot machine and the second game terminal according to the embodiment of the present invention when the second game is over.

FIGS. 24 and 25 show examples of what is displayed on the liquid crystal display 30 after the payout processing in Step S110 described above with reference to FIG. 18D. FIG. 24 shows an example of what is displayed on the liquid crystal display 30 of the slot machine 13 in a case that there is any credit remaining in the roulette game. Specifically, the small window 85, which asks the player whether or not the game is to be continued, is displayed on the central area of the screen, and a countdown number 81 is displayed on the upper-right side of the image. For example, the countdown number is decremented from "10" in the order of "10", "9", "8", . . . . In a case that the player has pushed neither a "YES" button 82 nor a "NO" button 83 provided at a lower portion of the image on the touch panel 32 when the countdown number 81 has become "0", determination is made that the roulette game is to end, and the small window 85 is displayed as shown in FIG. 25, which notifies the player that game is over. On the other hand, in a case that there is no credit remaining in the roulette game, the small window 85 shown in FIG. 25 is displayed on the liquid crystal display 30 without involving the small window 85 shown in FIG. 24, whereupon the roulette game ends.

Thus, with the game system and playing method according to the present invention, when playing a basic game at the slot machine 13 and a predetermined combination of symbols providing a "BONUS" winning stopping on an active pay line L5, a roulette game performed at the second game device 11 is started. In this case, the slot machine 13 becomes a terminal capable of performing betting operations regarding the roulette game, and credits provided by the "BONUS" combination in the basic game are then used in the roulette game. The roulette game ends mainly when the player wants to end playing or when the player runs out of credits. Accordingly, depending on how the player plays, the roulette game can be played an indefinite number of times.

Figure 26:
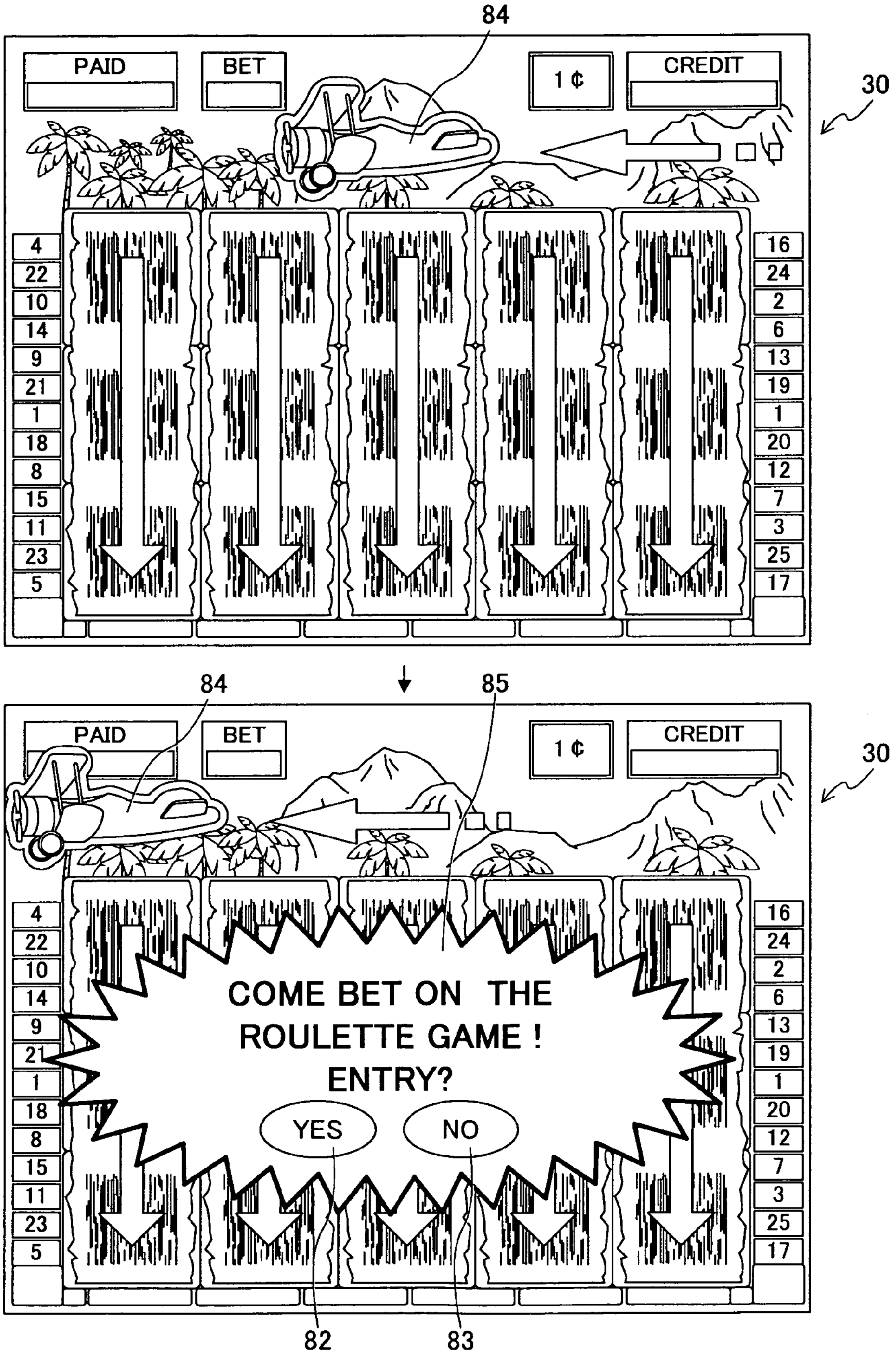
FIG. 26 shows an example what is displayed on the slot machine executing the basic game according to the embodiment of the present invention, which prompts participation in the second game.

FIG. 26 illustrates what is displayed on the liquid crystal display 30 in the above-described S402 in FIG. 19. The upper portion in FIG. 26 shows an airplane 84 flying in from the upper right side of the liquid crystal display 30 of the slot machine 13 at which the basic game is being played. The appearance of the airplane 84 gives the player a sense of anticipation regarding what will happen next. Subsequently, the small window 85 is displayed as the airplane 84 flies away to the left, as shown in the lower portion in FIG. 26. The small window 85 says "Come bet on the roulette game!" and displays buttons whereby the player can select whether or not to participate. In the event that the YES button 82 is pushed, the slot machine 13 is controlled so as to play the roulette game. On the other hand, in the event that the NO button 83 is pushed, the basic game can be continued.

FIG. 27 illustrates a screen displayed on the liquid crystal display 30 of a slot machine 13 at which not participating in the roulette game has been selected following release of suspension of the basic game in step S404 of FIG. 19 described above. The small window 85 is displayed, from which the player can select whether or not to bet on whether or not the player of the main slot machine 13 will win. A display is made saying "Do you want to bet on whether the player will win?" and buttons are displayed to select whether or not to participate. In the event that the YES button 82 is pushed, the small window 85 such as shown in FIG. 28 is displayed. On the other hand, in the event that the NO button 83 is pushed, the screen shown in FIG. 27 is closed.

FIG. 28 illustrates the simplified betting screen displayed in the event that the YES button 82 is pushed in FIG. 27. Such an arrangement allows the player to select the winning prediction or the losing prediction via the small window 85 by pushing a WIN button 86 or a LOSE button 87. This betting is performed with a predetermined amount of credits, and in the event of winning the bet, a predetermined amount of credits are added to the credits from the basic game.

As described above, with the game system and the method of play, in a case that a predetermined combination of symbols such as "BONUS" symbols or the like has come to a stop along the active pay line L5 in the basic game at the slot machine 13, for example, the roulette game starts, which is executed by the second game device 11, which is a separate device from the slot machine 13. In this case, the slot machine 13 serves as a terminal which allows the player to place a bet on the roulette game. In addition, such an arrangement allows other slot machines 13, which are executing the basic game and which have not displayed a predetermined symbol combination such as "BONUS" combination after a stop of rotation, to participate in the roulette game. With such an arrangement, the player can use the credit obtained from the "BONUS" combination in the basic game as the credit in the roulette game. On the other hand, the payout from the roulette game is transmitted to the slot machine 13, which allows the player to use the payout obtained in the roulette game as the credit in the basic game. In a case that the player desires to end the roulette game, or in a case that no credit is remaining, the roulette game ends. Accordingly, the player can repeatedly play the roulette game as desired, depending upon the method of play of the player.

Furthermore, the game system includes the multiple second game terminals 15 each of which serves as a dedicated terminal for the roulette game, thereby allowing other players to participate in the roulette game. Such an arrangement including the multiple second game terminals 15 allows other players who have not played the game at the slot machines 13 in the amusement facility to participate in the roulette game without involving other games, thereby increasing the player's level of interest in the game.

Also, with regard to the roulette game, the second game payout table determines rules such as the places where betting is performed and whether or not multiple bets are permitted in a single play, and also the payout amount. The second game payout table can have different settings according to the terminals where the second game is played, and the payout rate can be changed according to the conditions of the basic game. Such various settings enable a game to be provided wherein player excitement is heightened.

Also, participating slot machines 13 can bet on the roulette game at the same time while playing the basic game, this betting being regarding whether or not the bet of the player independently playing the roulette game at the slot machine 13 will win. Thus, a player can participate in a roulette game in which multiple players participate without interrupting the game currently being played by the player, so the players can share the fun of playing.

While the game system according to the present invention has been described above by way of embodiments, it should be clearly understood that the embodiments in no way restrict the present invention, and that the specific configurations such as the means and components may be modified and altered as suitable. Moreover, it should be understood that the advantages described in association with the embodiments are merely a listing of most preferred advantages, and that the advantages of the present invention are by no means restricted to those described in connected with the embodiments.

For example, while the second game has been described as being a roulette game, this may be other forms of gaming, such as a card game like poker, quizzes, or the like.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A game system comprising:

a slot machine which executes a basic game and, under a predetermined condition, transmits a signal for switching to a second game;

a second game device, which is a separate device from said slot machine, and which executes the second game;

other slot machines that allow other players to participate in the second game according to the switching signal being transmitted by said slot machine;

a display which displays an image corresponding to game status of said second game device, and which allows multiple players who are playing the second game at said slot machine and said other slot machines to view the image; and a central controller which can communicate with said slot machine, said second game device, said other slot machines, and said display, and which transmits a start signal, according to the switching signal being received from said slot machine, to start the second game on said second game device.

2. A game system according to claim 1, wherein, when said slot machine transmits data concerning the second game, said other slot machines transmit data regarding win-loss at said slot machine for the second game, and wherein said central controller receives the data transmitted from said slot machine and said other slot machines, transmits payout data corresponding to a result of the second game to said slot machine, and transmits payout data corresponding to a result of a win-loss at said slot machine for the second game, to said other slot machines that have transmitted data regarding the win-loss.

3. A game system according to claim 1, wherein, said central controller executes the second game using credit data provided by the basic game, according to a predetermined condition for switching to the second game being satisfied at said slot machine.

4. A game system according to claim 1, wherein said central controller provides different payouts for each of said slot machine and said other slot machines, based upon a payout table for the second game.

5. A game system according to claim 1, wherein each of said other slot machines includes a controller for executing the second game while executing the basic game, according to a signal from said central controller.

6. A game system according to claim 1, further comprising second game terminals that can communicate with said central controller, each of which serves as a dedicated terminal for the second game after reception of a start signal for starting the second game transmitted by said central controller.

7. A game system comprising:

a slot machine which executes a basic game and, under a predetermined condition, transmits a signal for switching to a second game;

a second game device, which is a separate device from said slot machine, and which executes the second game;

other slot machines that allow other players to participate in the second game according to the switching signal being transmitted by said slot machine;

a display which displays an image corresponding to game status of said second game device, and which allows multiple players who are playing the second game at said slot machine and said other slot machines to view the image;

second game terminals each of which serves as a dedicated terminal for the second game; and a central controller which can communicate with said slot machine, said second game device, said other slot machines, said display, and said second game terminals, which transmits a start signal, according to the switching signal being received from said slot machine, to start the second game on said second game device, and which executes the second game using credit data provided by the basic game.

8. A game system comprising:

a slot machine which executes a basic game and, under a predetermined condition, transmits a signal for switching to a second game;

a second game device, which is a separate device from said slot machine, and which executes the second game;

other slot machines that allow other players to participate in the second game according to the switching signal being transmitted by said slot machine;

a display which displays an image corresponding to game status of said second game device, and which allows multiple players who are playing the second game at said slot machine and said other slot machines to view the image;

second game terminals each of which serves as a dedicated terminal for the second game; and a central controller which can communicate with said slot machine, said second game device, said other slot machines, said display, and said second game terminals, which transmits a start signal, according to the switching signal being received from said slot machine, to start the second game on said second game device, and which provides different payouts for each of said slot machine, said other slot machines, and said second game terminals, based upon a payout table for the second game.

9. A game system comprising:

a slot machine which executes a basic game and, under a predetermined condition, transmits a signal for switching to a second game;

a second game device, which is a separate device from said slot machine, and which executes the second game;

other slot machines each of which has a controller for executing the second game while executing the basic game, according to a switching signal being transmitted by said slot machine;

a display which displays an image corresponding to game status of said second game device, and which allows multiple players who are playing the second game at said slot machine and said other slot machines to view the image;

second game terminals each of which serves as a dedicated terminal for the second game; and a central controller which can communicate with said slot machine, said second game device, said other slot machines, said display, and said second game terminals, which transmits a start signal, according to the switching signal being received from said slot machine, to start the second game on said second game device, which receives data with respect to the second game transmitted from said slot machine, which receives win-loss data transmitted from said other slot machines, concerning a win-loss at said slot machine, which receives data concerning said second game transmitted by said slot machine, which receives data concerning a win-loss at said slot machine of said second game, transmitted by said other slot machines, which transmits data concerning a win-loss of said slot machine of said second game, transmitted by said other slot machines, and which transmits payout data corresponding to a win-loss result of said slot machine of said second game to said other slot machines that have transmitted data concerning the win-loss.

10. A game system comprising:

a slot machine which executes a basic game and, under a predetermined condition, transmits a signal for switching to a second game;

a second game device, which is a separate device from said slot machine, and which executes the second game;

other slot machines that allow other players to participate in the second game according to the switching signal being transmitted by said slot machine;

a display which displays an image corresponding to game status of said second game device, and which allows multiple players who are playing the second game at said slot machine and said other slot machines to view the image;

second game terminals each of which serves as a dedicated terminal for allowing other players to play the second game, having a function of displaying an image corresponding to the game status on the display screen, a function of allowing the other players to make a selection with respect to the second game by operating a touch switch unit on a predetermined area of the display screen, and a function of transmitting the data thus selected; and a central controller which can communicate with said slot machine, said second game device, said other slot machines, said display, and said second game terminals, which transmits a start signal, according to the switching signal being received from said slot machine, to start the second game on said second game device, which executes the second game using credit data provided by the basic game, and which provides different payouts for each of said slot machine, said other slot machines, and said second game terminals, based upon a payout table for the second game.

11. A game control method which employs a system including slot machines for executing a basic game, a second game device which is a separate device from said slot machine, and a display which allows multiple players who are playing a second game that differs from the basic game to view an image displayed on said display, said method comprising:

- a step in which a controller of one of said slot machines transmits a signal for switching to the second game under a predetermined condition;
- a step in which a central controller receives the signal for switching to the second game;
- a step in which said central controller transmits a start signal for the second game executed by said second game device;
- a step in which said central controller starts the second game on said second game device;
- a step in which a controller of another slot machine among said slot machines receives the start signal for starting the second game; and
- a step in which said central controller displays an image on said display, corresponding to game status of said second game device.

12. A game control method according to claim 11, further comprising:

- a step in which the controller of said slot machine transmits data with respect to the second game;
- a step in which said central controller receives the data with respect to the second game;
- a step in which the controllers of said other slot machines transmit data concerning win-loss at said slot machine in the second game;
- a step in which said central controller receives the data concerning win-loss at said slot machine in the second game;
- a step in which said central controller transmits payout data to said slot machine corresponding to a result of the second game; and
- a step in which said central controller transmits payout data corresponding to a win-loss result at said slot machine in the second game to said other slot machines that have transmitted data concerning the win-loss.

13. A game control method according to claim 11, further comprising:

- a step in which the controller of said slot machine provides credit data;
- a step in which the controller of said slot machine transmits a signal for switching the game to the second game under a predetermined condition;
- a step in which said central controller receives the signal for switching the game to the second game;
- a step in which the controller of said slot machine transmits the credit data;
- a step in which said central controller receives the credit data; and
- a step in which said central controller executes the second game using the credit data.

14. A game control method according to claim 11, further comprising a step in which said central controller provides different payouts to each of said slot machine and said other slot machines based upon a payout table for the second game.

15. A game control method according to claim 11, further comprising:

- a step in which said central controller transmits a start signal to said other slot machines for starting the second game;
- a step in which the controllers of said other slot machines receive the start signal for starting the second game; and
- a step in which said central controller controls said other slot machines executing the basic game.

16. A game control method according to claim 11, further comprising a step in which said central controller transmits the second game start signal to the second game terminals each of which is used as a dedicated second game terminal for the second game.

17. A game control method which employs a system including slot machines for executing a basic game, a second game device which is a separate device from said slot machine, a display which allows multiple players who are playing a second game that differs from the basic game to view an image displayed on said display, and second game terminals each of which is used as a dedicated terminal for the second game, said method comprising:

- a step in which a controller of said slot machines provides credit data;
- a step in which the controller of said slot machine transmits a signal for switching to the second game under a predetermined condition;
- a step in which a central controller receives the signal for switching to the second game;
- a step in which said central controller transmits a start signal for the second game executed by said second game device;
- a step in which said central controller starts the second game on said second game device;
- a step in which a controller of another slot machines among said slot machines receives the start signal for starting the second game;
- a step in which a controller of each of said second game terminals receives the second game start signal;
- a step in which the controller of said slot machine transmits the credit data;
- a step in which said central controller receives the credit data;
- a step in which said central controller executes the second game using the credit data; and
- a step in which said central controller displays an image on said display corresponding to game status on said second game device.

18. A game control method which employs a system including slot machines for executing a basic game, a second game device which is a separate device from said slot machine, a display which allows multiple players who are playing a second game that differs from the basic game to view an image displayed on said display, and second game terminals each of which is used as a dedicated terminal for the second game, said method comprising:

- a step in which a controller of said slot machines transmits a signal for switching to the second game under a predetermined condition;
- a step in which a central controller receives the signal for switching to the second game;
- a step in which said central controller transmits a start signal for the second game executed by said second game device;

a step in which said central controller starts the second game on said second game device;

a step in which a controller of another slot machines among said slot machines receives the start signal for starting the second game;

a step in which a controller of each of said second game terminals receives the start signal for the second game;

a step in which said central controller displays an image on said display corresponding to game status on said second game device; and a step in which said central controller provides different payouts to each of said slot machine, said other slot machines, and said second game terminals, based upon a payout table for the second game.

19. A game control method which employs a system including slot machines for executing a basic game, a second game device which is a separate device from said slot machine, a display which allows multiple players who are playing a second game that differs from the basic game to view an image displayed on said display, and second game terminals each of which is used as a dedicated terminal for the second game, said method comprising:

a step in which a controller of said slot machines transmits a signal for switching to the second game under a predetermined condition;

a step in which a central controller receives the signal for switching to the second game;

a step in which said central controller transmits a start signal for the second game executed by said second game device;

a step in which said central controller starts the second game on said second game device;

a step in which a controller of another slot machines among said slot machines receives the start signal for starting the second game;

a step in which said central controller controls said other slot machines executing the basic game;

a step in which a controller of each of said second game terminals receives the second game start signal;

a step in which said central controller displays an image on said display corresponding to game status on said second game device;

a step in which the controller of said slot machine transmits data with respect to the second game;

a step in which said central controller receives the data with respect to the second game;

a step in which a controller of another slot machine transmits data concerning win-loss at said slot machine in the second game;

a step in which said central controller receives the data concerning a win-loss at said slot machine in the second game;

a step in which said central controller transmits payout data to said slot machine according to a result of the second game; and a step in which said central controller transmits payout data corresponding to a win-loss result of at said slot machine in the second game, to said other slot machines that have transmitted data concerning the win-loss.

20. A game control method which employs a system including slot machines for executing a basic game, a second game device which is a separate device from said slot machine, a display which allows multiple players who are playing a second game that differs from the basic game to view an image displayed on said display, and second game terminals each of which is used as a dedicated terminal for the second game, said method comprising:

a step in which a controller of said slot machines provides credit data;

a step in which a controller of said slot machine transmits a signal for switching to the second game under a predetermined condition;

a step in which a central controller receives the signal for switching to the second game;

a step in which said central controller transmits a start signal for the second game executed by said second game device;

a step in which said central controller starts the second game on said second game device;

a step in which a controller of another slot machine among said slot machines receives the start signal for starting the second game;

a step in which a controller of each of said second game terminals receives the second game start signal;

a step in which the controller of said slot machine transmits the credit data;

a step in which said central controller receives the credit data;

a step in which said central controller executes the second game using the credit data;

a step in which said central controller displays an image on said display corresponding to game status on said second game device;

a step in which the controller of each of said second game terminals displays an image on a display screen corresponding to the game status;

a step in which the controller of each of said second game terminals allows each of said other players to make a selection with respect to the second game by operating a touch switch unit on a predetermined area of the display screen, and the data thus selected is transmitted; and a step in which said central controller provides different payouts to each of said slot machine, said other slot machines, and said second game terminals, based upon a payout table for the second game.

* * * * *